United States Patent
Blake et al.

(10) Patent No.: US 8,545,295 B2
(45) Date of Patent: Oct. 1, 2013

(54) COIN PROCESSING SYSTEMS, METHODS AND DEVICES

(75) Inventors: John R. Blake, St. Charles, IL (US);
Curtis W. Hallowell, Palatine, IL (US);
Marianne Krbec, Wood Dale, IL (US);
William J. Jones, Barrington, IL (US);
Thomas P. Adams, Oconomowoc, WI (US)

(73) Assignee: Cummins-Allison Corp., Mt. Prospect, IL (US)

( * ) Notice: Subject to any disclaimer, the term of this patent is extended or adjusted under 35 U.S.C. 154(b) by 0 days.

(21) Appl. No.: 13/327,900

(22) Filed: Dec. 16, 2011

(65) Prior Publication Data
US 2012/0156976 A1 Jun. 21, 2012

Related U.S. Application Data

(60) Provisional application No. 61/424,549, filed on Dec. 17, 2010, provisional application No. 61/506,852, filed on Jul. 12, 2011.

(51) Int. Cl.
*G07D 3/00* (2006.01)
*G07F 19/00* (2006.01)

(52) U.S. Cl.
USPC ............................... 453/4; 194/344; 194/350

(58) Field of Classification Search
USPC .................. 453/4, 16, 18; 194/344, 346, 350, 194/353; 193/2 R, 22, DIG. 1; 232/1 D, 232/4 R, 5, 44, 55, 64, 65, 66; 141/10, 250, 141/297, 313, 314, 315, 316, 331, 333, 334; 902/8, 9, 30
See application file for complete search history.

(56) References Cited

U.S. PATENT DOCUMENTS

| 1,099,706 | A | * | 6/1914 | Lindeen | 141/298 |
| 2,570,920 | A | | 10/1951 | Clough et al. | 232/16 |
| 2,669,998 | A | | 2/1954 | Buchholz | 133/8 |

(Continued)

FOREIGN PATENT DOCUMENTS

| CA | 2235925 C | 11/1995 |
| CA | 2189330 C | 12/2000 |

(Continued)

OTHER PUBLICATIONS

Amiel Industries: AI-1500 'Pulsar' High Performance Sorting and Bagging Machine, 13 pages (date unknown, but prior to Dec. 14, 2000).

(Continued)

*Primary Examiner* — Mark Beauchaine
(74) *Attorney, Agent, or Firm* — Nixon Peabody LLP

(57) ABSTRACT

Systems, methods and devices for processing coins are presented herein. A coin processing system is disclosed which includes a housing with a coin input area for receiving a batch of coins, a controller with a communication interface operatively attached to the housing, and a coin processing unit for counting, discriminating, and/or valuing coins received from the coin input area. The coin processing system also includes a mobile coin receptacle removably disposed within the housing and configured to receive coins from the coin processing unit. The mobile coin receptacle is configured to wirelessly communicate information to the communication interface of the controller. The mobile coin receptacle can include one or more electrical contacts that mate with one or more electrical contacts on the housing to wirelessly communicate the information.

41 Claims, 29 Drawing Sheets

(56) References Cited

U.S. PATENT DOCUMENTS

| | | | |
|---|---|---|---|
| 2,750,949 A | 6/1956 | Kulo et al. | 133/8 |
| 2,835,260 A | 5/1958 | Buchholz | 133/8 |
| 2,865,561 A | 12/1958 | Rosapepe | 232/7 |
| 3,132,654 A | 5/1964 | Adams | 133/1 |
| 3,376,970 A | 4/1968 | Roseberg | 198/40 |
| 3,771,583 A | 11/1973 | Bottemiller | 160/327 |
| 3,778,595 A | 12/1973 | Hatanaka et al. | 235/61.7 B |
| 3,916,922 A | 11/1975 | Prumm | 133/3 R |
| 3,998,237 A | 12/1976 | Kressin | 133/3 A |
| 3,998,376 A | 12/1976 | Haines | 229/33 |
| 4,050,218 A | 9/1977 | Call | 53/167 |
| 4,059,122 A | 11/1977 | Kinoshita | 133/3 D |
| 4,075,460 A | 2/1978 | Gorgens | 235/420 |
| 4,124,111 A | 11/1978 | Hayashi | 194/102 |
| 4,150,740 A | 4/1979 | Douno | 194/4 C |
| 4,166,945 A | 9/1979 | Inoyama et al. | 235/379 |
| 4,172,462 A | 10/1979 | Uchida et al. | 133/3 A |
| 4,179,685 A | 12/1979 | O'Maley | 340/146.3 H |
| 4,179,723 A | 12/1979 | Spencer | 361/384 |
| 4,184,366 A | 1/1980 | Butler | 73/163 |
| 4,197,986 A | 4/1980 | Nagata | 235/379 |
| 4,208,549 A | 6/1980 | Polillo et al. | 179/6.3 R |
| 4,228,812 A | 10/1980 | Marti | 133/3 F |
| 4,232,295 A | 11/1980 | McConnell | 340/152 R |
| 4,234,003 A | 11/1980 | Ristvedt et al. | 133/3 |
| 4,249,552 A | 2/1981 | Margolin et al. | 133/1 R |
| 4,251,867 A | 2/1981 | Uchida et al. | 364/408 |
| 4,286,703 A | 9/1981 | Schuller et al. | 194/100 A |
| RE30,773 E | 10/1981 | Glaser et al. | 235/379 |
| 4,310,885 A | 1/1982 | Azcua et al. | 364/405 |
| 4,317,957 A | 3/1982 | Sendrow | 178/22.08 |
| 4,341,951 A | 7/1982 | Benton | 235/379 |
| 4,355,369 A | 10/1982 | Garvin | 364/900 |
| 4,360,034 A | 11/1982 | Davila et al. | 133/3 D |
| 4,369,442 A | 1/1983 | Werth et al. | 340/825.35 |
| 4,380,316 A | 4/1983 | Glinka et al. | 232/16 |
| 4,383,540 A | 5/1983 | DeMeyer et al. | 133/3 H |
| 4,385,285 A | 5/1983 | Horst et al. | 382/3 |
| 4,412,292 A | 10/1983 | Sedam et al. | 364/479 |
| 4,416,299 A | 11/1983 | Bergman | 133/1 R |
| 4,417,136 A | 11/1983 | Rushby et al. | 235/379 |
| 4,423,316 A | 12/1983 | Sano et al. | 235/379 |
| 4,434,359 A | 2/1984 | Watanabe | 235/379 |
| 4,436,103 A | 3/1984 | Dick | 133/3 D |
| 4,454,414 A | 6/1984 | Benton | 235/379 |
| 4,474,197 A | 10/1984 | Kinoshita et al. | 133/4 A |
| 4,488,116 A | 12/1984 | Plesko | 324/236 |
| 4,531,531 A | 7/1985 | Johnson et al. | 133/3 |
| 4,543,969 A | 10/1985 | Rasmussen | 133/3 |
| 4,549,561 A | 10/1985 | Johnson et al. | 133/3 |
| 4,556,140 A | 12/1985 | Okada | 194/4 C |
| 4,558,711 A | 12/1985 | Yoshiaki et al. | 133/3 F |
| 4,564,036 A | 1/1986 | Ristvedt | 133/3 |
| 4,570,655 A | 2/1986 | Raterman | 133/3 |
| 4,594,664 A | 6/1986 | Hashimoto | 364/405 |
| 4,602,332 A | 7/1986 | Hirose et al. | 364/408 |
| 4,607,649 A | 8/1986 | Taipale et al. | 133/3 C |
| 4,620,559 A | 11/1986 | Childers et al. | 133/3 R |
| 4,641,239 A | 2/1987 | Takesako | 364/408 |
| 4,674,260 A | 6/1987 | Rasmussen et al. | 53/212 |
| 4,681,128 A | 7/1987 | Ristvedt et al. | 453/6 |
| 4,705,154 A | 11/1987 | Masho et al. | 194/319 |
| 4,718,218 A | 1/1988 | Ristvedt | 53/532 |
| 4,731,043 A | 3/1988 | Ristvedt et al. | 453/6 |
| 4,733,765 A | 3/1988 | Watanabe | 194/206 |
| 4,749,074 A | 6/1988 | Ueki et al. | 194/317 |
| 4,753,624 A | 6/1988 | Adams et al. | 453/10 |
| 4,753,625 A | 6/1988 | Okada | 453/32 |
| 4,765,464 A | 8/1988 | Ristvedt | 206/0.82 |
| 4,766,548 A | 8/1988 | Cedrone et al. | 364/479 |
| 4,775,353 A | 10/1988 | Childers et al. | 453/6 |
| 4,775,354 A | 10/1988 | Rasmussen et al. | 453/10 |
| 4,778,983 A | 10/1988 | Ushikubo | 235/381 |
| 4,803,347 A | 2/1989 | Sugahara et al. | 235/379 |
| 4,804,830 A | 2/1989 | Miyagisima et al. | 235/379 |
| 4,812,629 A | 3/1989 | O'Neil et al. | 235/383 |
| 4,839,505 A | 6/1989 | Bradt et al. | 235/381 |
| 4,844,369 A | 7/1989 | Kanayachi | 242/56 R |
| 4,848,556 A | 7/1989 | Shah et al. | 194/212 |
| 4,863,414 A | 9/1989 | Ristvedt et al. | 453/6 |
| 4,883,158 A | 11/1989 | Kobayashi et al. | 194/217 |
| 4,884,212 A | 11/1989 | Stutsman | 364/479 |
| 4,900,909 A | 2/1990 | Nagashima et al. | 235/487 |
| 4,908,516 A | 3/1990 | West | 250/556 |
| 4,921,463 A | 5/1990 | Primdahl et al. | 453/3 |
| 4,936,435 A | 6/1990 | Griner | 194/317 |
| 4,953,086 A | 8/1990 | Fukatsu | 364/408 |
| 4,954,697 A | 9/1990 | Kokubun et al. | 235/381 |
| 4,964,495 A | 10/1990 | Rasmussen | 194/344 |
| 4,966,570 A | 10/1990 | Ristvedt et al. | 453/6 |
| 4,970,655 A | 11/1990 | Winn et al. | 364/479 |
| 4,971,187 A | 11/1990 | Furuya et al. | 194/318 |
| 4,988,849 A | 1/1991 | Sasaki et al. | 235/379 |
| 4,992,647 A | 2/1991 | Konishi et al. | 235/379 |
| 4,995,848 A | 2/1991 | Goh | 453/3 |
| 5,009,627 A | 4/1991 | Rasmussen | 453/10 |
| 5,010,238 A | 4/1991 | Kadono et al. | 235/379 |
| 5,010,485 A | 4/1991 | Bigari | 364/408 |
| 5,011,455 A | 4/1991 | Rasmussen | 453/10 |
| 5,022,889 A | 6/1991 | Ristvedt et al. | 453/6 |
| 5,025,139 A | 6/1991 | Halliburton, Jr. | 235/379 |
| 5,026,320 A | 6/1991 | Rasmussen | 453/6 |
| 5,031,098 A | 7/1991 | Miller et al. | 364/405 |
| 5,033,602 A | 7/1991 | Saarinen et al. | 194/334 |
| 5,039,848 A | 8/1991 | Stoken | 235/381 |
| 5,055,086 A | 10/1991 | Raterman et al. | 453/10 |
| 5,055,657 A | 10/1991 | Miller et al. | 235/381 |
| 5,064,999 A | 11/1991 | Okamoto et al. | 235/379 |
| 5,080,633 A | 1/1992 | Ristvedt et al. | 435/6 |
| 5,091,713 A | 2/1992 | Horne et al. | 340/541 |
| 5,104,353 A | 4/1992 | Ristvedt et al. | 453/6 |
| 5,105,601 A | 4/1992 | Horiguchi et al. | 53/465 |
| 5,106,338 A | 4/1992 | Rasmussen et al. | 453/10 |
| 5,111,927 A | 5/1992 | Schulze | 194/209 |
| 5,114,381 A | 5/1992 | Ueda et al. | 453/57 |
| 5,120,945 A | 6/1992 | Nishibe et al. | 235/379 |
| 5,123,873 A | 6/1992 | Rasmussen | 453/10 |
| 5,129,205 A | 7/1992 | Rasmussen | 53/52 |
| 5,135,435 A | 8/1992 | Rasmussen | 453/56 |
| 5,140,517 A | 8/1992 | Nagata et al. | 364/408 |
| 5,141,443 A | 8/1992 | Rasmussen et al. | 453/10 |
| 5,141,472 A | 8/1992 | Todd et al. | 453/10 |
| 5,145,455 A | 9/1992 | Todd | 453/6 |
| 5,146,067 A | 9/1992 | Sloan et al. | 235/381 |
| 5,154,272 A | 10/1992 | Nishiumi et al. | 194/318 |
| 5,163,866 A | 11/1992 | Rasmussen | 453/10 |
| 5,163,867 A | 11/1992 | Rasmussen | 453/10 |
| 5,163,868 A | 11/1992 | Adams et al. | 453/11 |
| 5,167,313 A | 12/1992 | Dobbins et al. | 194/317 |
| 5,175,416 A | 12/1992 | Mansvelt et al. | 235/379 |
| 5,176,565 A | 1/1993 | Ristvedt et al. | 453/6 |
| 5,179,517 A | 1/1993 | Sarbin et al. | 364/410 |
| 5,183,142 A | 2/1993 | Latchinian et al. | 194/206 |
| 5,184,709 A | 2/1993 | Nishiumi et al. | 194/318 |
| 5,194,037 A | 3/1993 | Jones et al. | 453/10 |
| 5,197,919 A | 3/1993 | Geib et al. | 453/10 |
| 5,205,780 A | 4/1993 | Rasmussen | 453/10 |
| 5,207,784 A | 5/1993 | Schwartzendruber | 221/6 |
| 5,209,696 A | 5/1993 | Rasmussen et al. | 453/10 |
| 5,236,071 A | 8/1993 | Lee | 194/200 |
| 5,243,174 A | 9/1993 | Veeneman et al. | 235/381 |
| 5,251,738 A | 10/1993 | Dabrowski | 194/206 |
| 5,252,811 A | 10/1993 | Henochowicz et al. | 235/379 |
| 5,253,167 A | 10/1993 | Yoshida et al. | 364/408 |
| 5,263,566 A | 11/1993 | Nara et al. | 194/318 |
| 5,265,874 A | 11/1993 | Dickinson et al. | 273/138 A |
| 5,268,561 A | 12/1993 | Kimura et al. | 235/384 |
| 5,277,651 A | 1/1994 | Rasmussen et al. | 453/10 |
| 5,282,127 A | 1/1994 | Mii | 364/130 |
| 5,286,226 A | 2/1994 | Rasmussen | 453/10 |
| 5,286,954 A | 2/1994 | Sato et al. | 235/379 |
| 5,291,003 A | 3/1994 | Avnet et al. | 235/381 |
| 5,291,560 A | 3/1994 | Daugman | 382/2 |
| 5,293,981 A | 3/1994 | Abe et al. | 194/345 |

| Patent | Kind | Date | Inventor | Class |
|---|---|---|---|---|
| 5,297,030 | A | 3/1994 | Vassigh et al. | 364/405 |
| 5,297,598 | A * | 3/1994 | Rasmussen | 141/314 |
| 5,297,986 | A | 3/1994 | Ristvedt et al. | 453/6 |
| 5,299,977 | A | 4/1994 | Mazur et al. | 453/10 |
| 5,324,922 | A | 6/1994 | Roberts | 235/375 |
| 5,326,104 | A | 7/1994 | Pease et al. | 273/138 A |
| 5,370,575 | A | 12/1994 | Geib et al. | 453/3 |
| 5,372,542 | A | 12/1994 | Geib et al. | 453/10 |
| 5,374,814 | A | 12/1994 | Kako et al. | 235/379 |
| 5,379,344 | A | 1/1995 | Larson et al. | 380/23 |
| 5,379,875 | A | 1/1995 | Shames et al. | 194/317 |
| 5,382,191 | A | 1/1995 | Rasmussen | 453/11 |
| 5,390,776 | A | 2/1995 | Thompson | 194/346 |
| 5,401,211 | A | 3/1995 | Geib et al. | 453/10 |
| 5,404,986 | A | 4/1995 | Hossfield et al. | 194/317 |
| 5,410,590 | A | 4/1995 | Blood et al. | 379/147 |
| RE34,934 | E | 5/1995 | Raterman et al. | 453/10 |
| 5,425,669 | A | 6/1995 | Geib et al. | 453/10 |
| 5,429,550 | A | 7/1995 | Mazur et al. | 453/10 |
| 5,440,108 | A | 8/1995 | Tran et al. | 235/381 |
| 5,443,419 | A * | 8/1995 | Adams et al. | 453/17 |
| 5,450,938 | A | 9/1995 | Rademacher | 194/206 |
| 5,453,047 | A | 9/1995 | Mazur et al. | 453/10 |
| 5,468,182 | A | 11/1995 | Geib | 453/10 |
| 5,470,079 | A | 11/1995 | LeStrange et al. | 273/138 A |
| 5,474,495 | A | 12/1995 | Geib et al. | 453/3 |
| 5,474,497 | A | 12/1995 | Jones et al. | 453/17 |
| 5,480,348 | A | 1/1996 | Mazur et al. | 453/10 |
| 5,489,237 | A | 2/1996 | Geib et al. | 453/12 |
| 5,500,514 | A | 3/1996 | Veeneman et al. | 235/381 |
| 5,501,631 | A | 3/1996 | Mennie et al. | 453/3 |
| 5,507,379 | A | 4/1996 | Mazur et al. | 194/318 |
| 5,514,034 | A | 5/1996 | Jones et al. | 453/10 |
| 5,520,577 | A | 5/1996 | Rasmussen | 453/56 |
| 5,538,468 | A | 7/1996 | Ristvedt et al. | 453/3 |
| 5,542,880 | A | 8/1996 | Geib et al. | 453/10 |
| 5,542,881 | A | 8/1996 | Geib | 453/10 |
| 5,553,320 | A | 9/1996 | Matsuura et al. | 235/379 |
| 5,559,887 | A | 9/1996 | Davis et al. | 380/24 |
| 5,564,546 | A | 10/1996 | Molbak et al. | 194/216 |
| 5,564,974 | A | 10/1996 | Mazur et al. | 453/10 |
| 5,564,978 | A | 10/1996 | Jones et al. | 453/17 |
| 5,570,465 | A | 10/1996 | Tsakanikas | 395/114 |
| 5,573,457 | A | 11/1996 | Watts et al. | 453/31 |
| 5,584,758 | A | 12/1996 | Geib | 453/10 |
| 5,592,377 | A | 1/1997 | Lipkin | 395/242 |
| 5,602,933 | A | 2/1997 | Blackwell et al. | 382/116 |
| 5,620,079 | A | 4/1997 | Molbak | 194/317 |
| 5,623,547 | A | 4/1997 | Jones et al. | 380/24 |
| 5,625,562 | A | 4/1997 | Veeneman et al. | 364/479.05 |
| 5,630,494 | A | 5/1997 | Strauts | 194/317 |
| 5,641,050 | A | 6/1997 | Smith et al. | 194/210 |
| 5,650,605 | A | 7/1997 | Morioka et al. | 235/379 |
| 5,650,761 | A | 7/1997 | Gomm et al. | 235/381 |
| 5,652,421 | A | 7/1997 | Veeneman et al. | 235/381 |
| 5,665,952 | A | 9/1997 | Ziarno | 235/380 |
| 5,679,070 | A | 10/1997 | Ishida et al. | 453/41 |
| 5,684,597 | A | 11/1997 | Hossfield et al. | 356/384 |
| 5,696,366 | A | 12/1997 | Ziarno | 235/380 |
| 5,743,373 | A | 4/1998 | Strauts | 194/318 |
| 5,746,299 | A | 5/1998 | Molbak et al. | 194/200 |
| 5,774,874 | A | 6/1998 | Veeneman et al. | 705/27 |
| 5,782,686 | A | 7/1998 | Geib et al. | 453/10 |
| 5,799,767 | A | 9/1998 | Molbak | 194/217 |
| 5,813,510 | A | 9/1998 | Rademacher | 194/206 |
| 5,823,315 | A | 10/1998 | Hoffman et al. | 194/203 |
| 5,830,054 | A | 11/1998 | Petri | 453/5 |
| 5,838,812 | A | 11/1998 | Pare, Jr. et al. | 382/115 |
| 5,842,188 | A | 11/1998 | Ramsey et al. | 705/416 |
| 5,842,916 | A | 12/1998 | Gerrity et al. | 453/57 |
| 5,850,076 | A | 12/1998 | Morioka et al. | 235/379 |
| 5,854,581 | A | 12/1998 | Mori et al. | 235/379 |
| 5,865,673 | A | 2/1999 | Geib et al. | 453/10 |
| 5,880,444 | A | 3/1999 | Shibata et al. | 235/379 |
| 5,892,211 | A | 4/1999 | Davis et al. | 235/380 |
| 5,892,827 | A | 4/1999 | Beach et al. | 380/24 |
| 5,909,793 | A | 6/1999 | Beach et al. | 194/210 |
| 5,909,794 | A | 6/1999 | Molbak et al. | 194/216 |
| 5,913,399 | A | 6/1999 | Takemoto et al. | 194/200 |
| 5,918,748 | A | 7/1999 | Clark et al. | 209/534 |
| 5,940,623 | A | 8/1999 | Watts et al. | 395/712 |
| 5,944,600 | A | 8/1999 | Zimmermann | 435/10 |
| 5,951,476 | A | 9/1999 | Beach et al. | 600/437 |
| 5,957,262 | A | 9/1999 | Molbak et al. | 194/200 |
| 5,988,348 | A | 11/1999 | Martin et al. | 194/317 |
| 5,995,949 | A | 11/1999 | Morioka et al. | 705/43 |
| 5,997,395 | A | 12/1999 | Geib et al. | 453/10 |
| 6,017,270 | A | 1/2000 | Ristvedt et al. | 453/5 |
| 6,021,883 | A | 2/2000 | Casanova et al. | 194/217 |
| 6,032,859 | A | 3/2000 | Muehlberger et al. | 235/449 |
| 6,039,644 | A | 3/2000 | Geib et al. | 453/10 |
| 6,039,645 | A | 3/2000 | Mazur | 453/10 |
| 6,042,470 | A * | 3/2000 | Geib et al. | 453/10 |
| 6,047,807 | A | 4/2000 | Molbak | 194/217 |
| 6,047,808 | A | 4/2000 | Neubarth et al. | 194/317 |
| 6,056,104 | A | 5/2000 | Neubarth et al. | 194/317 |
| 6,080,056 | A | 6/2000 | Karlsson | 453/3 |
| 6,082,519 | A | 7/2000 | Martin et al. | 194/350 |
| 6,086,471 | A | 7/2000 | Zimmermann | 453/3 |
| 6,095,313 | A | 8/2000 | Molbak et al. | 194/344 |
| 6,116,402 | A | 9/2000 | Beach et al. | 194/216 |
| 6,131,625 | A | 10/2000 | Casanova et al. | 141/314 |
| 6,139,418 | A | 10/2000 | Geib et al. | 453/10 |
| 6,142,285 | A | 11/2000 | Panzeri et al. | 194/328 |
| 6,145,738 | A | 11/2000 | Stinson et al. | 235/379 |
| 6,154,879 | A | 11/2000 | Pare, Jr. et al. | 902/3 |
| 6,168,001 | B1 | 1/2001 | Davis | 194/200 |
| 6,171,182 | B1 | 1/2001 | Geib et al. | 453/10 |
| 6,174,230 | B1 | 1/2001 | Gerrity et al. | 453/57 |
| 6,196,371 | B1 | 3/2001 | Martin et al. | 194/317 |
| 6,196,913 | B1 | 3/2001 | Geib et al. | 453/10 |
| 6,202,006 | B1 * | 3/2001 | Scott | 700/231 |
| 6,230,928 | B1 | 5/2001 | Hanna et al. | 221/13 |
| 6,264,545 | B1 | 7/2001 | Magee et al. | 453/3 |
| 6,308,887 | B1 | 10/2001 | Korman et al. | 235/379 |
| 6,318,536 | B1 | 11/2001 | Korman et al. | 194/217 |
| 6,318,537 | B1 | 11/2001 | Jones et al. | 194/346 |
| 6,349,972 | B1 | 2/2002 | Geiger et al. | 283/67 |
| 6,412,620 | B1 | 7/2002 | Imura | 194/317 |
| 6,431,342 | B1 | 8/2002 | Schwartz | 194/346 |
| 6,438,230 | B1 | 8/2002 | Moore | 380/42 |
| 6,456,928 | B1 | 9/2002 | Johnson | 701/114 |
| 6,471,030 | B1 | 10/2002 | Neubarth et al. | 194/317 |
| 6,474,548 | B1 | 11/2002 | Montross et al. | 235/379 |
| 6,484,863 | B1 | 11/2002 | Molbak | 194/216 |
| 6,484,884 | B1 | 11/2002 | Gerrity et al. | 209/233 |
| 6,494,776 | B1 | 12/2002 | Molbak | 453/32 |
| 6,499,277 | B1 | 12/2002 | Warner et al. | 53/447 |
| 6,503,138 | B2 | 1/2003 | Spoehr et al. | 453/10 |
| 6,520,308 | B1 | 2/2003 | Martin et al. | 194/317 |
| 6,522,772 | B1 | 2/2003 | Morrison et al. | 382/124 |
| 6,547,131 | B1 | 4/2003 | Foodman et al. | 235/380 |
| 6,552,781 | B1 | 4/2003 | Rompel et al. | 256/71 |
| 6,554,185 | B1 | 4/2003 | Montross et al. | 235/379 |
| 6,579,165 | B2 | 6/2003 | Kuhlin et al. | 453/3 |
| 6,581,042 | B2 | 6/2003 | Pare, Jr. et al. | 705/40 |
| 6,602,125 | B2 | 8/2003 | Martin | 453/12 |
| 6,609,604 | B1 | 8/2003 | Jones et al. | 194/302 |
| 6,612,921 | B2 | 9/2003 | Geib et al. | 453/13 |
| 6,637,576 | B1 | 10/2003 | Jones et al. | 194/216 |
| 6,640,956 | B1 | 11/2003 | Zwieg et al. | 194/328 |
| 6,644,696 | B2 | 11/2003 | Brown et al. | 283/67 |
| 6,655,585 | B2 | 12/2003 | Shinn | 235/382 |
| 6,659,259 | B2 | 12/2003 | Knox et al. | 194/217 |
| 6,662,166 | B2 | 12/2003 | Pare, Jr. et al. | 705/39 |
| 6,663,675 | B2 | 12/2003 | Blake et al. | 753/63 |
| 6,666,318 | B2 | 12/2003 | Gerrity et al. | 194/347 |
| 6,755,730 | B2 | 6/2004 | Geib et al. | 453/3 |
| 6,758,316 | B2 | 7/2004 | Molbak | 194/200 |
| 6,761,308 | B1 | 7/2004 | Hanna et al. | 235/379 |
| 6,766,892 | B2 | 7/2004 | Martin et al. | 194/317 |
| 6,783,452 | B2 | 8/2004 | Hino et al. | 453/3 |
| 6,783,785 | B1 | 8/2004 | Raghavan et al. | 426/489 |
| 6,786,398 | B1 | 9/2004 | Stinson et al. | 235/379 |
| 6,854,581 | B2 | 2/2005 | Molbak | 194/344 |
| 6,854,640 | B2 | 2/2005 | Peklo | 235/100 |
| 6,863,168 | B1 | 3/2005 | Gerrity et al. | 194/347 |
| 6,892,871 | B2 | 5/2005 | Strauts et al. | 194/302 |

| 6,896,118 B2 | 5/2005 | Jones et al. | 194/217 |
|---|---|---|---|
| 6,928,546 B1 | 8/2005 | Nanavati et al. | 713/186 |
| 6,950,810 B2 | 9/2005 | Lapsley et al. | 705/78 |
| 6,953,150 B2 | 10/2005 | Shepley et al. | 235/379 |
| 6,957,746 B2 | 10/2005 | Martin et al. | 221/131 |
| 6,966,417 B2 | 11/2005 | Peklo et al. | 194/344 |
| 6,976,570 B2 | 12/2005 | Molbak | 194/215 |
| 6,988,606 B2 | 1/2006 | Geib et al. | 194/334 |
| 6,991,530 B2 | 1/2006 | Hino et al. | 453/3 |
| 7,004,831 B2 | 2/2006 | Hino et al. | 453/5 |
| 7,014,029 B2 | 3/2006 | Winters | 194/302 |
| 7,014,108 B2 | 3/2006 | Sorenson et al. | 235/381 |
| 7,017,729 B2 | 3/2006 | Gerrity et al. | 194/347 |
| 7,018,286 B2 | 3/2006 | Blake et al. | 453/61 |
| 7,028,827 B1 | 4/2006 | Molbak et al. | 194/346 |
| 7,036,651 B2 | 5/2006 | Tam et al. | 194/217 |
| 7,083,036 B2 | 8/2006 | Adams | 194/223 |
| 7,113,929 B1 | 9/2006 | Beach et al. | 705/65 |
| 7,131,580 B2 | 11/2006 | Molbak | 235/379 |
| 7,149,336 B2 | 12/2006 | Jones et al. | 382/135 |
| 7,152,727 B2 | 12/2006 | Waechter | 194/317 |
| 7,158,662 B2 | 1/2007 | Chiles | 382/135 |
| 7,188,720 B2 | 3/2007 | Geib et al. | 194/302 |
| 7,213,697 B2 | 5/2007 | Martin et al. | 194/317 |
| 7,243,773 B2 | 7/2007 | Bochonok et al. | 194/350 |
| 7,269,279 B2 | 9/2007 | Chiles | 382/135 |
| 7,303,119 B2 | 12/2007 | Molbak | 235/379 |
| 7,331,521 B2 | 2/2008 | Sorenson et al. | 235/381 |
| 7,337,890 B2 | 3/2008 | Bochonok et al. | 194/353 |
| 7,427,230 B2 | 9/2008 | Blake et al. | 453/63 |
| 7,438,172 B2 | 10/2008 | Long et al. | 194/347 |
| 7,464,802 B2 | 12/2008 | Gerrity et al. | 194/347 |
| 7,520,374 B2 | 4/2009 | Martin et al. | 194/317 |
| 7,551,764 B2 | 6/2009 | Chiles et al. | 382/135 |
| 7,552,810 B2 | 6/2009 | Mecklenburg | 194/317 |
| 7,580,859 B2 | 8/2009 | Economy | 705/16 |
| 7,654,450 B2 | 2/2010 | Mateen et al. | 235/379 |
| 7,658,270 B2 | 2/2010 | Bochonok et al. | 194/350 |
| 7,743,902 B2 | 6/2010 | Wendell et al. | 194/302 |
| 7,778,456 B2 | 8/2010 | Jones et al. | 382/135 |
| 7,819,308 B2 | 10/2010 | Osterberg et al. | 235/379 |
| 7,874,478 B2 | 1/2011 | Molbak | 235/379 |
| 7,886,980 B2 | 2/2011 | Nishimura et al. | 194/347 |
| 7,931,304 B2 | 4/2011 | Brown et al. | 283/57 |
| 7,946,406 B2 | 5/2011 | Blake et al. | 194/200 |
| 7,963,382 B2 | 6/2011 | Wendell et al. | 194/302 |
| 7,980,378 B2 | 7/2011 | Jones et al. | 194/217 |
| 8,023,715 B2 | 9/2011 | Jones et al. | 382/135 |
| 8,042,732 B2 | 10/2011 | Blake et al. | 235/375 |
| 2001/0034203 A1 | 10/2001 | Geib et al. | 453/3 |
| 2001/0048025 A1 | 12/2001 | Shinn | 235/382 |
| 2002/0065033 A1 | 5/2002 | Geib et al. | 453/3 |
| 2002/0069104 A1 | 6/2002 | Beach et al. | 705/14 |
| 2002/0074209 A1 | 6/2002 | Karlsson | 194/330 |
| 2002/0095587 A1 | 7/2002 | Doyle et la. | 713/186 |
| 2002/0107738 A1 | 8/2002 | Beach et al. | 705/14 |
| 2002/0126885 A1 | 9/2002 | Mennie et al. | 382/135 |
| 2002/0130011 A1 | 9/2002 | Casanova et al. | 194/344 |
| 2002/0147588 A1 | 10/2002 | Davis et al. | 704/246 |
| 2002/0151267 A1 | 10/2002 | Kuhlin et al. | 453/3 |
| 2002/0174348 A1 | 11/2002 | Ting | 713/186 |
| 2002/0179401 A1 | 12/2002 | Knox et al. | 194/217 |
| 2003/0004878 A1 | 1/2003 | Akutsu et al. | 705/43 |
| 2003/0013403 A1 | 1/2003 | Blake et al. | 453/60 |
| 2003/0081824 A1 | 5/2003 | Mennie et al. | 382/135 |
| 2003/0127299 A1 | 7/2003 | Jones et al. | 194/217 |
| 2003/0168309 A1 | 9/2003 | Geib et al. | 194/302 |
| 2003/0168310 A1 | 9/2003 | Strauts et al. | 194/302 |
| 2003/0182217 A1 | 9/2003 | Chiles | 705/35 |
| 2003/0190882 A1 | 10/2003 | Blake et al. | 453/63 |
| 2003/0234153 A1 | 12/2003 | Blake et al. | 194/347 |
| 2004/0055902 A1 | 3/2004 | Peklo | 206/0.815 |
| 2004/0092222 A1 | 5/2004 | Kowalczyk et al. | 453/12 |
| 2004/0153406 A1 | 8/2004 | Alarcon-Luther et al. | 705/41 |
| 2004/0153421 A1 | 8/2004 | Robinson | 705/75 |
| 2004/0154899 A1 | 8/2004 | Peklo et al. | 193/33 |
| 2004/0173432 A1 | 9/2004 | Jones | 194/216 |
| 2004/0188221 A1 | 9/2004 | Carter | 194/215 |
| 2004/0200691 A1 | 10/2004 | Geib et al. | 194/302 |
| 2004/0256197 A1* | 12/2004 | Blake et al. | 194/350 |
| 2005/0006197 A1 | 1/2005 | Wendell et al. | 194/302 |
| 2005/0035140 A1 | 2/2005 | Carter | 221/195 |
| 2005/0040007 A1 | 2/2005 | Geib et al. | 194/302 |
| 2005/0045450 A1 | 3/2005 | Geib et al. | 194/318 |
| 2005/0067305 A1 | 3/2005 | Bochonok et al. | 206/8 |
| 2005/0077142 A1 | 4/2005 | Tam et al. | 194/217 |
| 2005/0087425 A1 | 4/2005 | Peklo | 194/350 |
| 2005/0108165 A1 | 5/2005 | Jones et al. | 705/43 |
| 2005/0109836 A1 | 5/2005 | Ben-Aissa | 235/380 |
| 2005/0124407 A1 | 6/2005 | Rowe | 463/25 |
| 2005/0156318 A1 | 7/2005 | Douglas | 257/761 |
| 2005/0205654 A1 | 9/2005 | Carter | 235/7 R |
| 2005/0205655 A1 | 9/2005 | Carter | 235/7 R |
| 2005/0228717 A1 | 10/2005 | Gusler et al. | 705/14 |
| 2005/0256792 A1 | 11/2005 | Shimizu et al. | 705/35 |
| 2006/0037835 A1 | 2/2006 | Doran et al. | 194/302 |
| 2006/0054455 A1 | 3/2006 | Kuykendall et al. | 194/217 |
| 2006/0054457 A1 | 3/2006 | Long et al. | 194/347 |
| 2006/0060363 A2 | 3/2006 | Carter | 172/111 |
| 2006/0064379 A1 | 3/2006 | Doran et al. | 705/42 |
| 2006/0069654 A1 | 3/2006 | Beach et al. | 705/65 |
| 2006/0148394 A1 | 7/2006 | Blake et al. | 453/12 |
| 2006/0149415 A1 | 7/2006 | Richards | 700/236 |
| 2006/0151285 A1 | 7/2006 | String | 194/350 |
| 2006/0154589 A1 | 7/2006 | String | 453/11 |
| 2006/0175176 A1 | 8/2006 | Blake | 194/216 |
| 2006/0182330 A1 | 8/2006 | Chiles | 382/135 |
| 2006/0196754 A1 | 9/2006 | Bochonok et al. | 194/347 |
| 2006/0205481 A1 | 9/2006 | Dominelli | 463/25 |
| 2006/0207856 A1 | 9/2006 | Dean et al. | 194/302 |
| 2006/0219519 A1 | 10/2006 | Molbak et al. | 194/346 |
| 2006/0283685 A1 | 12/2006 | Cousin | 194/217 |
| 2007/0051582 A1 | 3/2007 | Bochonok et al. | 194/202 |
| 2007/0071302 A1 | 3/2007 | Jones et al. | 382/135 |
| 2007/0108015 A1 | 5/2007 | Bochonok et al. | 194/350 |
| 2007/0119681 A1* | 5/2007 | Blake et al. | 194/215 |
| 2007/0181676 A1 | 8/2007 | Mateen et al. | 235/381 |
| 2007/0187494 A1 | 8/2007 | Hanna | 235/383 |
| 2007/0221470 A1 | 9/2007 | Mennie et al. | 194/216 |
| 2007/0269097 A1 | 11/2007 | Chiles et al. | 382/135 |
| 2008/0033829 A1 | 2/2008 | Mennie et al. | 705/16 |
| 2008/0044077 A1 | 2/2008 | Mennie et al. | 382/135 |
| 2008/0220707 A1 | 9/2008 | Jones et al. | 453/2 |
| 2009/0018959 A1 | 1/2009 | Doran et al. | 705/44 |
| 2009/0236200 A1 | 9/2009 | Hallowell et al. | 194/215 |
| 2009/0236201 A1 | 9/2009 | Blake et al. | 194/215 |
| 2009/0239459 A1 | 9/2009 | Watts et al. | 453/18 |
| 2009/0242626 A1* | 10/2009 | Jones et al. | 235/379 |
| 2009/0320106 A1 | 12/2009 | Jones et al. | 726/5 |
| 2010/0038419 A1 | 2/2010 | Blake et al. | 235/379 |
| 2010/0198726 A1 | 8/2010 | Doran et al. | 705/41 |
| 2010/0261421 A1 | 10/2010 | Wendell et al. | 453/4 |
| 2010/0276485 A1 | 11/2010 | Jones et al. | 235/379 |
| 2010/0327005 A1 | 12/2010 | Martin et al. | 221/98 |
| 2011/0098845 A1 | 4/2011 | Blake et al. | 700/223 |
| 2011/0099105 A1 | 4/2011 | Mennie et al. | 705/41 |
| 2011/0270695 A1 | 11/2011 | Jones et al. | 705/43 |

FOREIGN PATENT DOCUMENTS

| CA | 2143943 C | 3/2003 |
|---|---|---|
| DE | 06 60 354 | 5/1938 |
| DE | 30 21 327 A1 | 12/1981 |
| EP | 0 351 217 A2 | 1/1990 |
| EP | 0 667 973 B1 | 1/1997 |
| EP | 0 926 634 A2 | 6/1999 |
| EP | 1 104 920 A1 | 6/2001 |
| EP | 1 209 639 A2 | 5/2002 |
| EP | 1 528 513 A1 | 5/2005 |
| FR | 2042254 | 2/1971 |
| GB | 2035642 A | 6/1980 |
| GB | 2175427 A | 11/1986 |
| GB | 2198274 A | 6/1988 |
| GB | 2458387 A | 9/2009 |
| GB | 2468783 A | 9/2010 |
| JP | 49-058899 | 6/1974 |
| JP | 52-014495 | 2/1977 |
| JP | 52-071300 A | 6/1977 |
| JP | 56-040992 A | 4/1981 |

| | | |
|---|---|---|
| JP | 57-117080 A | 7/1982 |
| JP | 59-079392 A | 5/1984 |
| JP | 60-016271 U | 2/1985 |
| JP | 62-134168 U | 8/1987 |
| JP | 62-182995 A | 8/1987 |
| JP | 62-221773 A | 9/1987 |
| JP | 62-166562 U | 10/1987 |
| JP | 64-035683 A | 2/1989 |
| JP | 64-042789 A | 2/1989 |
| JP | 64-067698 A | 3/1989 |
| JP | 01-118995 A | 5/1989 |
| JP | 01-307891 A | 12/1989 |
| JP | 02-050793 A | 2/1990 |
| JP | 02-252096 A | 10/1990 |
| JP | 03-012776 A | 1/1991 |
| JP | 03-063795 A | 3/1991 |
| JP | 03-092994 A | 4/1991 |
| JP | 03-156673 A | 7/1991 |
| JP | 04-085695 A | 3/1992 |
| JP | 04-175993 A | 6/1992 |
| JP | 05-046839 A | 2/1993 |
| JP | 05-217048 A | 8/1993 |
| JP | 05-274527 A | 10/1993 |
| JP | 06-035946 A | 2/1994 |
| JP | 06-103285 A | 4/1994 |
| JP | 09-251566 A | 9/1997 |
| JP | 2002-117439 A | 4/2002 |
| JP | 2003-242287 A | 8/2003 |
| JP | 2004-213188 A | 7/2004 |
| SE | 44 244 | 9/1988 |
| WO | WO 85/00909 A1 | 2/1985 |
| WO | WO 91/06927 A1 | 5/1991 |
| WO | WO 91/08952 A1 | 6/1991 |
| WO | WO 91/12594 A1 | 8/1991 |
| WO | WO 91/18371 A1 | 11/1991 |
| WO | WO 92/08212 A1 | 5/1992 |
| WO | WO 92/20043 A1 | 11/1992 |
| WO | WO 92/20044 A1 | 11/1992 |
| WO | WO 92/22044 A1 | 12/1992 |
| WO | WO 93/00660 A1 | 1/1993 |
| WO | WO 93/09621 A1 | 5/1993 |
| WO | WO 94/06101 A1 | 3/1994 |
| WO | WO 94/08319 A1 | 4/1994 |
| WO | WO 94/23397 A1 | 10/1994 |
| WO | WO 95/02226 A1 | 1/1995 |
| WO | WO 95/04978 A1 | 2/1995 |
| WO | WO 95/06920 A1 | 3/1995 |
| WO | WO 95/09406 A1 | 4/1995 |
| WO | WO 95/13596 A1 | 5/1995 |
| WO | WO 95/19017 A1 | 7/1995 |
| WO | WO 95/23387 A1 | 8/1995 |
| WO | WO 96/07163 A1 | 3/1996 |
| WO | WO 96/07990 A1 | 3/1996 |
| WO | WO 96/12253 A1 | 4/1996 |
| WO | WO 96/27525 A1 | 9/1996 |
| WO | WO 96/27859 A1 | 9/1996 |
| WO | WO 97/25692 A1 | 7/1997 |
| WO | WO 98/24041 A1 | 6/1998 |
| WO | WO 98/24067 A1 | 6/1998 |
| WO | WO 98/48383 A2 | 10/1998 |
| WO | WO 98/48384 A2 | 10/1998 |
| WO | WO 98/48385 A2 | 10/1998 |
| WO | WO 98/51082 A1 | 11/1998 |
| WO | WO 98/59323 A1 | 12/1998 |
| WO | WO 99/00776 A1 | 1/1999 |
| WO | WO 99/06937 A1 | 2/1999 |
| WO | WO 99/33030 A1 | 7/1999 |
| WO | WO 99/41695 A1 | 8/1999 |
| WO | WO 99/48057 A1 | 9/1999 |
| WO | WO 99/48058 A1 | 9/1999 |
| WO | WO 00/48911 A1 | 8/2000 |
| WO | WO 00/65546 A1 | 11/2000 |
| WO | WO 01/63565 A2 | 8/2001 |
| WO | WO 02/071343 A1 | 9/2002 |
| WO | WO 03/052700 A2 | 6/2003 |
| WO | WO 03/079300 A1 | 9/2003 |
| WO | WO 03/085610 A1 | 10/2003 |
| WO | WO 03/107280 A2 | 12/2003 |
| WO | WO 2004/044853 A1 | 5/2004 |
| WO | WO 2005/041134 A2 | 5/2005 |
| WO | WO 2005/088563 A1 | 9/2005 |
| WO | WO 2006/086531 A1 | 8/2006 |
| WO | WO 2007/035420 A2 | 3/2007 |
| WO | WO 2007/120825 A2 | 10/2007 |

OTHER PUBLICATIONS

AUI: Coinverter —"No More Lines . . . Self-Serve Cash-Out," by Cassius Elston, 1995 World Games Congress/Exposition Converter, 1 page (dated prior to 1995).
Brandt: 95 Series Coin Sorter Counter, 2 pages (1982).
Brandt: Model 817 Automated Coin and Currency Ordering System, 2 pages (1983).
Brandt: Model 920/925 Counter, 2 pages (date unknown, prior to Jul. 2011, possibly prior to Mar. 17, 1993).
Brandt: System 930 Electric Counter/Sorter, "Solving Problems, Pleasing Customer, Building Deposits," 1 page (date unknown, prior to Mar. 2, 2011, possibly prior to Mar. 17, 1997).
Brandt: Model 940-6 High Speed Sorter/Counter, 2 pages (date unknown, prior to Oct. 31, 1989).
Brandt: System 945 High-Speed Sorter, 2 pages (date unknown, prior to Mar. 2, 2011, possibly prior to Mar. 17, 1997).
Brandt: Model 952 Coin Sorter/Counter, 2 pages (date unknown, prior to Oct. 31, 1989).
Brandt: Model 954 Coin Sorter/Counter, 2 pages (date unknown, prior to Oct. 31, 1989).
Brandt: Model 957 Coin Sorter/Counter, 2 pages (date unknown, prior to Oct. 31, 1989).
Brandt: Model 958 Coin Sorter/Counter, 5 pages (©1982).
Brandt: Model 960 High-Speed Coin Sorter & Counter, 2 pages (1984).
Brandt; Model 966 Microsort™ Coin Sorter and Counter, 4 pages, (1979).
Brandt: Model 970 Coin Sorter and Counter, 2 pages (1983).
Brandt: Model 1205 Coin Sorter Counter, 2 pages (1986).
Brandt: Model 1400 Coin Sorter Counter, 2 pages (date unknown, prior to Mar. 2, 2011, possibly prior to Mar. 17, 1997).
Brandt: Model 8904 Upfeed—"High Speed 4-Denomination Currency Dispenser," 2 pages (1989).
Brandt: Mach 7 High-Speed Coin Sorter/Counter, 2 pages (1992).
Case ICC Limited: CDS Automated Receipt Giving Cash Deposit System, 3 pages (date unknown, prior to Nov. 15, 2000).
Cash, Martin: Newspaper Article "Bank Blends New Technology With Service," Winnipeg Free Press, 1 page (Sep. 4, 1992).
Childers Corporation: Computerized Sorter/Counter, "To coin an old adage, time is money . . . ," 3 pages (1981).
CTcoin: CDS602 Cash Deposit System, 1 page (date unknown, prior to Jan. 15, 2011).
Cummins: Cash Information and Settlement Systems (Form 023-1408), 4 pages (date Dec. 1991).
Cummins: The Universal Solution to All Coin and Currency Processing Needs (Form 13C1218 3-83), 1 page (Mar. 1983).
Cummins: JetSort® High Speed Sorter/Counter Kits I & J—Operating Instructions (Form 022-7123-00) 12 pages (1994).
Cummins: JetSort® Coin Sorter Counter/CA-130XL Coin Wrapper, Cummins Automated Money Systems (AMS) Case Study—Fifth-Third, "6,000 Coin Per Minute Counter/Sorter Keeps pace With Fifth-Third Bank's Money Processing Needs," (Form 13C1180), 2 pages (Nov. 1981).
Cummins: JetSort®, "Venders Love JetSort," (13C1255), 1 page (Mar. 1987).
Cummins: JetSort® "High Speed Coin Sorter & Counter for Payphone Applications," "CTOCS Ready" (Form 023-1365), 2 pages (Mar. 1989).
Cummins: JetSort® mailer, "One moving part simplicity," "Vendors—Are validators changing your coin and currency needs?" (Form 023-1297), 3 pages (Apr. 1987).
Cummins: JetSort® Series V High Speed Coin Sorter/Counter, (Form 023-1383), 2 pages (Sep. 1990).
Cummins: JetSort® "Time for a Change, Be a smashing success!," (Form 023-1328), 1 page (Jun. 1988).

Cummins: JetSort® "Time for a Change—JetSort®vs. Brandt X," (Form 023-1330), 1 page (Jun. 1988).
Cummins: JetSort® "Time for a Change—No Coins Sorted After 3:00 or on Saturday," (Form 023-1327), 1 page (Aug. 1988).
Cummins: JetSort®, "What do all these Banks have in Common . . .?", JetSort, CA-130XL coin wrapper, CA-118 coin wrapper, CA-4000 JetCount, (13C1203), 3 pages (Aug. 1982).
Cummins: JetSort® 700-01/CA-118 Coin Wrapper, Cummins Automated Money Systems (AMS) Case Study—University State Bank, "Cummins Money Processing System Boosts Teller Service at University State Bank," (Form 13C1192), 2 pages (Mar. 1982).
Cummins: JetSort® 700-01, Cummins Automated Money Systems (AMS) Case Study—First State Bank of Oregon, "JetSort® Gives Bank Coin Service Edge," (Form 13C1196), 2 pages (Apr. 1982).
Cummins: JetSort® 700-01 Coin Sorter/Counter, Operating Instructions, 14 pages (1982).
Cummins: JetSort® 701, Cummins Automated Money Systems (AMS) Case Study—Convenco Vending, "High Speed Coin Sorter increases coin processing power at Convenco Vending," (Form 13C1226), 2 pages (Jul. 1983).
Cummins: JetSort Models 701 and 750 , "State-of-the-art coin processing comes of age," 2 pages (Feb. 1984).
Cummins: JetSort® Model CA-750 Coin Processor (Item No. 50-152), 1 page (Jul. 1984).
Cummins: JetSort® Model CA-750 Coin Sorter/Counter and CA-4050 JetCount currency counter, "Money Processing Made Easy," (Form 13C1221) 2 pages (Jun. 1983).
Cummins: JetSort® Model 1701 with JetStops, Operating Instructions Manual (Form 022-1329-00), 16 pages (1984).
Cummins: JetSort® Model 1760 brochure, (Form 023-1262-00), 2 pages (Jul. 1985).
Cummins: JetSort® Models 1770 and 3000, Communication Package specification and operating instructions, 10 pages (uncertain, possibly Nov. 1985).
Cummins: JetSort® Model 1770, "JetSort® Speed and Accuracy, Now with Communications!", (Form 023-1272) 1 page (Oct. 1986).
Cummins: JetSort® 2000 Series High Speed Coin Sorter/Counter (Form 023-1488), 2 pages (Oct. 2000).
Cummins: JetSort®3000 Series High Speed Coin Sorter (Form 023-1468 Rev 1), 2 pages (Feb. 1995).
Cummins: JetSort®3000 Series Options, "Talking JetSort 3000," (Form 023-1338-00), 1 page (between Jan.-Feb. 1989).
Cummins: JetSort®3000, "3,000 Coins per Minute!," (Form 023-1312), 1 page (date unknown, est. 1987).
Cummins: JetSort®3200, Enhanced electronics for the JetSort® 3200 (Form 023-1350), 1 page (Apr. 1987).
De La Rue: CDS 500 Cash Deponier System, 6 pages (date unknown, p. 5 has date May 1994, p. 6 has date Dec. 1992) (German).
De La Rue: CDS 5700 and CDS 5800 Cash Deponier System (German) and translation, 7 pages (date unknown, prior to Aug. 13, 1996).
Diebold: Merchant MicroBranch, "Merchant MicroBranch Combines ATM After-Hour Depository Rolled-Coin Dispenser," Bank Technology News, 1 page (Nov. 1997).
Fa. GBS-Geldbearbeitungssysteme: GBS9401SB Technical Specification, 24 pages (date unknown, prior to Nov. 10, 2000).

Frisco Bay: Commercial Kiosk, "Provide self-service solutions for your business customers," 4 pages (date unknown, prior to Mar. 2, 2011, p. 4 has date 1996).
Glory: AMT Automated Merchant Teller, 4 pages (date unknown, prior to Jan. 15, 2001).
Glory: CRS-8000 Cash Redemption System, 2 pages (1996).
Hamilton: Hamilton's Express Banking Center, in Less Space Than a Branch Manager's Desk, 4 pages (date unknown, prior to Jan. 15, 2001).
ISH Electronic: ISH 12005/500 Coin Counter (with translation), 4 pages (date unknown, prior to Aug. 1996).
ISH Electronic: ISH 12005/501 Self-Service Unit (with translation), 4 pages (date unknown, prior to Aug. 1996).
Namsys, Inc.: Namsys Express, Making currency management . . . more profitable, 2 pages (date unknown, prior to Jan. 15, 2001).
NGZ Geldzahlmaschinengesellschaft: NGZ 2100 Automated Coin Depository, 4 pages (date unknown, prior to Sep. 1996).
Perconta: Contomat Coin Settlement Machine for Customer Self Service, 2 pages (date unknown, prior to Apr. 2003).
Prema GmbH: Prema 405 (RE) Self Service Coin Deposit Facility, 2 pages (date unknown, prior to Apr. 2003).
Reis Eurosystems: CRS 6501/CRS 6510 Cash Receipt Systems for Self-Service Area, 3 pages (date unknown, prior to Apr. 2003).
Reis Eurosystems: CRS 6520/ CRS 6525 Standard-Class Coin Deposit Systems, 1 page (date unknown, prior to Apr. 2003).
Reis Eurosystems: CS 3510 Disc-Sorter, 1 page (date unknown, prior to Apr. 2003).
Royal Bank: Hemeon, Jade, "Royal's Burlington drive-in bank provides customers 24-hour tellers," The Toronto Star, 1 page (Aug. 21, 1991).
Royal Bank: Leitch, Carolyn, "High-Tech Bank Counts Coins," The Globe and Mail, 2 pages (Sep. 19, 1991).
Royal Bank: Oxby, Murray, "Royal Bank Opens 'Super Branch,'" The Gazette Montreal, 2 pages (Sep. 14, 1991).
Royal Bank: SuperBranch, "Experience the Ultimate in Convenience Banking," 2 pages (Feb. 1992).
Scan Coin: International Report, 49 pages (Apr. 1987).
Scan Coin: Money Processing Systems, 8 pages (date unknown, prior to Apr. 2003).
Scan Coin: World, 2 pages (Feb. 1988).
Scan Coin: CDS Cash Deposit System, 6 pages (date unknown, prior to Apr. 2003) [SC 0369].
Scan Coin: CDS Coin Deposit System—Technical Referens Manual, 47 pages (1989).
Scan Coin: CDS 600 User's Manual, 14 pages (date unknown, prior to Apr. 2003).
Scan Coin: CDS 600 & CDS 640 Cash Deposit System—Technical Manual, 45 pages (date unknown, prior to Apr. 2003).
Scan Coin: CDS MK 1 Coin Deposit System—Technical Manual, 32 pages (1991).
Scan Coin: SC 102 Value Counter Technical Manual, 28 pages (date unknown, prior to Apr. 2003).
Pay by Touch: Secure ID News, "Piggly Wiggly Extends Biometric Payments Throughout the Southeast U.S.," 2 pages, (Dec. 14, 2005).

* cited by examiner

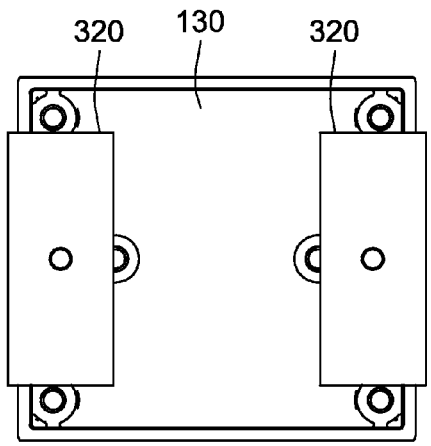 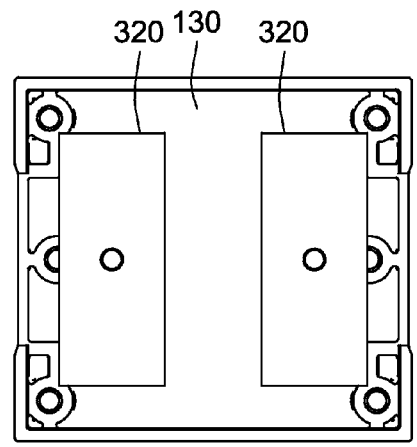
FIG. 13a  FIG. 13b
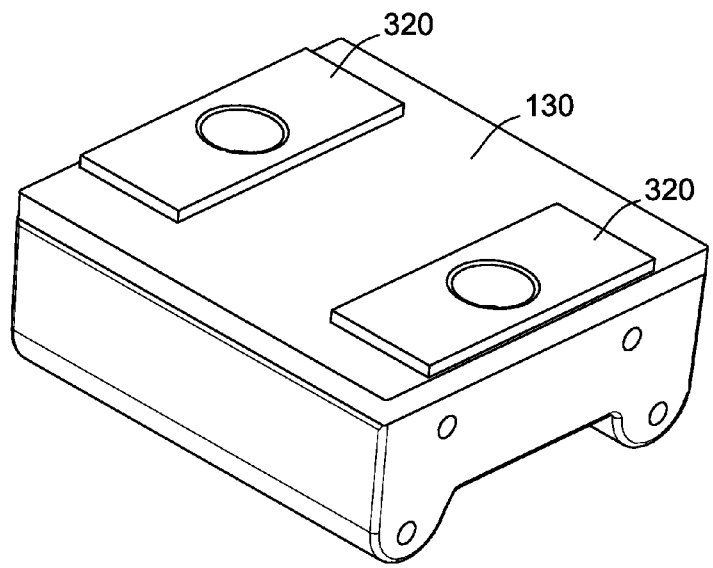
FIG. 13c

Note: Above columns 6 & 9 are for Bag Sleeves in their correct position.
If any sleeve is reversed (B-front, A-back), the voltage will be reversed from 0V to 5V or vice versa.

COIN PROCESSING SYSTEMS, METHODS AND DEVICES

CROSS-REFERENCE AND CLAIM OF PRIORITY TO RELATED APPLICATIONS

This application claims the benefit of and priority to U.S. Provisional Patent Application No. 61/424,549, which was filed on Dec. 17, 2010, and U.S. Provisional Patent Application No. 61/506,852, which was filed on Jul. 12, 2011, both of which are incorporated herein by reference in their respective entireties.

TECHNICAL FIELD

The present disclosure relates generally to systems, methods and devices for processing coins. In particular, aspects of this disclosure relate to coin processing machines and systems that utilize movable and/or removable coin receptacles.

BACKGROUND

Some businesses, particularly banks, are regularly faced with a large amount of coin currency which must be organized, counted, and recorded. To hand count and record large amounts of coins of mixed denominations requires diligent care and effort, and demands significant manpower and time that might otherwise be available for more profitable and less tedious activity. To make counting of coins less laborious, machines have been developed which automatically sort, by denomination, a mixed group of coins, and discharge the denominated coins into receptacles specific to the various denominations. For example, coin processing machines for processing large quantities of coins from either the public at large or private institutions, such as banks and casinos, have the ability to receive bulk coins from a user of the machine, count and sort the coins, and store the received coins in one or more coin receptacles, such as coin bins or coin bags.

A well-known device for processing coins is the disk-type coin sorter. In one exemplary configuration, the coin sorter, which is designed to process a batch of mixed coins by denomination, includes a rotatable disc that is driven by an electric motor. The lower surface of a stationary, annular sorting head is parallel to and spaced slightly from the upper surface of the rotatable disc. The mixed batch of coins is progressively deposited on the top surface of the rotatable disc. As the disc is rotated, the coins deposited on the top surface thereof tend to slide outwardly due to centrifugal force. As the coins move outwardly, those coins which are lying flat on the disk enter the gap between the disk and the guide plate. The lower surface of the sorting head is formed with an array of exit channels which guide coins of different denominations to different exit locations around the periphery of the disc. The exiting coins, having been sorted by denomination for separate storage, are counted by sensors packed along the exit channel. A representative disk-type coin sorting mechanism is disclosed in U.S. Pat. No. 5,009,627, to James M. Rasmussen, which is incorporated herein by reference in its entirety.

FIGS. 1a-1b show a coin processing device 10 having a pivoting coin input tray 12 configured to hold coins prior to inputting the coins into the coin processing device 10. The coin tray 12 pivots upwardly to cause coins deposited therein to move, under the force of gravity through a hopper, funnel, or chute, into a sorting mechanism (not shown) disposed within a cabinet. The sorting mechanism discharges sorted coins to a plurality of coin bags (see FIG. 1b) suspended within the cabinet 14, the bottoms of the bags may rest upon a platform 22, or may hang from bag holders 16 attached to a support member of a moveable bag receptacle station 18, which if configured (e.g., via casters 21, etc.) to travel into and out of the housing 14 to facilitate access to coin receptacle sleeves via door 20 by authorized personnel.

FIG. 2 shows an example wherein moveable receptacles 38 are disposed on glide units 31-35 that slide into and out of the of the housing 30 of the coin processing device. The moveable receptacles 38 comprise coin bag partitions that prevent coins bags disposed in the moveable receptacles from interfering with adjacent coin bags as the coin bags become filled.

FIG. 3 shows an example wherein a coin processing device includes a coin bin 44 disposed within the housing 40 and behind door 46, which is shown in an open position. In this configuration, all of the processed coins are commingled in the coin bin 44. The coin bin 44 is disposed on wheels and includes a handle 42 pivotally attached thereto for pulling the coin bin from within the housing.

U.S. Published Patent Application Serial No. US 2004/0256197, assigned to the assignee of the present disclosure, is incorporated herein by reference in its entirety. U.S. Pat. Nos. 7,188,720 B2, 6,996,263 B2, 6,896,118 B2, 6,892,871 B2, 6,810,137 B2, 6,755,730 B2, 6,748,101 B1, 6,731,786 B2, 6,724,926 B2, 6,678,401 B2, 6,637,576 B1, 6,609,604, 6,603,872 B2, 6,579,165 B2, 6,318,537 B1, 6,171,182 B1, 6,068,194, 6,042,470, 6,039,645, 6,021,883, 5,997,395, 5,982,918, 5,943,655, 5,905,810, 5,865,673, 5,743,373, 5,630,494, 5,564,974, 5,542,880, and 4,543,969, each of which is assigned to the assignee of the present disclosure, and also each of which is incorporated herein by reference in its respective entirety.

SUMMARY

According to some aspects of the disclosed concepts, a coin processing system is disclosed. The coin processing system includes one or more coin bags and a housing with a coin input area configured to receive a batch of coins. A coin processing unit is operatively coupled to the coin input area and configured to at least one of count, discriminate, sort, and value coins received from the coin input area. A wheeled trolley is removably disposed within the housing. The wheeled trolley includes a base, and a removable coin receptacle sleeve that is supported by the base and configured to receive at least some of the coins output from the coin processing unit. The removable coin receptacle sleeve has an upper portion with a first volume adjacent a lower portion with a second volume, at least the lower portion of the removable coin receptacle sleeve being configured to fit inside the coin bag, at least the upper portion of the removable coin receptacle sleeve being configured to extend out of the coin bag such that a full coin height to which coins can be fed into the removable coin receptacle sleeve is above a bag height of the coin bag According to other aspects of the disclosed concepts, a mobile coin receptacle assembly for a coin processing system is presented. The coin processing system has a housing configured to receive a batch of coins, a coin processing unit operable to process coins received by the housing, a coin bag, and a controller with a communication interface. The mobile coin receptacle assembly includes a movable trolley configured to removably insert into the housing of the coin processing system. A coin receptacle sleeve is removably attached to the trolley and supported by the trolley's base. The coin receptacle sleeve is configured to receive through an opening in an upper portion thereof at least some of the coins output from the coin processing unit. The removable coin receptacle sleeve includes a lower portion adjacent the upper portion. At least the lower portion of the removable coin receptacle sleeve is configured to fit into to the coin bag, while the upper portion is configured to extend out of the coin bag such that a full coin height to which coins can be fed into the removable coin receptacle sleeve is above a bag height of the coin bag.

The above summary is not intended to represent each embodiment, or every aspect, of the present disclosure. The above features and advantages, and other features and advantages of the present disclosure, will be readily apparent from the following detailed description of the illustrated embodiments and best modes for carrying out the invention when taken in connection with the accompanying drawings and appended claims.

BRIEF DESCRIPTION OF THE DRAWINGS

FIGS. 13a-13c illustrate a number of examples of coin receptacle sleeve handles, in accord with aspects of the present concepts, including different configurations (FIGS. 13a-13b) of the two exposed metal plates configured to make electrical contact with the manifold contacts, such as those shown in FIGS. 6-7.

Figure 1A:
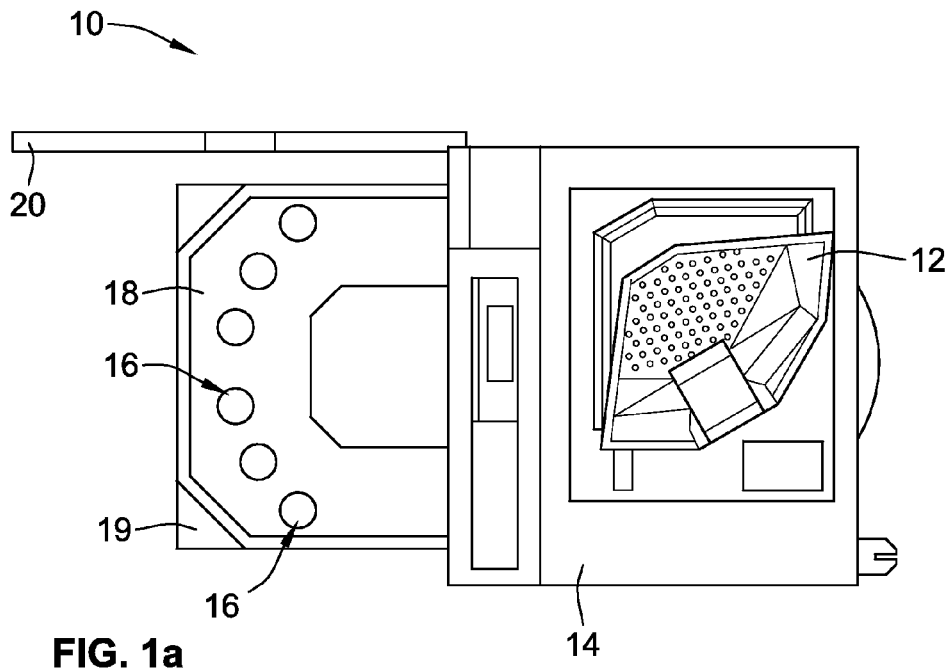
FIGS. 1a and 1b are alternate views of a representative coin processing machine employing conventional coin bags.
Figure 1B:
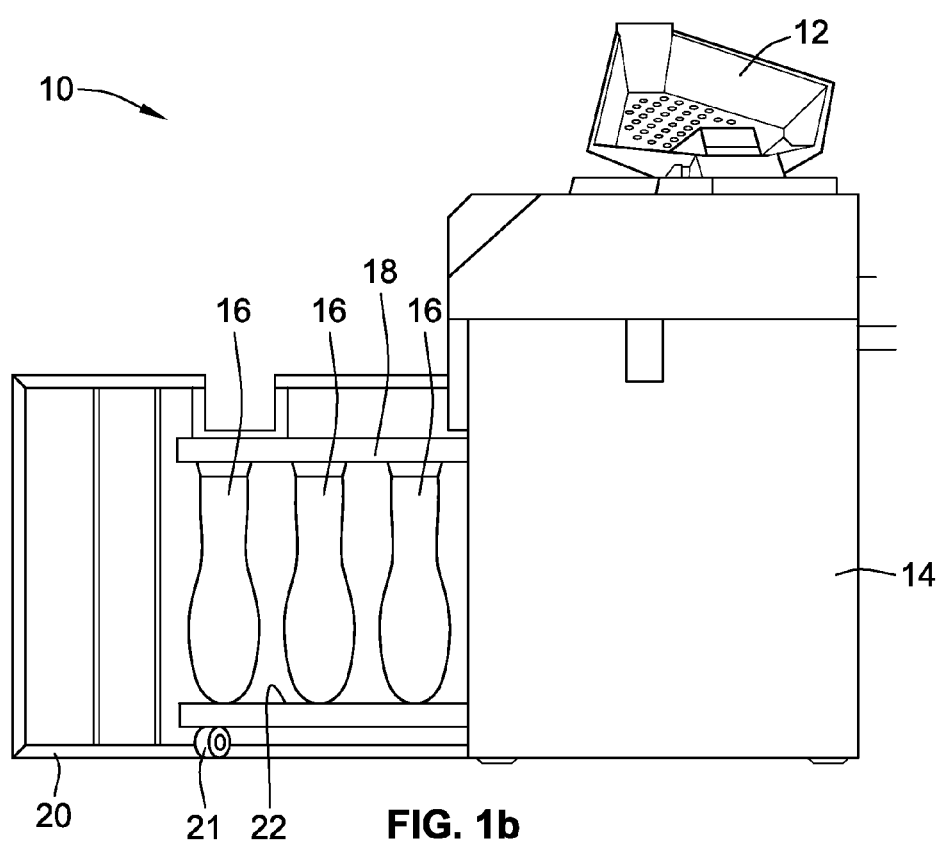
Figure 2:
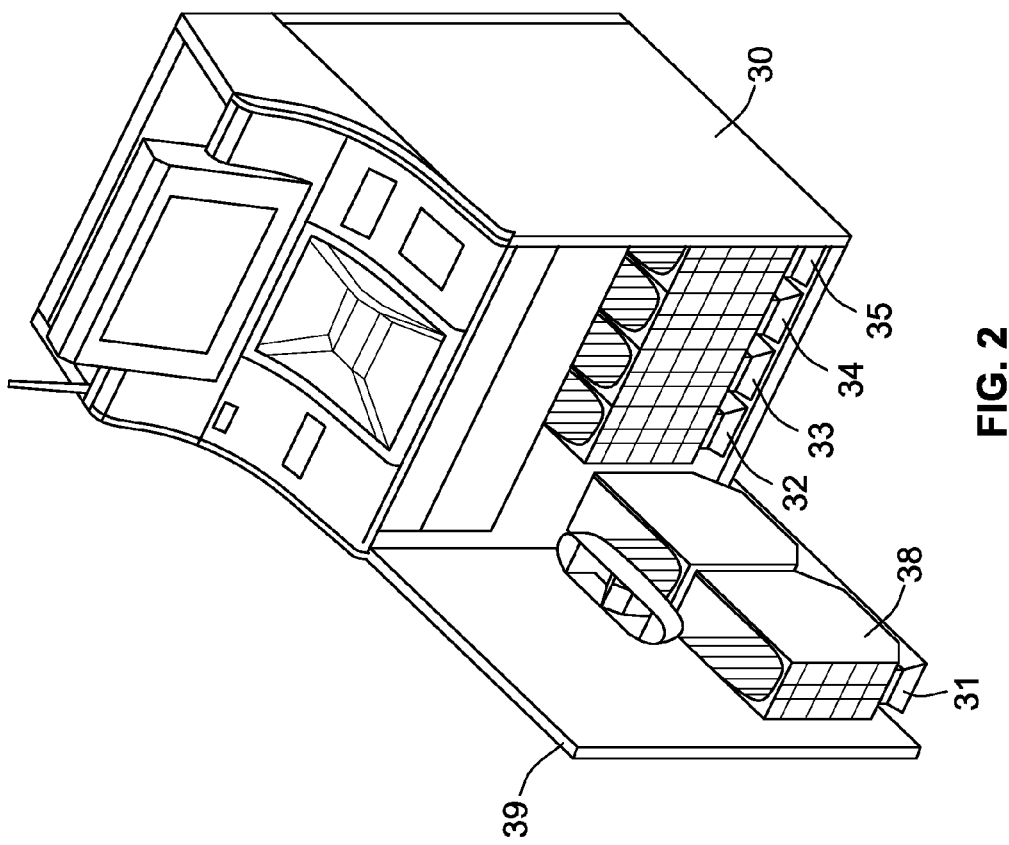
FIG. 2 is a perspective-view illustration of a representative coin processing machine unit employing moveable receptacles.
Figure 3:
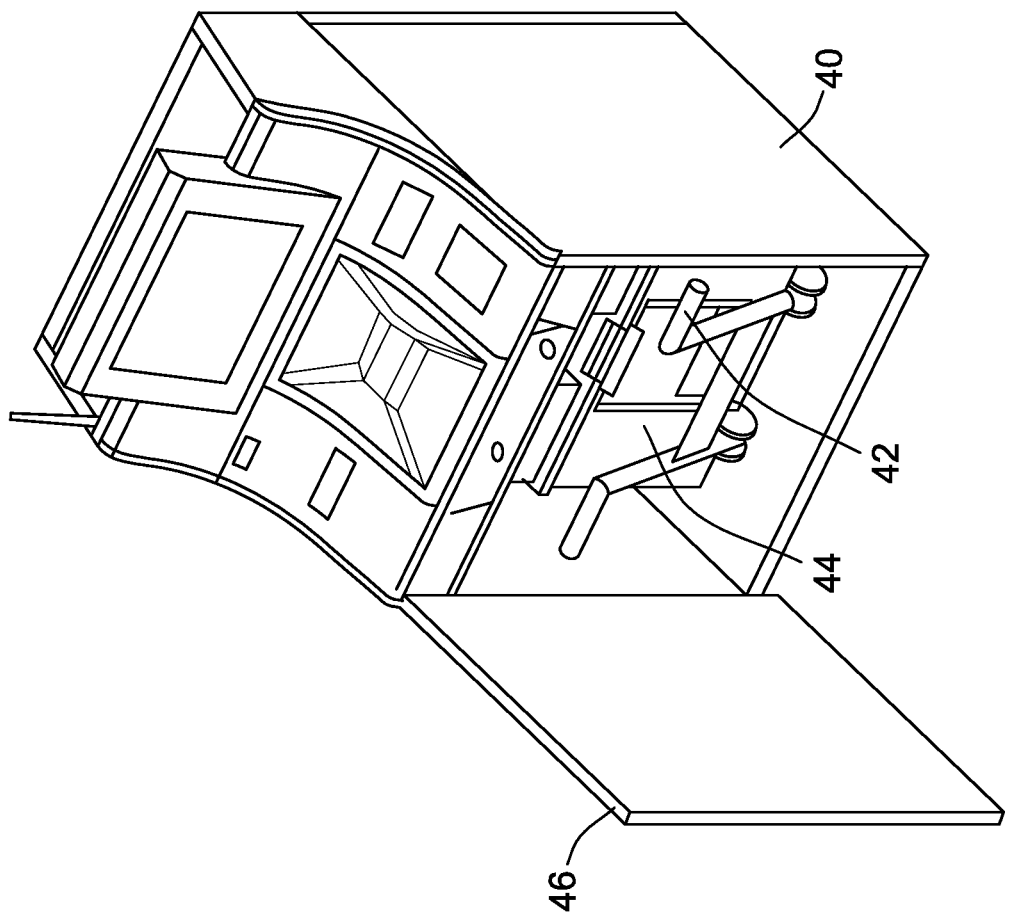
FIG. 3 is a perspective-view illustration of a representative coin processing machine unit employing a moveable coin bin.

While the invention is susceptible to various modifications and alternative forms, specific embodiments are shown by way of example in the drawings and will be described in detail herein. It should be understood, however, that the invention is not intended to be limited to the particular forms disclosed.

DETAILED DESCRIPTION OF THE ILLUSTRATED EMBODIMENTS

While this invention is susceptible of embodiment in many different forms, there are shown in the drawings and will herein be described in detail representative embodiments with the understanding that the present disclosure is to be considered an exemplification of the various aspects and principles of the invention, and is not intended to limit the broad aspects of the invention to the embodiments illustrated. To that extent, aspects and features that are presented, for example, in the Abstract, Summary, and Detailed Description of the Illustrated Embodiments sections, but not explicitly set forth in the claims, should not be incorporated into the claims, singly or collectively, by implication, inference or otherwise.

Figure 4:
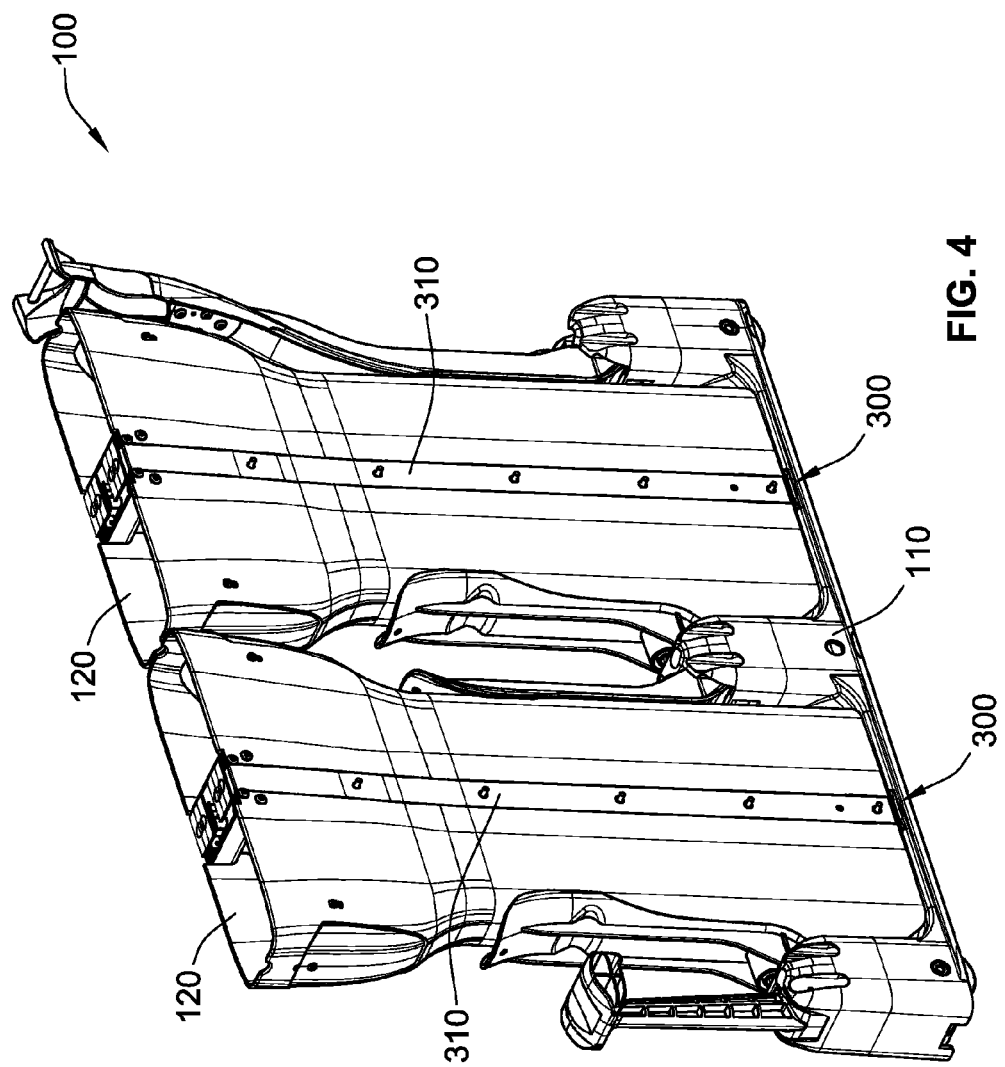
FIG. 4 is a perspective-view illustration of an example of a cable-free bag trolley bearing coin receptacle sleeves in accord with aspects of the present concepts.

Referring now to the drawings, wherein like reference numerals refer to like features throughout the several views, FIG. 4 shows a trolley system 100 implementable with a bag logic system in accord with at least some aspects of the present concepts. As will be developed in further detail below, each cable-free trolley system (or "wheeled trolley") 100 functions as a mobile coin receptacle for receiving coins from a coin processing device (represented herein by the manifold 140 portrayed in FIG. 5), which may include any of the disk-type coin sorters described above, the coin processing devices set forth in the patents incorporated herein by reference, or any other now known or hereinafter developed coin processing device. The trolley system 100 can also operate to stow and/or transport coins received from the coin processing device 140, which will also be developed further below. In accord with aspects of the present disclosure, a coin processing system is defined, at least in part, by the trolley system 100 and coin processing device 140. Although the trolley system 100 reflects one embodiment of the present concepts, the aspects described herein are implementable without a trolley and the provision of the trolley is not to be construed to be a limitation on the concepts disclosed herein.

Figure 5:
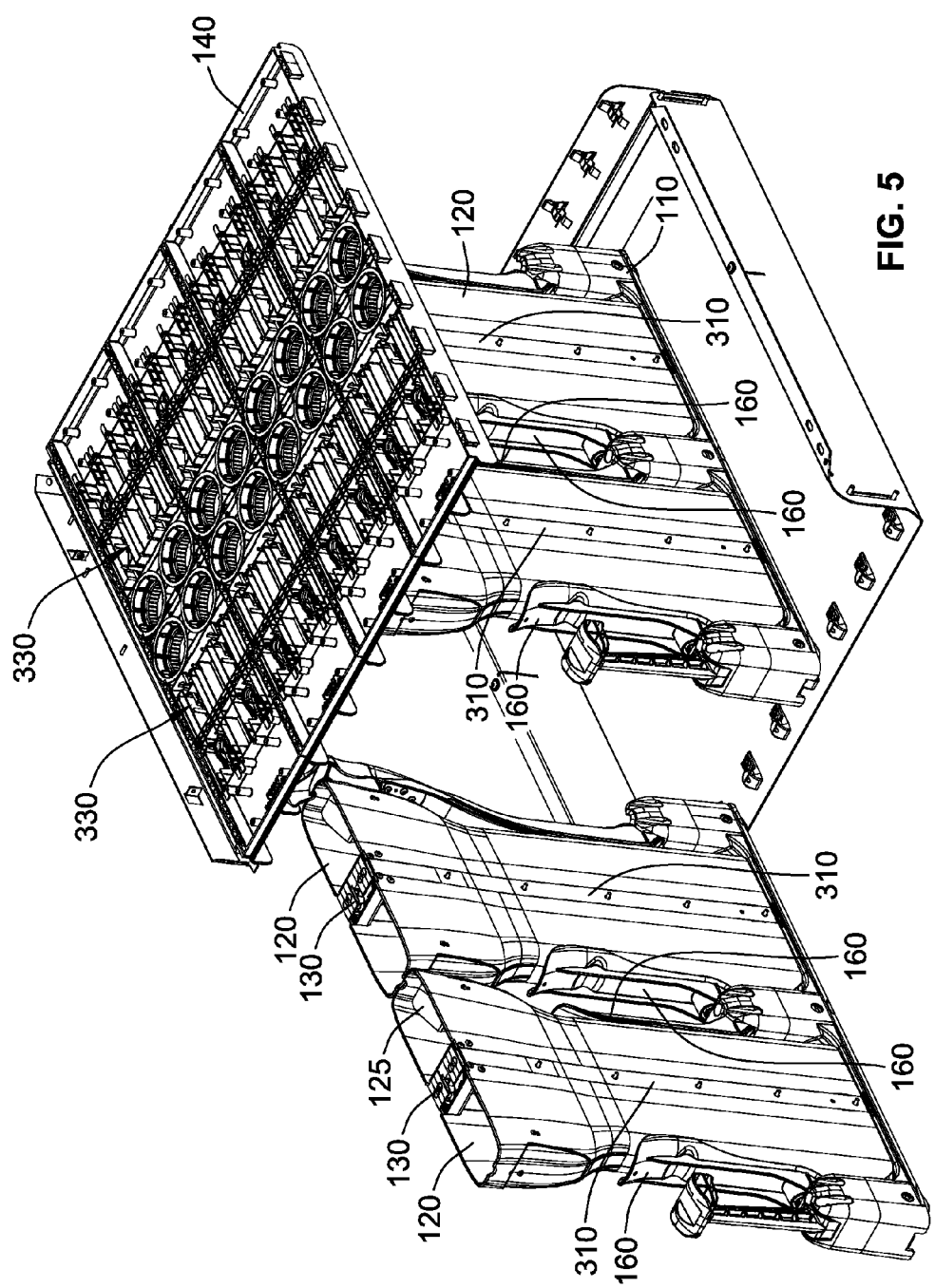
FIG. 5 is a perspective-view illustration of an example of a number of cable-free bag trolleys, in accord with FIG. 4, and a coin receptacle sleeve bag logic system with manifold spring contacts functionally interacting with contacts on the receptacle in accord with aspects of the present concepts.
Figure 6:
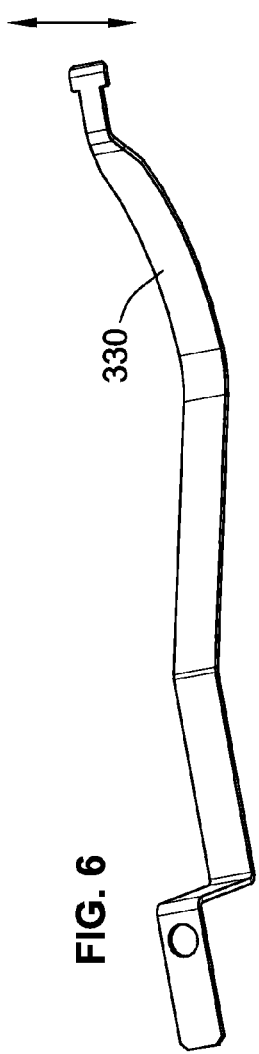
FIGS. 6 and 7 are perspective-view illustrations of examples of manifold spring contacts in accord with aspects of the present concepts.
Figure 7:
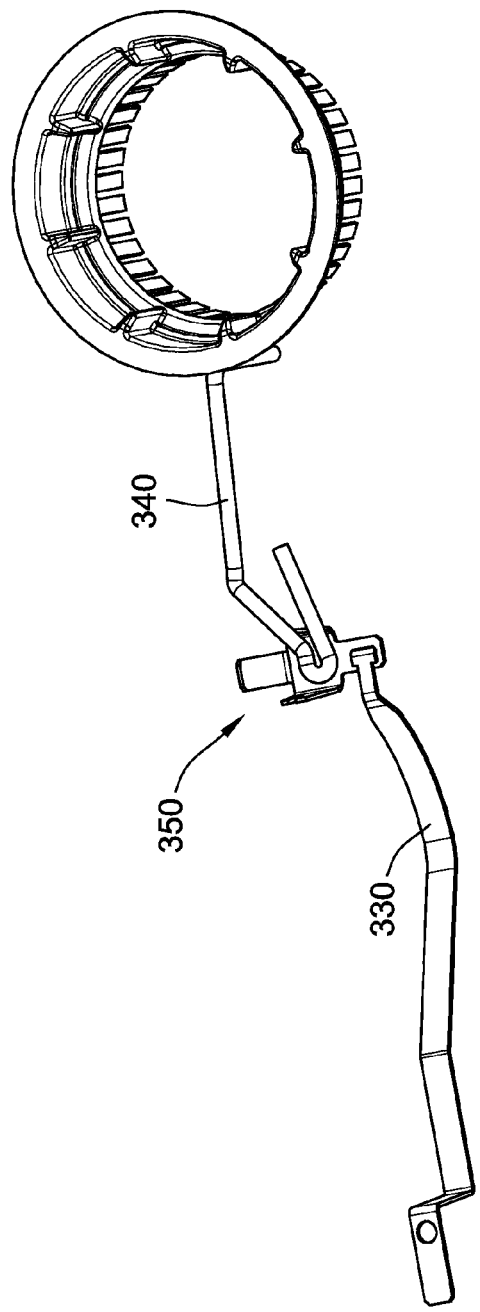
Figure 8:
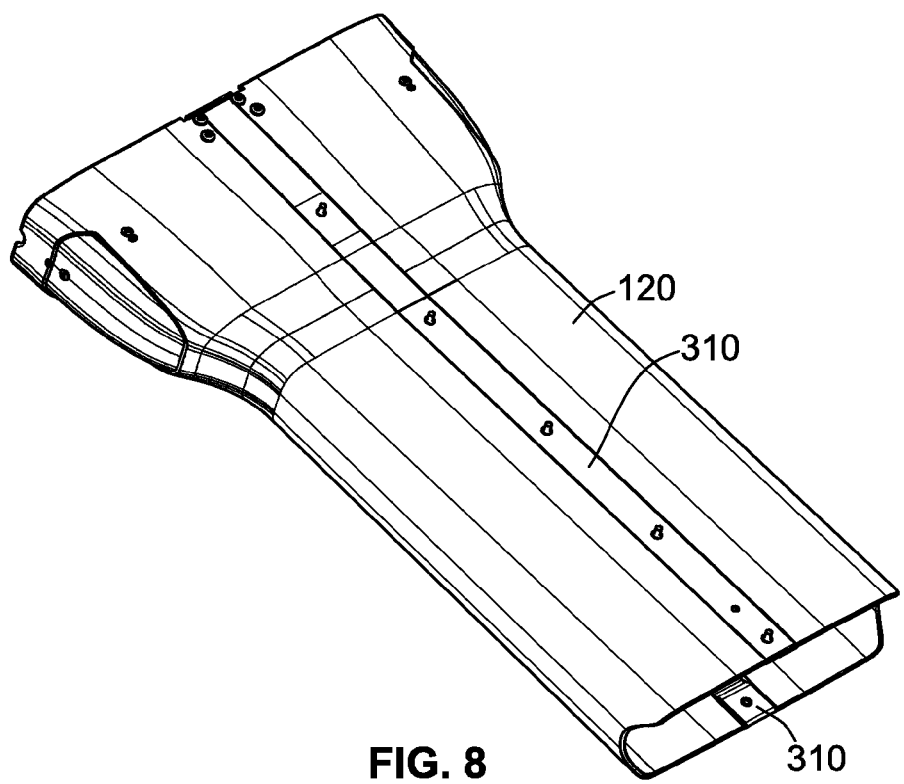
FIG. 8 is a perspective-view illustration of a representative coin processing device coin receptacle sleeve in accord with aspects of the present concepts, showing conductive members extending along an outside surface of the coin receptacle sleeve from the top to the bottom of the coin receptacle sleeve, on both sides.
Figure 14:
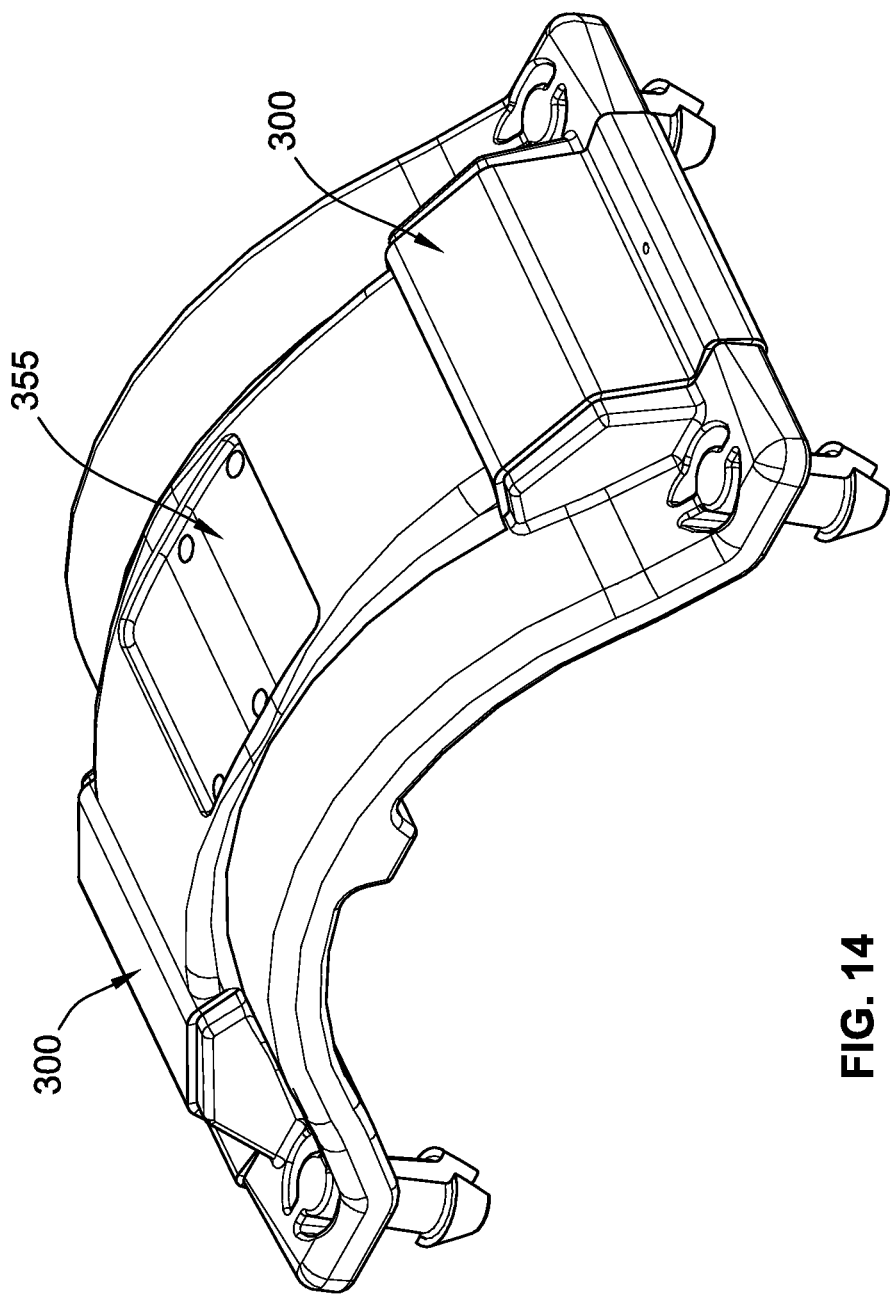
FIG. 14 is a perspective-view illustration of a portion of the trolley base of FIG. 4, in accord with aspects of the present concepts, depicting a molded piece with a pair of spaced electrical contacts connected by a resistor.

The trolley system 100, when in at least one of a number of predetermined orientations, can wirelessly communicate information to a communication interface of a controller of the coin processing unit. As used herein, "wirelessly communicate" is inclusive of, but not exclusive to, the transmission of information signals between two devices without the use of connecting hardline or wired interfaces between the two devices. By way of example, and not limitation, the bag logic system of FIG. 4 utilizes a number of electrically conductive interfaces for communicating information between one or more mobile coin receptacles 100 (e.g., FIGS. 4 and 5) and a controller 150 of a coin processing system (e.g., FIG. 5). For instance, the wheeled trolley 100 can include at least one, and in some embodiments a (first) plurality of electrical contacts, which may comprise, singly and in any combination, electrical contacts 300 (also referred to herein as "first electrical contact(s)") on the trolley base 110, as best seen in FIG. 14, electrical contacts 310 (also referred to herein as "third electrical contact(s)") on the coin receptacle sleeve 120, as best seen in FIGS. 4, 5 and 8, and electrical contacts 320 (also referred to herein as "fourth electrical contact(s)") on the coin receptacle sleeve handle 130, as shown in FIGS. 9 and 12-13c. The coin processing system, in turn, can also include at least one, and in some embodiments a (second) plurality of electrical contacts, which may comprise manifold springs 330 (also referred to herein as "second electrical contact(s)") attached to a stationary manifold 140. The electrical contacts 320 on the coin receptacle sleeve handle 130 are packaged to electrically contact with the conductive manifold springs 330, which are best seen in FIGS. 5-7, 15-16 and 28. As an aside, the use of "first," "second," "third," "fourth," "fifth," etc. in the specification and claims is not intended as limiting and therefore should not be construed as such.

Utilizing the arrangement shown in FIG. 4, the bag logic system can be configured to determine if one or more coin receptacle sleeves 120 are in the correct position (e.g., properly oriented to receive processed coins from a coin processing device), if a substantially non-conductive coin bag 170 (e.g., formed entirely or in part from cloth, such as canvas, or plastic and other polymers, such as vinyl and nylon, etc.) is disposed over or otherwise operatively attached to the coin receptacle sleeve 120, whether there are coins and/or a predetermined level of coins in the coin receptacle sleeve 120, or any combination thereof. All powered electronic components can therefore be located on the stationary manifold 140 or at other locations in the housing, while allowing the trolley module 110 to be electrical cable-free. In this vein, the various components disposed on the trolley 110 can be limited to only provide an electrical path when the trolley and components borne thereby are properly positioned. In this configuration, the coin bag containment system noted above and elsewhere herein, in combination with a coin bag disposed over the bottom portion of the coin receptacle sleeve 120, delivers all needed bag logic features while eliminating the need for a trailing cabling (e.g., ribbon cables, umbilicals, etc.) and batteries or other power sources for on-board electronic components.

In normal operation, each of the coin receptacle sleeves 120, or a predetermined portion thereof, is placed inside of a coin bag to keep coins within a designed volume during filling of the coin bag. In effect, the coin receptacle sleeve 120 acts as an internal armature, providing an otherwise non-rigid coin bag with a generally rigid internal geometry. By filling into a substantially constant or a constant geometry, bag storage efficiency has been determined to increase from 12 bags (e.g., 6 side-by-side trolleys) to 16 bags (e.g., 8 side-by-side trolleys) in the same sized cabinet (e.g., same footprint) that would normally house a single coin bin (which typically holds about the equivalent of about 9-10 coin bags) or a plurality of coin bags (typically about 6 coin bags). A "coin bag," as used herein, may be defined to consist of a single, standard-size Federal Reserve coin bag. In some non-limiting examples, a standard-size Federal Reserve coin bag holds at least approximately $50.00 in pennies, at least approximately $200.00 in nickels, at least approximately $1000.00 in dimes, or at least approximately $1000.00 in quarters, such as is set forth in the Federal Reserve "Operating Circular 2," issued Jan. 2, 1998, which is incorporated herein by reference in its entirety. Other non-limiting examples include coin bags which, when laid flat, are approximately 20"×16", approximately 12"×19", approximately 14"×28", or approximately 9"×17.5".

The coin receptacle sleeve 120 has optional features described herein which are used to notify the coin processing machine of fill errors, the presence of coins in the coin receptacle sleeve, etcetera. In at least one aspect, the coin receptacle sleeve omits these notification features. In alternative arrangements, the coin bag may be disposed inside of the coin receptacle sleeve 120 or may be affixed to the coin receptacle sleeve 120 in other manners and by other means.

The coin receptacle sleeves 120 prevent the coins from encroaching on adjacent coin bag space, thus allowing for more bags in a significantly smaller footprint. The coin receptacle sleeve 120 is designed, in some embodiments, to be able to hold coins above the height of the coin bag, so that a full bag of coins can fit into a shape determined to be more efficient. The coin receptacle sleeve 120 constrains coins to a pre-defined volume and a confined footprint and alleviates previous industry problems of bag overflows while simultaneously increasing coin storage capacity. In one embodiment, the sleeve is 2.75" wide and 12.2" deep at the top opening. In a trolley configuration, two such coin receptacle sleeves 120, in a tandem configuration, fit into a 3" wide trolley, allowing for eight tandem trolleys to hold 16 sleeves (and 16 bags) in the same space that conventionally would holds 12 coin bags. When the coin receptacle sleeves 120 are full, or otherwise require removal, and the trolley 110 racked out to permit replacement of the full coin bag with an empty coin bag (e.g., when every mixed-coin coin bag in a mixed-denomination configuration is full and the machine needs to be removed from service), an authorized person may simply remove the coin receptacle sleeve 120 to release the coins into the bag. The coin receptacle sleeve 120 is also advantageously, but not necessarily, equipped with electrical contacts 310 which work with the bag logic system to determine correct sleeve placement, bag presence, coin presence, and coin overflow.

The concepts presented herein are not limited to the aforementioned 12 bag (i.e., 12 sleeve) configuration or 16 bag (i.e., 16 sleeve) configuration and may optionally be expanded to more than 16 bags if the height of the sleeve is further increased (thus correspondingly reducing the footprint). For instance, if the footprint of the machine is increased, additional trolleys 110, coin receptacle sleeves 120, coin bags, and combinations thereof, may be incrementally added (e.g., 18 bags/sleeves, 20 bags/sleeves, 22 bags/sleeves, etc.). Further, in at least some aspects of the present concepts, the bag logic system disclosed herein may be optionally implemented in combination with (e.g., side-by-side) conventional bag systems, bins, or other coin receptacles. In this vein, the bag logic systems presented herein may optionally be contracted in size to fewer than 12 or 16 bag configurations without departing from the scope and spirit of the present disclosure.

In some embodiments, approximately 16 coin bags can be stowed and filled in a footprint of approximately 6.25 sq. ft. or approximately 0.39 sq. ft. per bag. In other embodiments, approximately 16 coin bags can be stowed and filled within a footprint of approximately 4.67 sq. ft. or approximately 0.29 sq. ft. per bag. Other embodiments can include a 16 coin bag system with a bag storage footprint of approximately 3-8 sq. ft. or, in some embodiments, approximately 4-7 sq. ft. or, in some embodiments, 4.5-6.3 sq. ft. The overall cabinet footprint can be approximately 700-800 sq. in. or, in some embodiments, approximately 762 sq. in. In a 16 bag configuration, this would amount to approximately 43.75-50 sq. in. per coin bag or, in some embodiments, approximately 47.62 sq. in. per coin bag. In some embodiments, the coin sleeve has a top footprint of approximately 20-40 sq. in. or approximately 34.6 sq. in. and a bottom footprint of approximately 20-30 sq. in. or approximately 22.6 sq. in. By offering a greater number of coin bags in the same footprint, a higher return-on-investment can be offered to operators of the machine. For example, increasing the density of coin bags in a single machine allots for a higher total value of coins in a single machine. This, in turn, reduces the frequency of having an armored carrier out to service the machine, thus reducing the operator's expenses.

Figure 11:
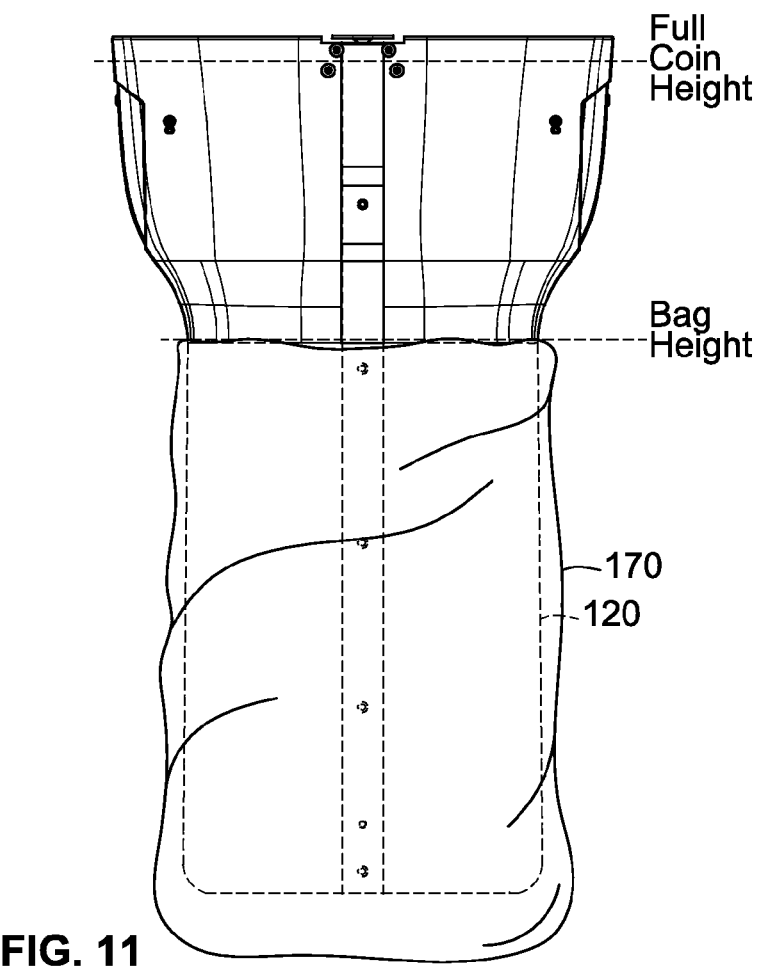
FIG. 11 is a side-view illustration of the coin receptacle sleeve of FIG. 8, showing a lower portion of the coin receptacle sleeve having a smaller cross-sectional area that an upper portion of the coin receptacle sleeve.

FIG. 11 shows an example of a coin receptacle sleeve 120 body, illustrating a lower part (or "first portion") of the sleeve having a smaller cross-sectional area than an upper part (or "second portion") of the sleeve 120 so that the sleeve 120 can fit inside of a standard coin bag 170. As indicated by the reference line labeled "Bag Height," some coin bags are designed so as not to extend to the top of the coin receptacle sleeve 120 and, instead, only rise to a level of the transition of the cross-sectional area of the receptacle sleeve from the smaller cross-sectional area to the larger cross-sectional area. Above the height of the coin bag 170, the cross-sectional area increases to advantageously give additional coin fill volume to the level indicated by the reference line for "Full Coin Height". At this point, as described below, the coins will complete an overflow circuit sufficient for a signal indicative of an overflow condition to be generated.

Figure 10:
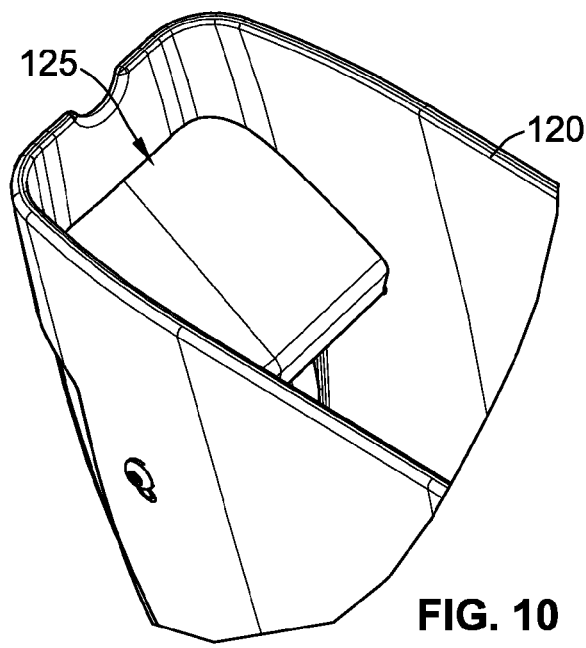
FIG. 10 is an alternate perspective-view illustration of a portion of the coin receptacle sleeve of FIG. 8, showing a deflector in accord with aspects of the present concepts.

FIG. 10 shows a sleeve deflector 125 disposed inside of the top portion of the coin receptacle sleeve 120. The sleeve deflector 125, as illustrated, is attached to or otherwise integrated with the top portion of the sleeve 120, and includes an upper surface that is angled with respect to the opening at the top of the sleeve 120. The sleeve deflector 125 changes the trajectory of the coins during fill to ensure a more even coin height and to prevent coins from stacking into columns in the chalice area beneath the fill location, thereby accommodating a maximum coin volume.

Figure 15:
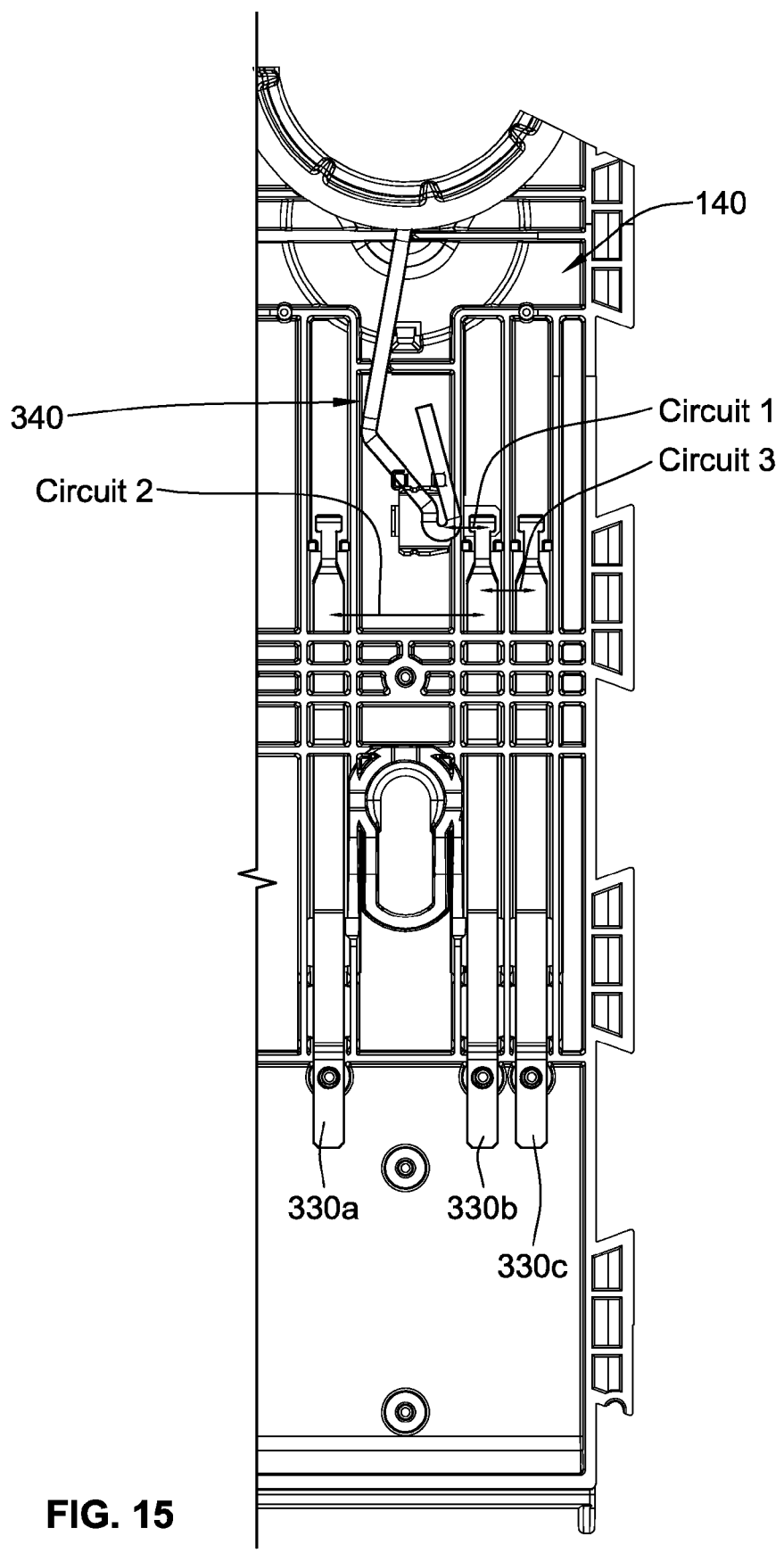
FIG. 15 is an underside plan-view illustration of a variety of circuits in the manifold shown in FIG. 5, in accord with aspects of the present concepts.
Figure 28:
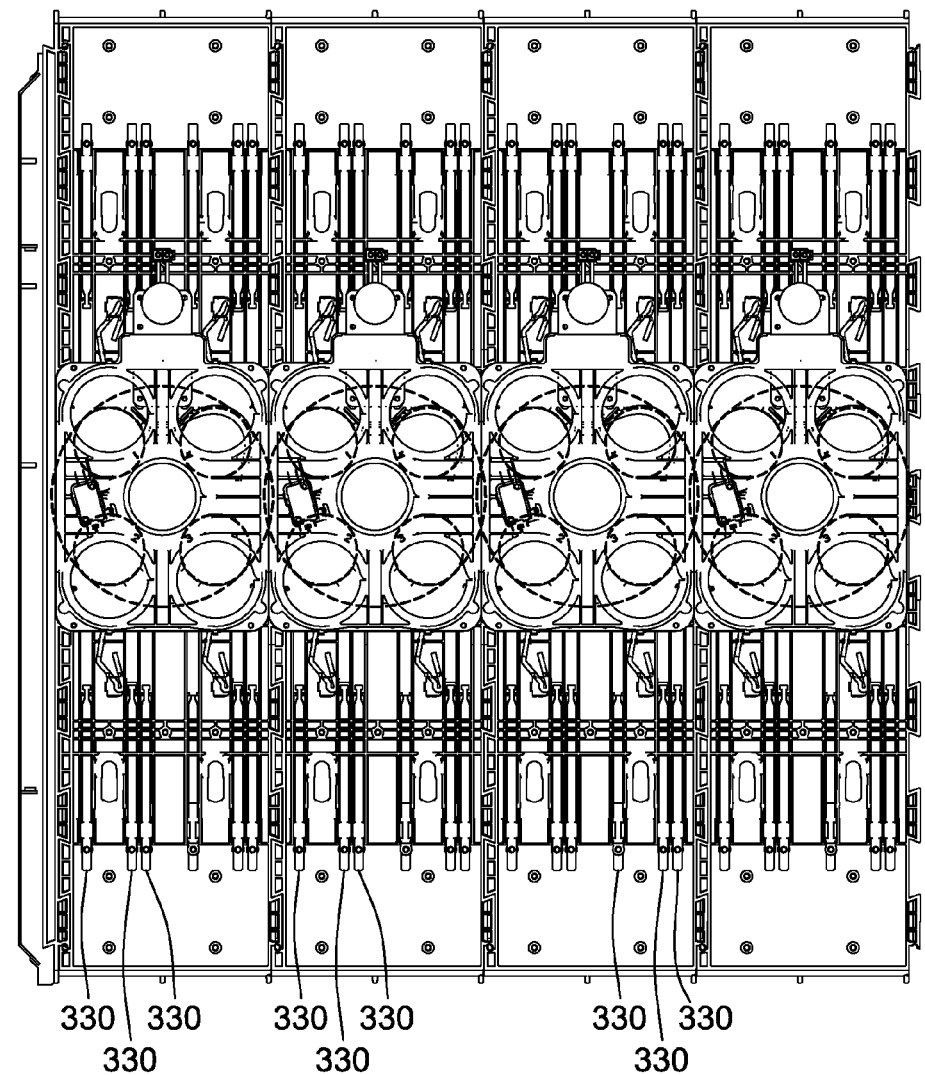
FIG. 28 is a top perspective-view illustration showing four adjacent configurable manifold component assemblies in accord with aspects of the present concepts.

FIG. 5, and more particularly FIGS. 15 and 28, show aspects of a bag logic system in accord with the presently disclosed concepts configured to determine a state of the bag module, the combination of the coin receptacle sleeve 120 and coin bag (not shown) disposed thereover, and annunciate the state of the bag module. The bag logic system, as noted above, monitors correct coin receptacle sleeve 120 position, coin bag presence, coin presence within the correct coin receptacle sleeve 120, and impending coin overflow from the correct coin receptacle sleeve. In this bag logic system, electrical contacts 330, 320, 310, and 300 on the manifold base 140, coin receptacle sleeve handle 130, coin receptacle sleeve 120, and trolley base 110, respectively, provide three possible circuits for electric current. Depending on the states of the three circuits, the state of the bag module is known.

FIG. 15 shows one configuration of manifold springs 330 (shown as contacts 330a, 330b and 330c), wherein there are three manifold springs per coin receptacle sleeve 120 position in the manifold base 140. These manifold springs 330 are fastened into the manifold 140, for example, using clamping members, such as integrated hinged clamps, to retain and provide a pre-load to the manifold springs. The manifold springs 330 are connected to a processor board (not shown) at one end (i.e., a fixed end) via a multiplexing interface board and are free to move vertically on the opposite end, as indicated by the dual-headed vertical arrow in FIG. 6. The middle manifold spring (e.g., spring 330b in FIG. 15) is at low electrical potential, while the other two manifold springs (e.g., springs 330a, 330c in FIG. 15) representing the bag state (e.g., bag-on, bag-off, and coin present) and sleeve position (front or back) originate at high electrical potential.

For each coin receptacle sleeve 120 position, there is a wire coil spring 340 that hangs down into the coin receptacle sleeve cavity. This wire coil spring 340, functioning as an overflow spring, is fastened around the manifold spring 330 contact 350, electrically connecting the wire coil spring 340 to the multiplexing interface board and processor board. The free end of the middle manifold spring (at low potential) rests on a lip of the manifold spring contact 350 (at high potential) in a no-sleeve condition (e.g., when a coin receptacle sleeve 120 is not in a proper position). When the coin receptacle sleeve 120 is present and properly positioned, the manifold spring 330 lifts from the manifold spring contact 350, by action of the coin receptacle sleeve 120 handle 130 and breaks the circuit. The circuit would be renewed when the coin receptacle sleeve 120 is removed (e.g., the handle 130 no longer upwardly biases the manifold spring 330) or coins contacting the wire coil spring 340 complete a circuit.

Figure 9:
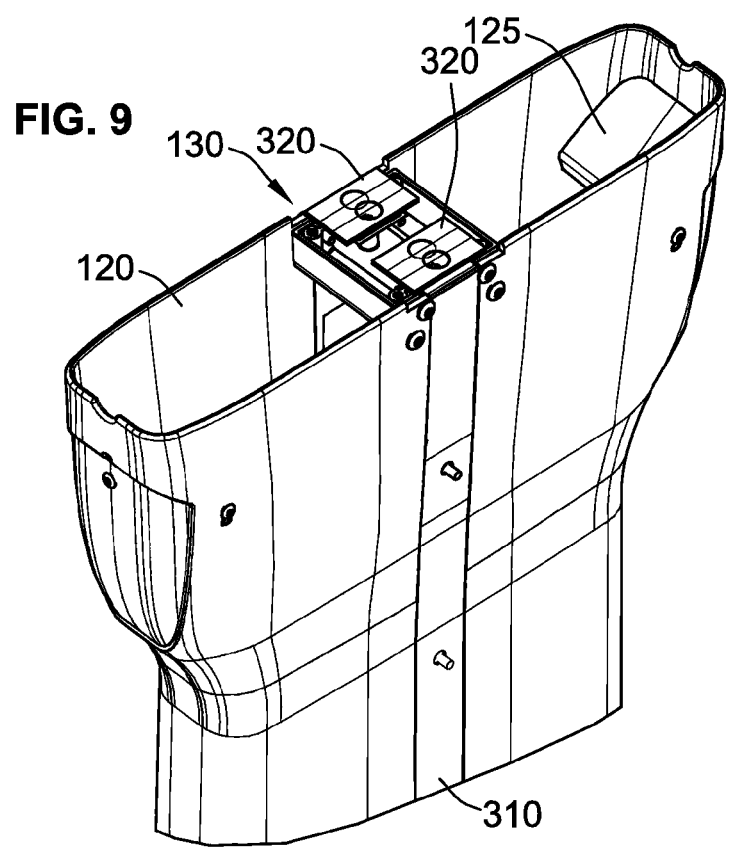
FIG. 9 is an alternate perspective-view illustration of the coin receptacle sleeve of FIG. 8, showing a top portion of the conductive members extending along the outside of the coin receptacle sleeve, and further showing an internal handle with manifold spring contacts.
Figure 12:
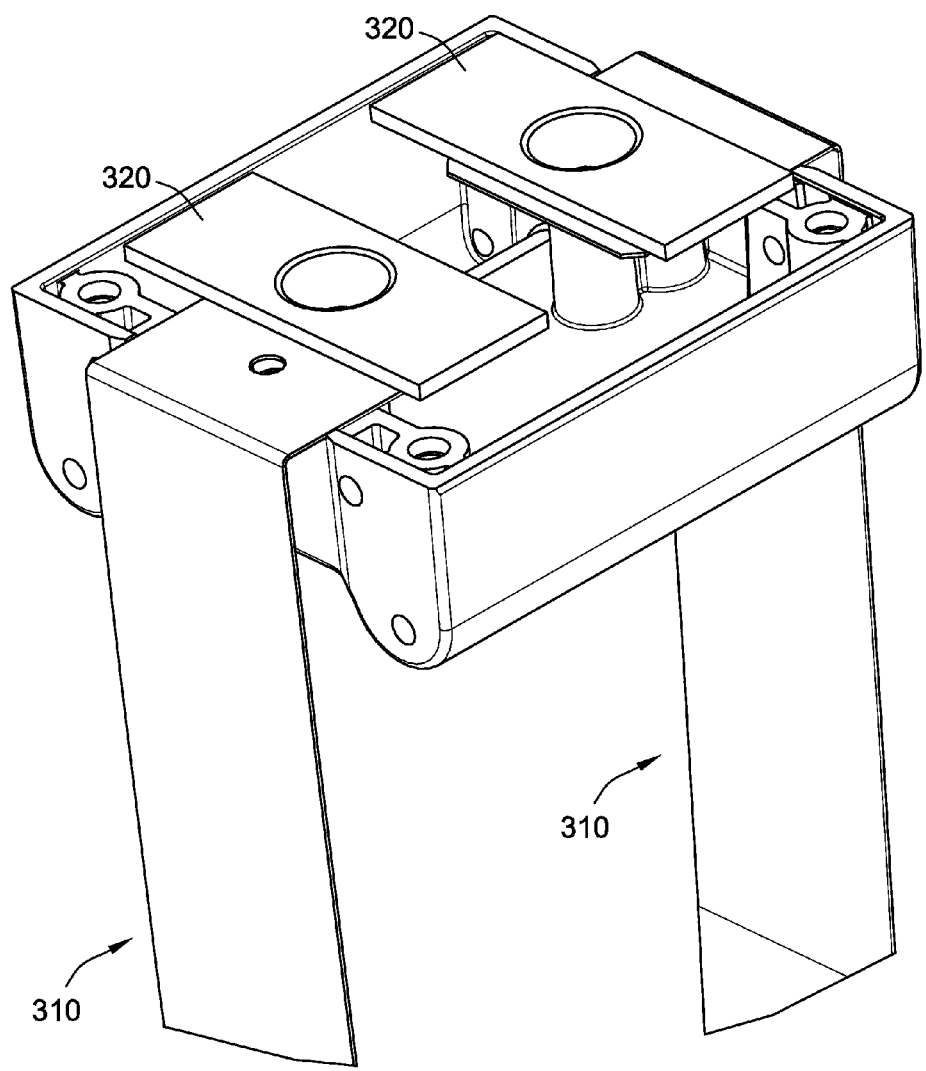
FIG. 12 is a perspective-view illustration of a coin receptacle sleeve handle in accord with aspects of the present concepts having two exposed metal plates configured to make electrical contact with manifold contacts, such as those shown in FIGS. 6 and 7.

FIG. 9, as well as FIGS. 12 and 13a-13c, show views of embodiments of coin receptacle sleeve 120 handle 130. The handles 130 keep the top opening of the coin receptacle sleeve at a consistent width while making it easy to remove the sleeve from a full bag of coins and install into an empty coin bag. It also has contacts on its top surface which allow bag logic functionality. To this end, each coin receptacle sleeve 120 handle 130 has two exposed metal plates 320 which make electrical contact with the conductive manifold springs 330. On the underside (i.e., the side of the handle or bottom of the handle), these plates 320 are electrically connected to the coin receptacle sleeve 120 contacts 310, such as is shown in FIG. 12, that run down the sides of the coin receptacle sleeve. As shown in FIGS. 13a-13b, there are two embodiments of coin receptacle sleeve 120 handle 130 plates or contacts 320. One embodiment (FIG. 13a) is configured to substantially simultaneously electrically engage two contacts (bag state and low potential) and the other embodiment (FIG. 13b) is configured to substantially simultaneously electrically engage three contacts: low potential, bag state (bag-on, bag-off & coins present) and position—both at high electrical potential. Correspondingly, there are two embodiments of handle covers, a first embodiment configured to engage with two manifold springs 330 and the other configured to engage with three manifold springs. Correct bag position is verified by an open or closed circuit on the $3^{rd}$ contact.

FIG. 8 shows the coin receptacle sleeve 120 contacts 310 that run down the sides of the coin receptacle sleeve. These coin receptacle sleeve 120 contacts 310 comprise, in the illustrated example, a thin steel strip that runs from the coin receptacle sleeve 120 handle 130, down the length of the coin receptacle sleeve, and hooks underneath the bottom edge of the coin receptacle sleeve 120 contacts 310 to wrap around and engage a bottom interior portion of the coin receptacle sleeve. These bottom portions of the coin receptacle sleeve 120 contacts 310 would, if not covered by a substantially non-conductive material (e.g., a coin bag), electrically contact the contacts 300 on the trolley 110 (see FIG. 14). The contacts 300 shown in the example of FIG. 14 depict the contacts passing through the molded piece, wherein they are electrically connected to one another by a bridge resistor 355. When the coin receptacle sleeve 120 is inserted into the trolley 110, the bridge resistor closes the circuit between the two sleeve contacts 310 if a sleeve is present without a coin bag.

In view of the above, when the trolley 110 is racked in with a coin receptacle sleeve 120 inserted, the coin receptacle sleeve handle 130 raises the middle manifold spring 330b off of the spring contact 350, opening circuit 1, represented in FIG. 15. With the trolley 110 and coin receptacle sleeve 120 racked in, two manifold springs 330 are in contact with the sleeve handle. If there is no coin bag on the coin receptacle sleeve 120, the coin receptacle sleeve contacts 310 touch the contacts 300 on the base 110 of the trolley 100, forming a circuit through the bridge resistor 355 and the known resistance provides a divided voltage on circuit 2. If there is a bag on the coin receptacle sleeve 120, however, the sleeve contacts 310 are insulated from the bridge contacts 300, and the circuit is open. Thus, if there is a coin bag on the coin receptacle sleeve 120, circuit 2 is open. When the coin receptacle sleeve 120 is filled with coins, the coins bridge the gap between the inside surfaces of the sleeve contacts, closing circuit 2. If the coin level reaches the overflow spring 340, the current from circuit 1 passes through the coins and into overflow spring 340, closing circuit 1.

Figure 16:
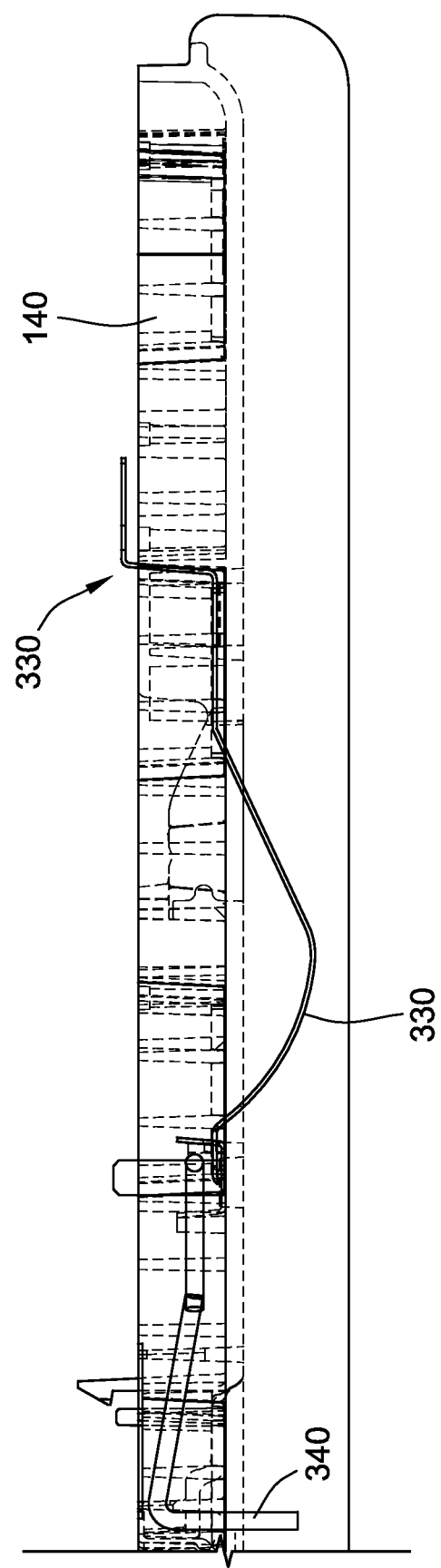
FIG. 16 is a side cross-sectional view illustration of the manifold and circuits of FIG. 15.
Figure 17:
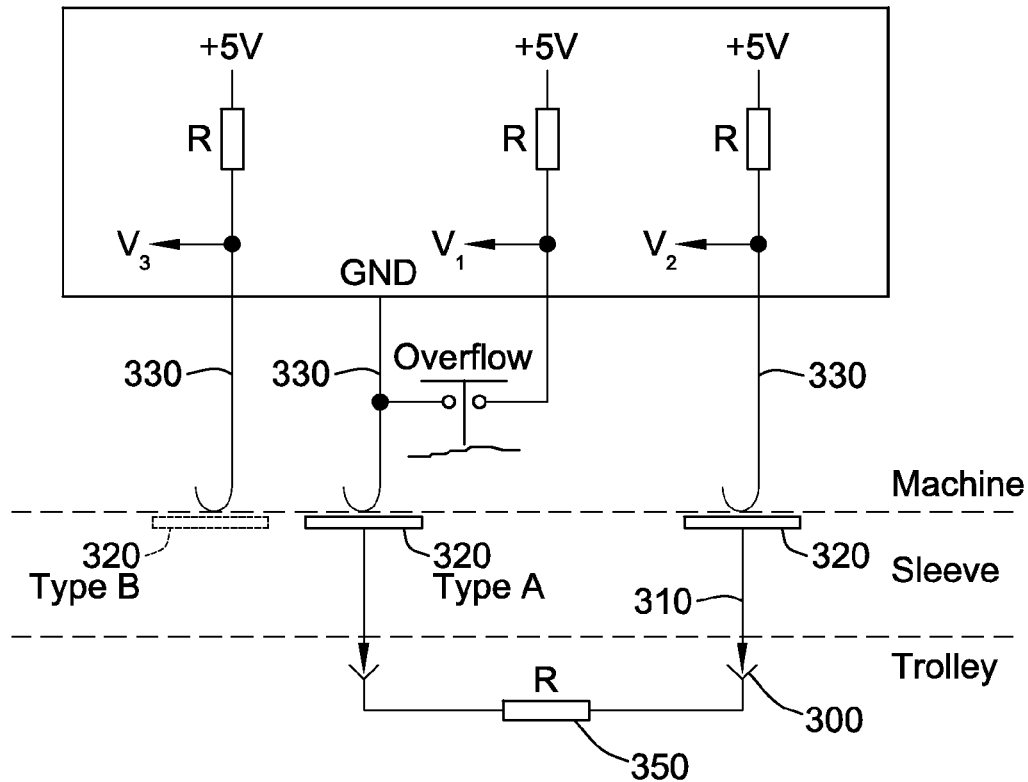
FIG. 17 is a schematic diagram illustrating the logic of the electrical circuits shown in FIG. 15.

Accordingly, the following circuit states are presently contemplated:
Circuit 1 Closed: No Sleeve Present
Circuit 1 Closed, Circuit 2 closed (at Voltage C—Coin Present): Overflow
Circuit 1 Open, Circuit 2 Open (Bag is insulator—Voltage A):
    Sleeve Present, Bag On
Circuit 1 Open, Circuit 2 Closed (Known Resistance—Voltage B):
    Sleeve Present, No Bag
Circuit 1 Open, Circuit 2 Closed (Short thru Coins—Voltage C):
    Sleeve Present, Coins Present
Circuit 1 Open, Circuit 3 Open: Sleeve A Present
Circuit 1 Open, Circuit 3 Closed: Sleeve B Present FIG. 16 is a side-view illustration of the manifold 140 of FIG. 15 shown in cross-section. FIG. 17 shows a schematic of the bag logic, wherein the "Type A" and "Type B" references on the left side of FIG. 17 relate to the two different embodiments of the coin receptacle sleeve 120 handle 130 plates or contacts 320 shown in FIGS. 13a and 13b. The reference of "Machine", "Sleeve" and "Trolley" on the right side of FIG. 17 represent the coin processing machine, coin receptacle sleeve 120, and trolley 110, respectively.

The aforementioned bag logic system provides a new approach to determining the state of the mobile coin receptacle(s). In other aspects, the bag logic system may monitor, for example, coin receptacle sleeve 120 presence and each coin receptacle sleeve's unique ID using one of several technologies (e.g., presence and ID is determined by RFID, bar code, sonar, near field communication, Bluetooth, Hall Effect, etc.). For example, an RFID reader or reader/writer (hereinafter collectively "RFID reader" for brevity) (not shown) can be mounted toward the front of the coin processing machine and a RFID device or card (not shown) is fixed to a top portion of the coin receptacle sleeve 120. The RFID reader and device/card are aligned so that as a coin receptacle sleeve 120 is inserted or removed from the machine it passes adjacent the reader/writer to enable, for example, reading of the device/card. As a coin receptacle sleeve 120 passes by, the RFID reader indicates that a coin receptacle sleeve 120 has left the coin processing machine or entered the coin processing machine. The RFID reader also reads the coin receptacle sleeve's unique ID, allowing for generally tracking of a location of individual coin receptacle sleeves to provide an indication of a status of the machine. Alternatively, the RFID device/card may be disposed on one or more locations of each trolley, so as to, in combination with a stationary RFID reader, enable localization of the trolleys 110. In another aspects, such RFID device/card may be disposed on a coin bin, with location tracking being utilized at different points in the transportation of the coin bin from the coin processing machine to a final destination (e.g., the RFID device/card on a bin can be scanned when it is removed from the coin processing machine and again when it is loaded into an armored car). In a dual bin machine, an RFID reader may be centrally disposed at the front of the coin processing machine to allow it to scan both coin bins. In yet an additional variant, each coin receptacle sleeve 120 (or bin) has disposed thereon a unique barcode and a barcode scanner is utilized to read the barcode as the coin receptacle sleeve 120 is moved relative to the scanner. Thus, when a trolley bearing coin receptacle sleeves is removed from the coin processing machine (or a bin or bins are removed), the barcode is scanned and the coin processing machine tracks the changed status of the coin receptacle sleeves (or bins). In other optional configurations, an RFID tag can also or alternatively be incorporated into one or more of the individual bags. In this instance, the RFID tag can include data pertinent to each specific bag, such as the coin denomination of the bag, a bag serial number, a bag location and other tracking information, the customer name, the origin and destination, a time stamp, any abnormalities during the processing of the coins in the bag, the potential presence of counterfeit currency, etc. This feature is similarly applicable to coin bin implementations.

In at least some aspects, the tracking of the coin receptacle sleeves 120 (or bins) facilitates identification of specific coin receptacle sleeves (or bins) by an attendant attending to the coin processing machine. The intent is to eliminate or mitigate any confusion as to which coin sleeves/bags (or bins) need to be changed so that the attendant doesn't mistakenly change the wrong sleeves/bags (or bins). To this end, the coin receptacle sleeves 120 and/or trolley cradle elements 160 may be color-coded with the rear of the coin receptacle sleeves and/or trolley cradle elements being a different color than the front of the coin receptacle sleeves and/or trolley cradle elements. Further or alternatively, an LED printed circuit board (PCB) can be attached to each sleeve handle to indicate a full bag condition. The LED PCB may comprise a capacitor or battery to provide cable-less operation for relatively short periods of time (e.g., 10 minutes or more). The LEDs may too be color-coded or otherwise marked to indicate separately whether a front and/or rear coin receptacle sleeve 120 is full.

In yet other embodiments, a state of a coin receptacle is optionally determined using an acoustic (e.g., sonar) or electromagnetic (e.g., laser) emitter/receiver mounted in the coin processing machine above each coin receptacle sleeve 120 location (or bin location) and the sound/light used to measure the distance to the nearest object, such as a handle 130 of a coin receptacle sleeve 120, a coin bin cover if a coin bin is present (and the floor if a coin bin is not present), and/or even an upper level of coins disposed within the coin receptacle sleeve. In another example, Hall effect sensors are optionally mounted in the coin processing machine along a side of each coin bin location and a magnet mounted to or molded on the side of each coin bin provides a field that can be sensed by the Hall effect sensors to determine whether or not a coin bin is present. Alternatively, Hall effect sensors are optionally mounted in the manifold base 140 and magnets are mounted to or molded into the handles 130 of the coin receptacle sleeves 120 to determine whether or not a receptacle sleeves is present.

Figure 18B:
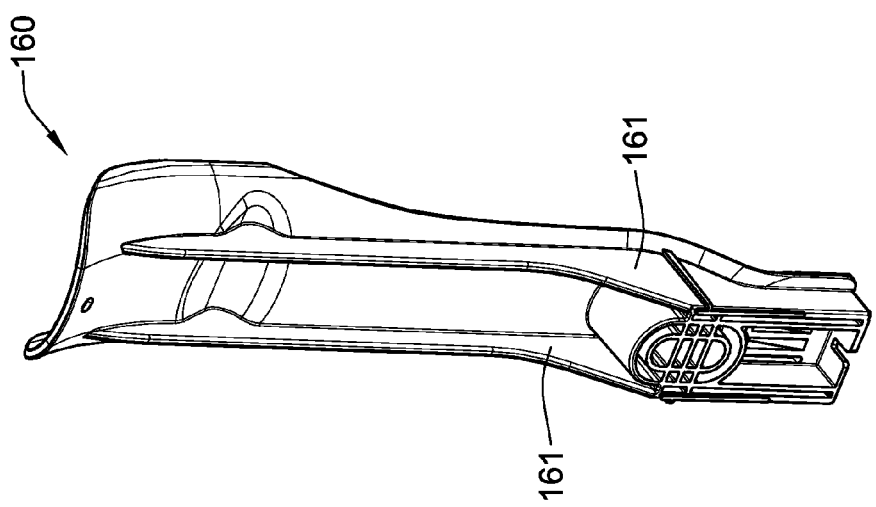
FIGS. 18a and 18b are alternate perspective-view illustrations of a coin receptacle sleeve cradle, in accord with aspects of the present concepts, which contacts a coin receptacle sleeve.
Figure 18A:
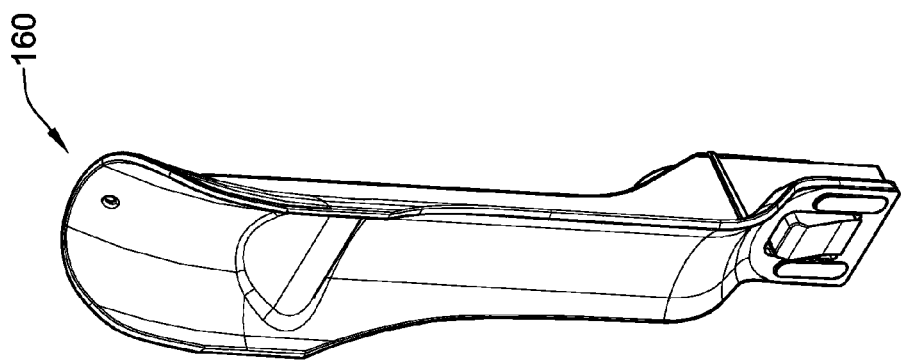

FIGS. 18a and 18b show aspects of trolley cradle elements 160, with FIG. 18a showing a front side of a representative trolley cradle element 160 that contacts the coin bag in which the coin receptacle sleeve 120 is disposed, and FIG. 18b showing a rear side of the trolley cradle element 160. The trolley cradle elements 160 (also referred to herein as "receptacle sleeve clamps") give structural support to the coin receptacle sleeves 120 when the trolley is racked out of the machine to retain the coin receptacle sleeves in position. The geometry of the trolley cradle elements 160 permits flexibility for sleeve breakaway, if required, and facilitates and guides coin receptacle sleeve 120 insertion. In the illustrated examples, the trolley cradle elements 160 are snap-fit into the trolley 110 base to allow for quick assembly and change of parts as needed. Of course, other conventional mechanical connection devices may be used. The top of the trolley cradle elements 160 are tapered to help guide the coin receptacle sleeve 120 sleeve into the proper position when inserting an empty coin receptacle sleeve (and coin bag disposed thereabout) into the trolley 110. Conventionally, it is very difficult to install the coin bag and place the coin bag holders into the coin processing machine. The two ribs 161 along the back side of the trolley cradle elements 160 provide rigidity and stability in the longitudinal direction, thereby enabling the trolley cradle elements 160 to transmit a clamping force on the coin receptacle sleeve 120. As noted above, the geometry of the trolley cradle elements 160 allows these elements to rotate, giving the coin receptacle sleeve 120 the ability to breakaway from the cradle's grasp if hit from the side. This prevents damage from the trolley system in case an attendant accidentally bumps into a racked-out trolley.

Figure 19:
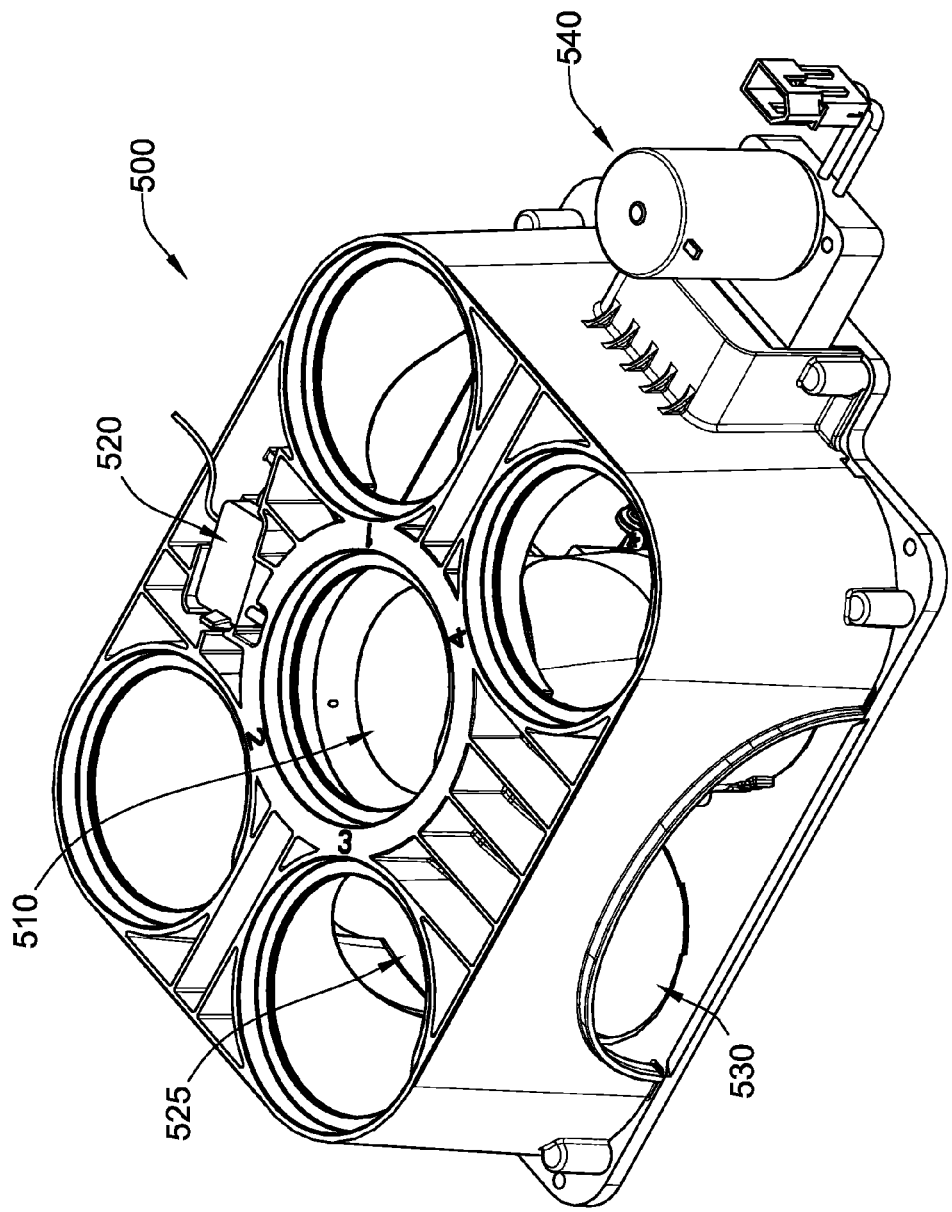
FIG. 19 is a perspective-view illustration of a representative configurable manifold component configured to divert coins from an input tube to one of four coin receptacle sleeve inputs in accord with aspects of the present concepts.
Figure 20:
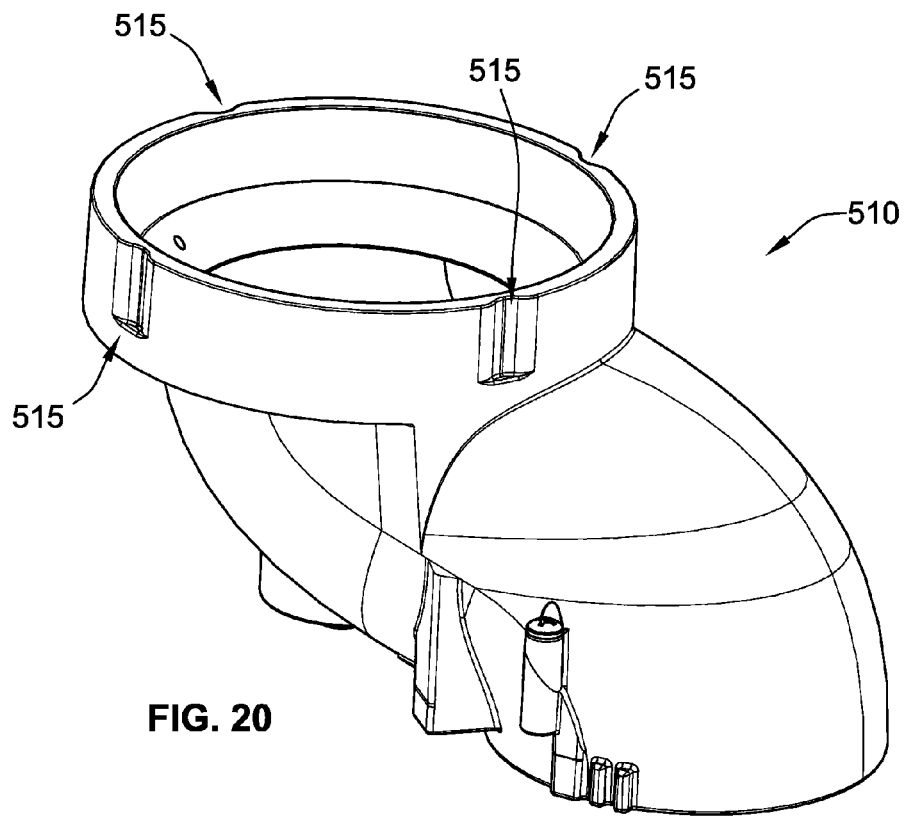
FIG. 20 is a perspective-view illustration of an example of a diverter tube in accord with aspects of the present concepts, the diverter tube being rotatably coupled relative to the configurable manifold component of FIG. 19.
Figure 21:
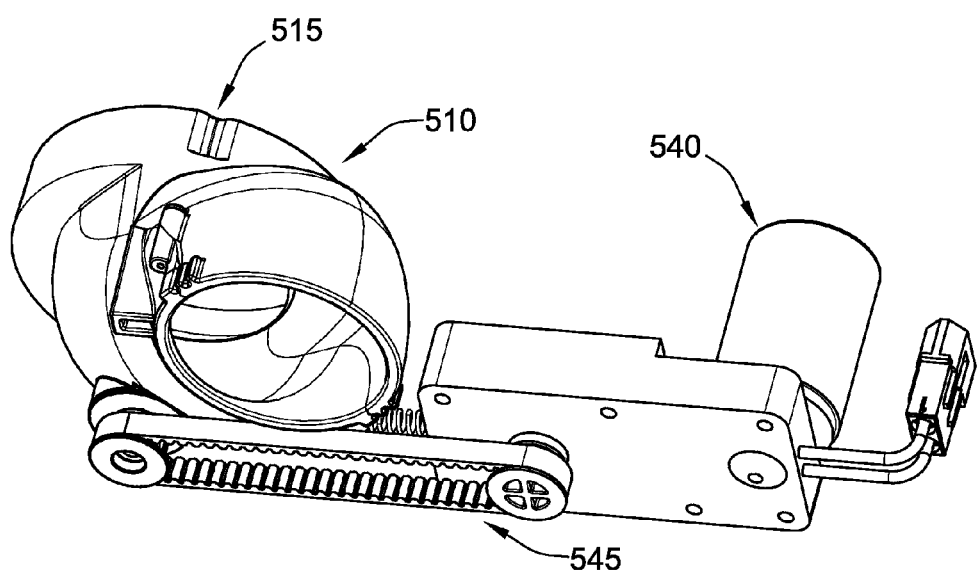
FIG. 21 is a perspective-view illustration of a motor with a timing-belt-drive system configured to rotate the diverter tube of FIG. 20 relative to the configurable manifold component of FIG. 19.
Figure 22:
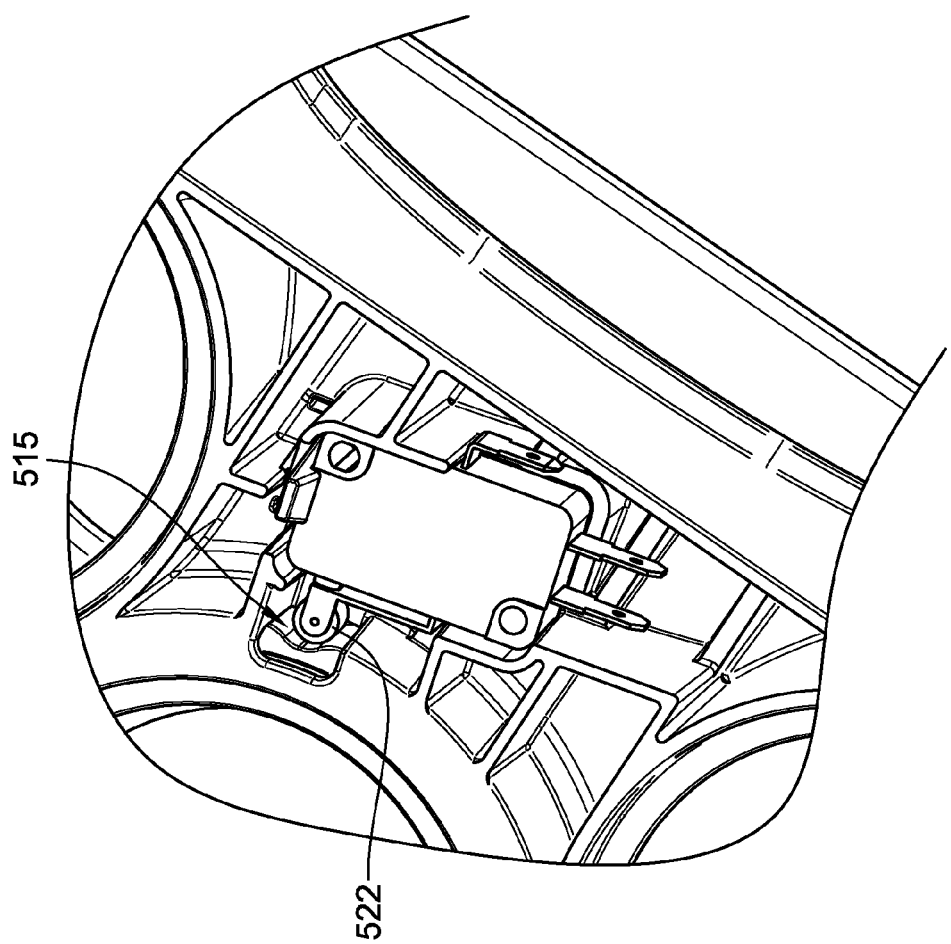
FIG. 22 shows an enhanced view of the configurable manifold component of FIG. 19, the rotatably coupled diverter tube of FIGS. 20 and 21, and a limit switch activated by engagement of a limit switch roller with spaced apart recesses in the diverter tube.

FIG. 19 shows a "quad switcher" 500, a configurable manifold 140 component that can divert coins from one input tube to one of four sleeves. To maintain the three inch bag compartment needed for 8 linear bag stations, the quad switcher has a rectangular shape. This shape causes the diverter tube from one quad switcher to swing inside of an adjacent quad switcher by 0.21" when rotating. However, the quad switcher 500 may assume other geometries if the three inch bag compartment constraint is altered.

Figure 27:
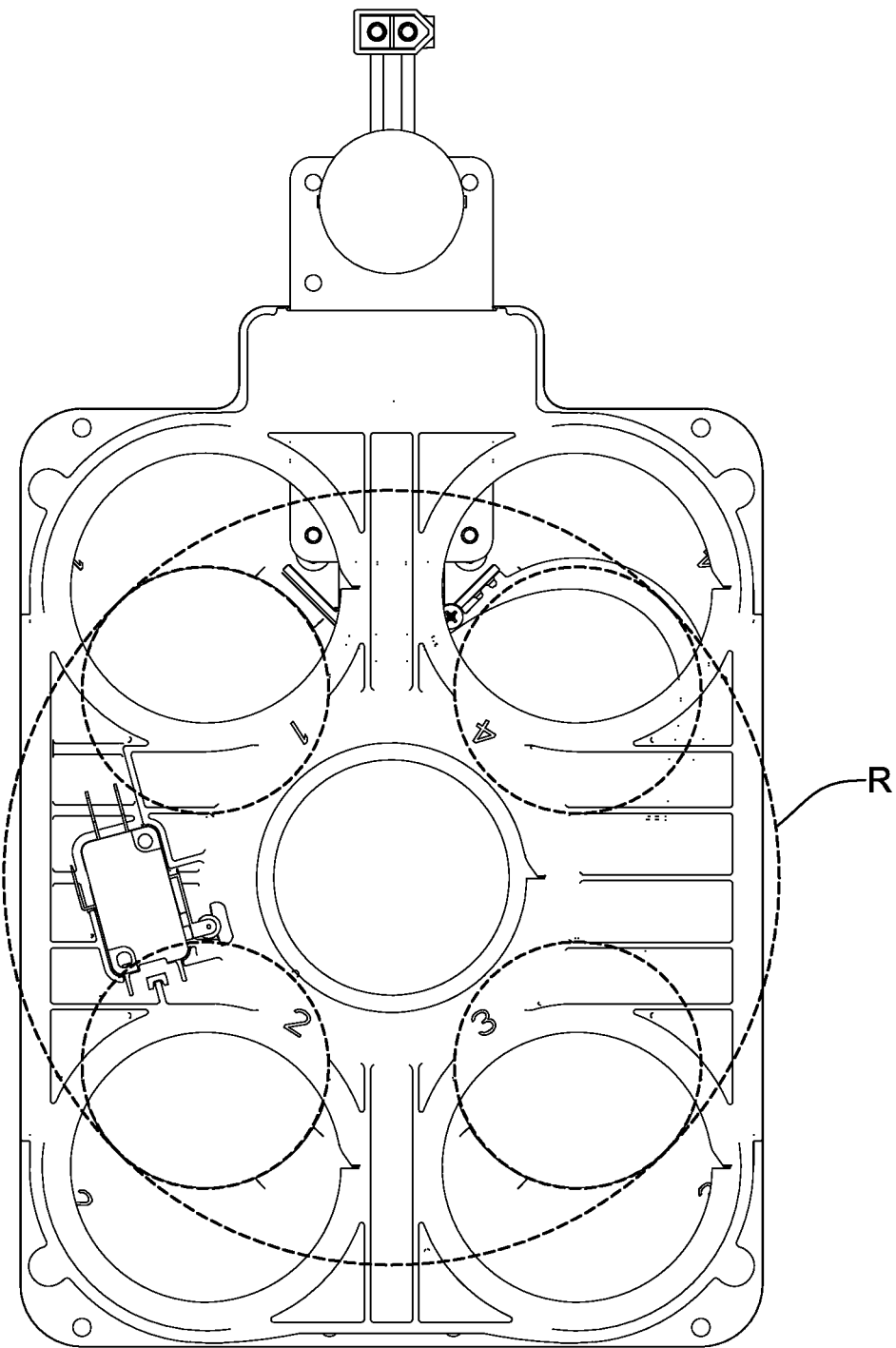
FIG. 27 is a top perspective-view illustration of the configurable manifold component of FIG. 19, showing an example of a path of rotation of the rotatably coupled diverter tube of FIGS. 20 and 21.

The quad switcher 500 has a rotatably-disposed, motorized diverter tube 510 that can direct coins from another coin input tube (not shown) to up to 4 coin receptacle sleeve 120 positions (in the illustrated embodiment) for filling. Individual positions can also optionally bypass the diverter tube 510 for direct filling if necessary (e.g., through upper hold 525 and then lower hole 530 in FIG. 19). The quad switcher 500, in the illustrated configuration, is 5.93" wide by 7.50" deep, allowing four adjacent quad switchers 500 to mount to the manifold base 140 and cover 16 bag/sleeve stations. Because of this optional, but presently preferred, packaging requirement, the paths of the diverter tubes 510, shown by radius R in FIG. 27, overlap. To avoid contact between adjacent diverter tubes 510, the position of each diverter tube is controlled by the motor 540 (e.g., a DC motor, a stepper motor, etc.) and is determined by mechanical stops and a limit switch 520 that engages with features (e.g. recesses, protuberences, etc.) in the diverter tube at specific locations (e.g., specific angular offsets).

The diverter tube 510 rotates around inside the quad switcher 500 to fill different bags disposed within coin receptacle sleeves 120. The diverter tube 510 is connected to the motor 540 via a drive system, such as a pulley and belt drive 545 or a gear system. Features 515 in the top portion of the diverter tube 510, such as dimples on a top edge of the diverter tube, engage with a limit switch to determine an angular position of the diverter tube. The limit switch 520 is activated whenever the roller 522 engages with the dimple 515 in the diverter tube 510, which are spaced in approximately 90° (e.g., approximately 80-100°) intervals in the illustrated example. When the limit switch 520 is active, the diverter tube 510 is aligned correctly above a coin bag/sleeve station.

Optionally, an encoder may be utilized to resolve the angular position of the diverter tube 510 relative to the manifold.

Figure 23:
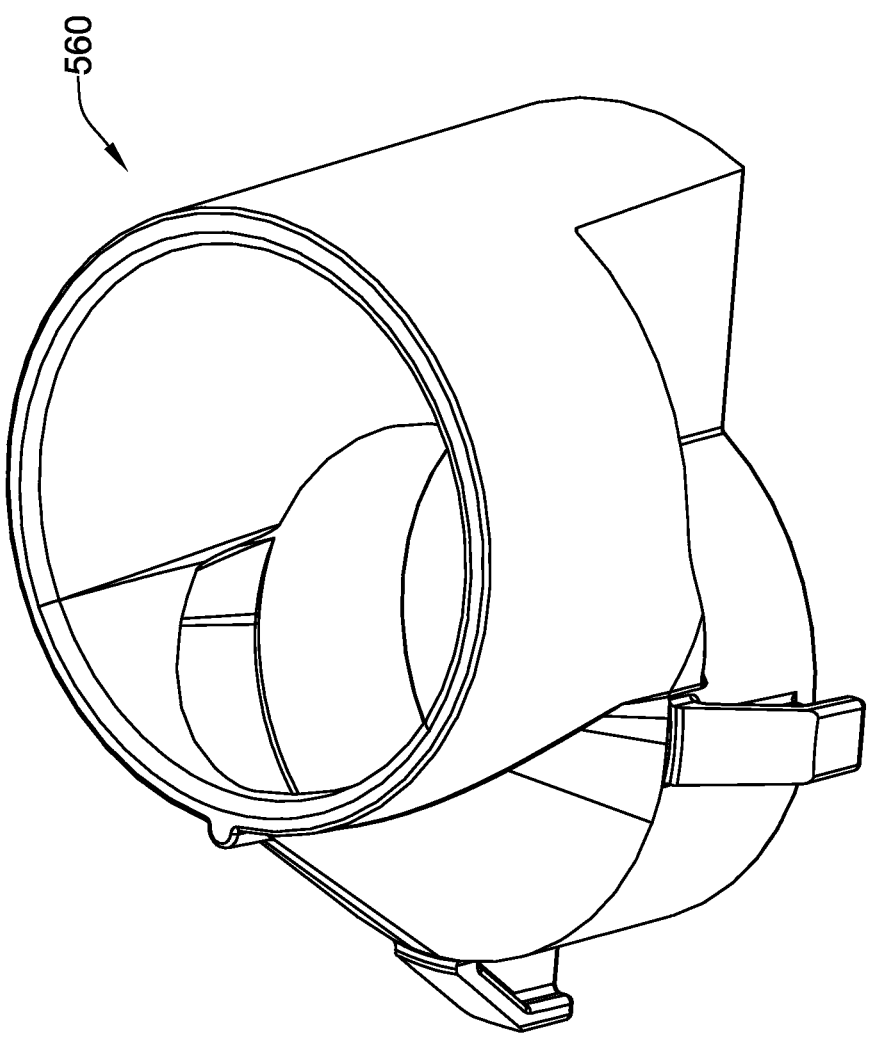
FIG. 23 is a perspective-view illustration of an example of a bypass tube, in accord with aspects of the present concepts, that can be used for configurations in which all four stations of the configurable manifold component of FIG. 19 are not the same denomination.
Figure 24:
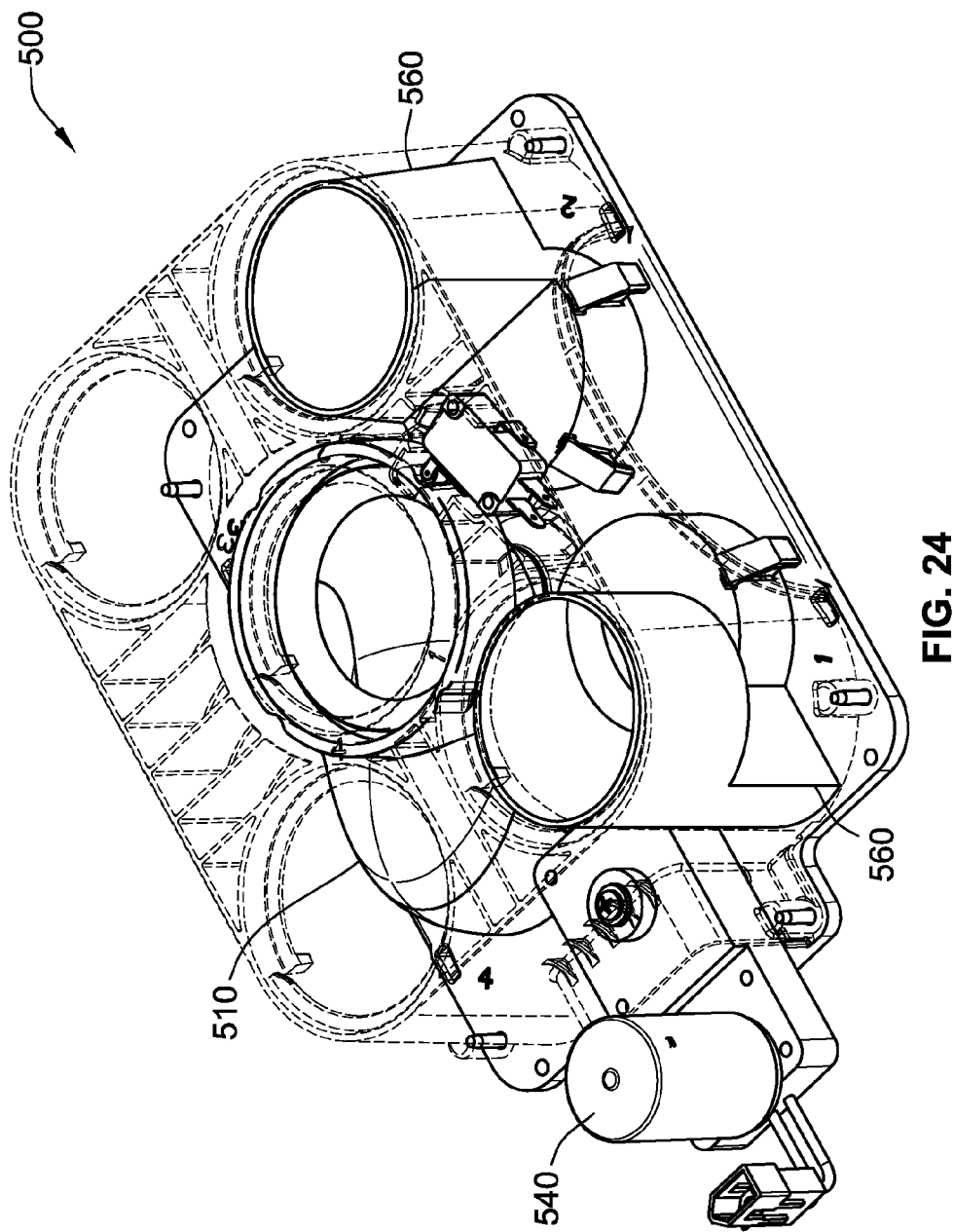
FIG. 24 is a bottom perspective-view illustration of the representative configurable manifold component of FIG. 19, with the outer shell hidden to show two bypass tubes, such as that shown in FIG. 23, disposed in two positions.

Bypass tubes 560, an example of which is shown in FIG. 23, are used for configurations in which all four stations are not the same denomination. For example, the diverter tube 510 can fill stations 1, 2, and 3 with pennies while a separate manifold tube feeds another station with another denomination. FIG. 24 shows an example wherein the quad switcher 500 includes bypass tubes 560 in positions 1 and 2.

Figure 25:
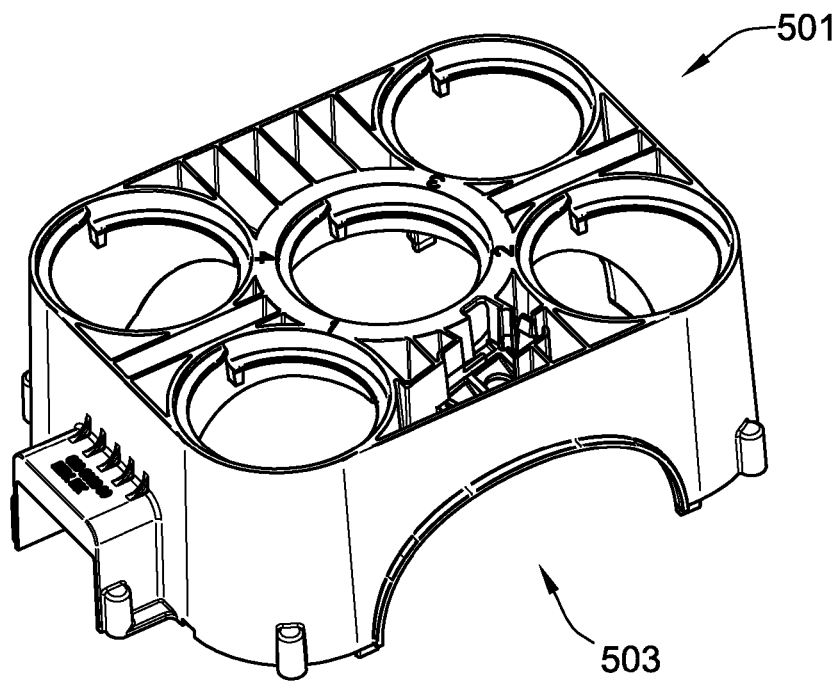
FIG. 25 is a perspective-view illustration of the shell of the configurable manifold component of FIG. 19.
Figure 26:
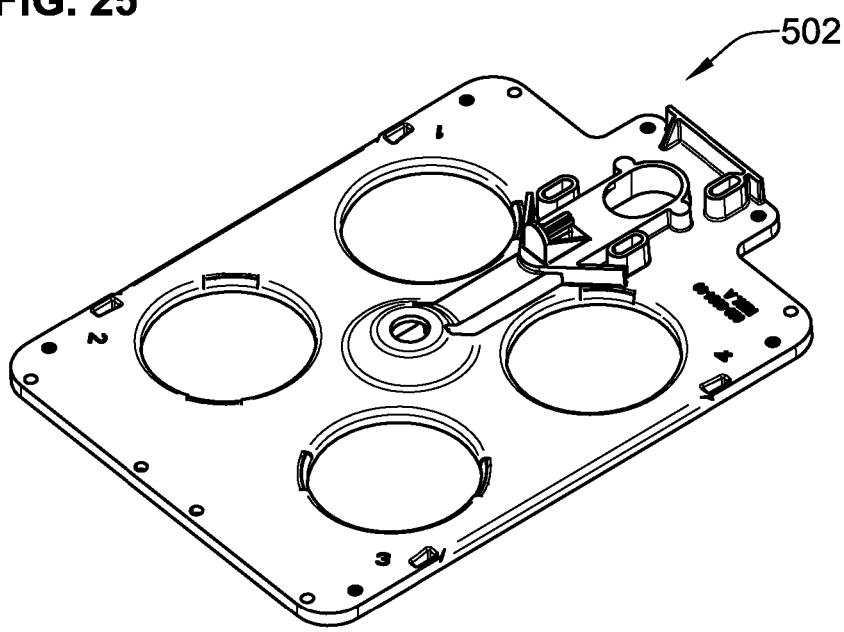
FIG. 26 is a perspective-view illustration of the base portion of the configurable manifold component of FIG. 19.

FIG. 25 depicts a shell or housing 501 of the "quad switcher" 500, the structure of the housing 501 defining locations for the bypass tubes 560, defining a recess or station for the limit switch 520, and acting as an upper bearing for the diverter tube 510 rotationally disposed relative thereto. The housing 501 has five openings, in the version shown, that can receive manifold tubes—one for each of the four possible bypass tube locations and one in the center for the diverter tube. A base portion 502 of the "quad switcher" 500 is shown in FIG. 26. the base portion 502 comprises a generally flat, rigid part on which the motor 540, diverter tube 510, and housing 501 can be releasably mounted (e.g., through snap fittings, male/female connectors, etc.). Positioning holes may optionally be provided to facilitate assembly. As noted above, the distance from the axis of rotation to the edge of each filling hole is 3.175 inches, so the diverter tube 210 travels in an arc with a diameter greater than the width of the quad switcher 500. To account for this, openings 503 are defined in the side of the housing 501 to permit the diverter tubes 510 to freely rotate. The positional tracking of the diverter tube 510 further ensures that no two tubes are rotating through the same area at the same time.

Figure 29:
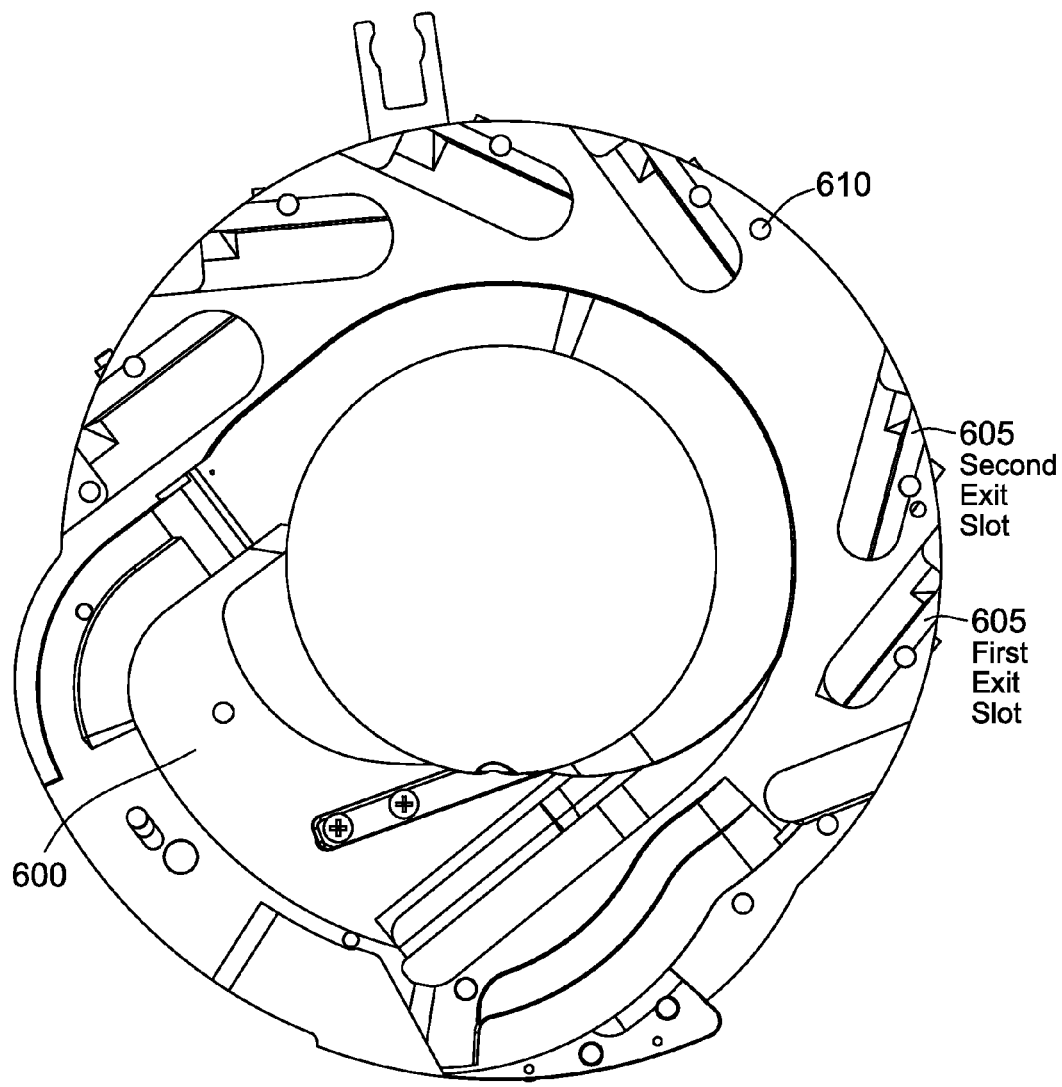
FIG. 29 shows an example of a sorting head in accord with aspects of the present concepts.
Figure 30:
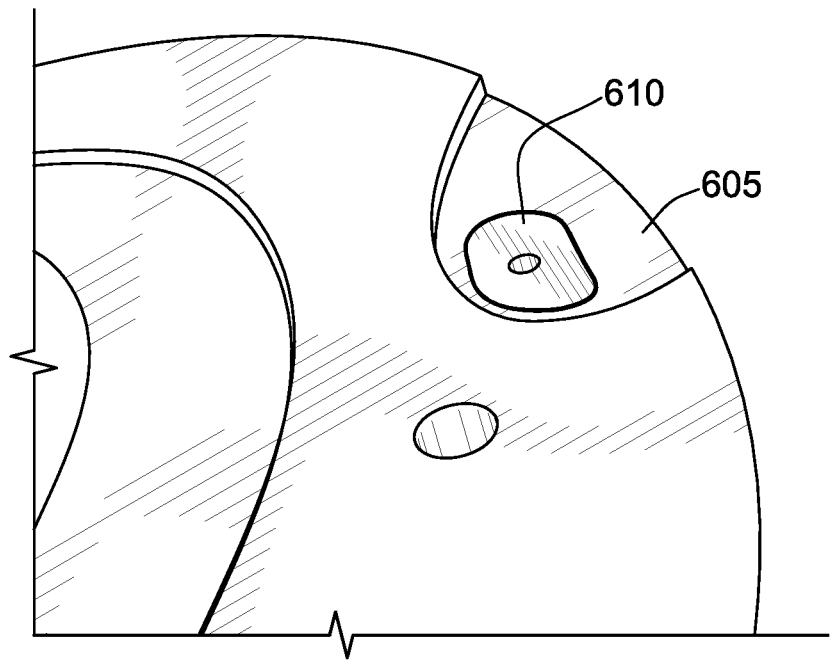
FIG. 30 is a view of a portion of the sorting head of FIG. 29, shown in a first state with a first exit slot open in accord with aspects of the present concepts.
Figure 31:
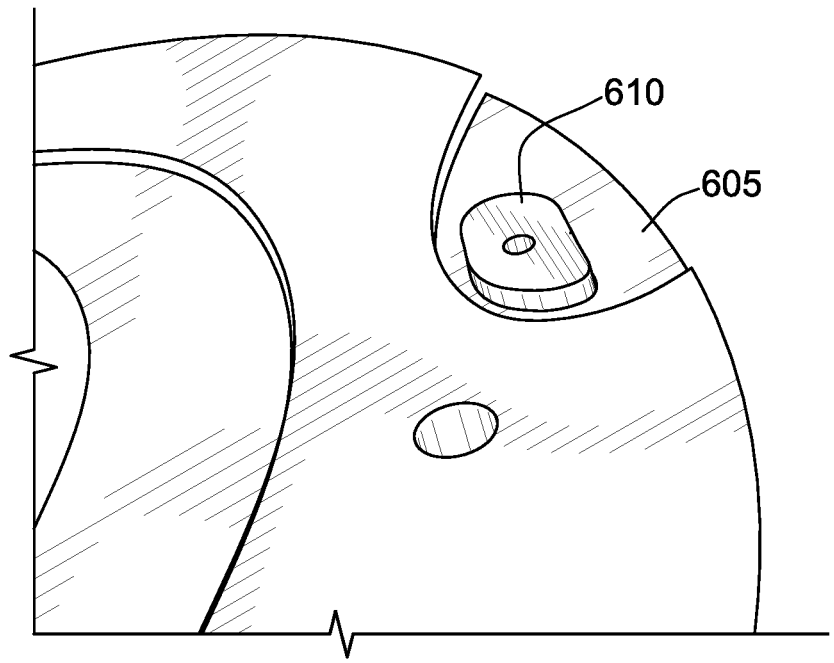
FIG. 31 is an alternate view of the portion of the sorting head shown in FIG. 30, showing the sorting head in a second state with a first exit slot closed in accord with aspects of the present concepts.

FIGS. 29-31 show an example of a sorting head 600 that can direct mixed coin flow into one of two exit slots 605 by activating a motor-driven blocking pin 610 that blocks the first exit slot. The sorting head 600 utilizes, for example, upstream counting (e.g., via a sensor or sensors embedded in the sorting head along a coin path) so that the mixed coins do not have to be mechanically sorted. The first exit slot 605 the coins come to has a motorized pin 610 that can be extended into, or withdrawn from, the exit slot. If the blocking pin 610 is up (e.g., in a contracted non-blocking orientation), all of the coins leave through the first exit slot and, for example, into a designated bin or mixed bag. When the first bin or first half of the mixed bags is full, the blocking pin 610 is introduced into the exit slot (e.g., extended into a blocking orientation) to thereby deflect all of the coins to the second exit slot, which directs them, for example, into the second bin or second half of mixed bags. In alternative arrangements, the sorting head 600 can have greater or fewer than two exit slots. Optionally, each exit slot or only selected exit slots will include a respective blocking pin.

In accord with at least some concepts, a code (e.g., an alphanumeric code, etc.) is printed on consumer transaction receipts to convey machine status to attendants (e.g., cashiers, managers, etc.). If the machine doesn't itself provide currency to a customer in exchange for input coins, every customer would have to take their receipt from their transaction to a counter or designated machine to redeem it for cash, gift card, etc. On the bottom of the receipt, a code contains information about the status of the machine (e.g., a status of each bag, bag limits, machine errors, and other diagnostic issues), but this information can be deciphered only by an attendant, manager, or other employee that has been trained to read it. In this manner, the attendant can know the status of the machine every time a customer makes a transaction, eliminating the need for the attendant to go to the machine and enter queries into an attendant screen.

In at least some aspects, coins are counted before mechanical sorting. Exit slots can then be controlled to accept different coins, allowing a universal sorted machine. In current technology, a mix of coins is first sorted mechanically by diameter thickness in discrete exit slots, where the machine counts coins as they pass by a sensor. This requires accurate mechanical sorting, so a different head is needed for every coin set. In accord with aspects of the present concepts, such as the sorting head of FIGS. 29-31, when counting is performed upstream, sensors in the sorting head measure the diameter and eddy current of coins as they pass by. Using software, these sensors are able to determine what denomination each coin is before it enters an exit slot. Universal exit slots can then be programmed to accept denominations by diameter. The result is a single universal machine that can built and then programmed to accept any coin set without any mechanical changes.

Further, using such upstream counting technology to count coins may be used to avoid a need to sort the coins for a mixed coin output (mixed bag or bin). Again, using current technology, a mix of coins is first sorted mechanically by diameter and thickness in discrete exit slots, where the machine counts coins as they pass by a sensor. This requires accurate mechanical sorting, so a different head is needed for every coin set. For mixed output machines, the sorted coins are just mixed together again in the manifold. With the upstream counting disclosed herein, the coins are never sorted. Sensors in the sort head measure the diameter and eddy current of individual coins as they pass and software uses these measurements to determine the denomination each coin, which then exits through either a single exit slot (for single bin) or two exit slots (dual bin or mixed bag). Since the coins are not sorted, a single universal machine can be used for any coin set.

Other aspects of the present disclosure may be directed to a trolley-less coin processing system that is implementable with a bag logic system, such as the bag logic system described above with respect to FIGS. 4 and 5, for example. This coin processing system includes one or more portable coin receptacles for receiving coins from a coin processing device (represented herein by the manifold 140 portrayed in FIG. 5), which may include any of the disk-type coin sorters described above, the coin processing devices set forth in the patents incorporated herein by reference, or any other now known or hereinafter developed coin processing device. In this regard, the trolley-less system can be functionally and operably configured similar to the embodiments of FIGS. 4 and 5, for example, to wirelessly communicate information to a controller of a coin processing unit, unless otherwise logically prohibited.

In one optional configuration, the trolley-less coin processing system includes one or more coin receptacle sleeves, which may be similar in function and design and, thus, can include any of the options and alternatives of the coin receptacle sleeves 120 of FIGS. 4, 5 and 8-11. In this embodiment, however, at least one of the coin receptacle sleeves (and, in some embodiments, at least eight sleeves) is movable into and out of the coin processing system housing without a wheeled trolley. For example, the coin receptacle sleeve(s) may not be designed to be operatively supported on or moved via a wheeled trolley. Alternatively, the coin receptacle sleeve(s) may only be designed to be operatively supported on or moved via a wheeled trolley once removed from the coin processing system's housing. Rather, in some embodiments, the coin receptacle sleeves are configured to be carried or otherwise manually transported, e.g., via one or more handles, shoulder straps, etc. In this regard, the manifold or other portion of the coin processing system or housing may be configured to receive, stow and/or operably support each of the coin receptacle sleeves. Some non-limiting examples include configurations with a housing that incorporates one or more channels, guide rails, conveyors, stanchions, locking mechanisms, support structures, etc., singly and in any combination, to receive, support, guide and/or secure the coin receptacle sleeves relative to the output(s) (e.g., configurable manifold 140 component) of the coin processing device. In at least some aspects of the present concepts, the coin receptacle sleeves are configured to permit removal from the housing by sliding the coin receptacle sleeves, and respective coin bag, out of the housing without the benefit of any external devices, such as wheels or rollers, to effectuate the movement of the coin receptacle sleeves and their respective coin bags. It may be desirable, in some embodiments, for the housing to include a base fabricated, at least in part, from acetal resins, such as Delrin®, or similar materials that provide high stiffness, low friction and excellent dimensional stability.

In at least one optional embodiment, the coin processing machine is motion activated, or otherwise is configured to start or respond to a person that passes within or enters a certain zone relative to a user interface device (e.g., one or more lasers, a pressure sensitive pad, etc.).

The display device for the coin processing device advantageously may comprise a 3-D display, and more specifically an autostereoscopic display utilizing autostereoscopic 3D imaging, such as those manufactured by Dimensional Technologies, Inc. of Rochester, N.Y. As another alternative, the display device for the coin processing device may comprise a haptic touch screen display.

In another aspect, the display device may display for the customer a barcode that may then be scanned by the customer using their own cell phone or personal electronic device, where it may then be stored as a virtual gift/loyalty card or optionally sent to someone else. For example, once a 2D barcode is stored in the customers cell phone, and optionally separately logged into a computer system monitoring redemption activities, a retailer may then use a bar code reader to read the bar code from the customer's cell phone at the point of sale. Thus, a customer at a coin processing machine may elect to redeem their input funds (coins, bills, etc.), value cards, store cards, etc., for a selected gift card (e.g., a Target Gift Card), which they then scan into their cell phone (e.g., using a camera application, using a near field communication, etc.) and that virtual Target Gift Card is then stored in their cell phone. The customer then brings their virtual GiftCard to the store, presents their cell phone display showing the relevant barcode at a point-of-sale location, and the desired amount is applied to the transaction. In another example, the barcode may be used by the customer, when surfing the web on his or her cell phone, to order a product from a company website, and have it shipped to a designated address.

In yet other aspects, the coin processing machine may be optionally equipped for voice communication, via voice-enabled technology, to permit audible instructions in English, Spanish, or any number of other languages, to users who cannot view information on the display device or who would otherwise prefer to interact with the coin processing device using audible cues. Audio jacks may optionally be employed in combination with headsets to enhance a degree of privacy and security to those users desiring audible communication with the coin processing machine.

Figure 32:
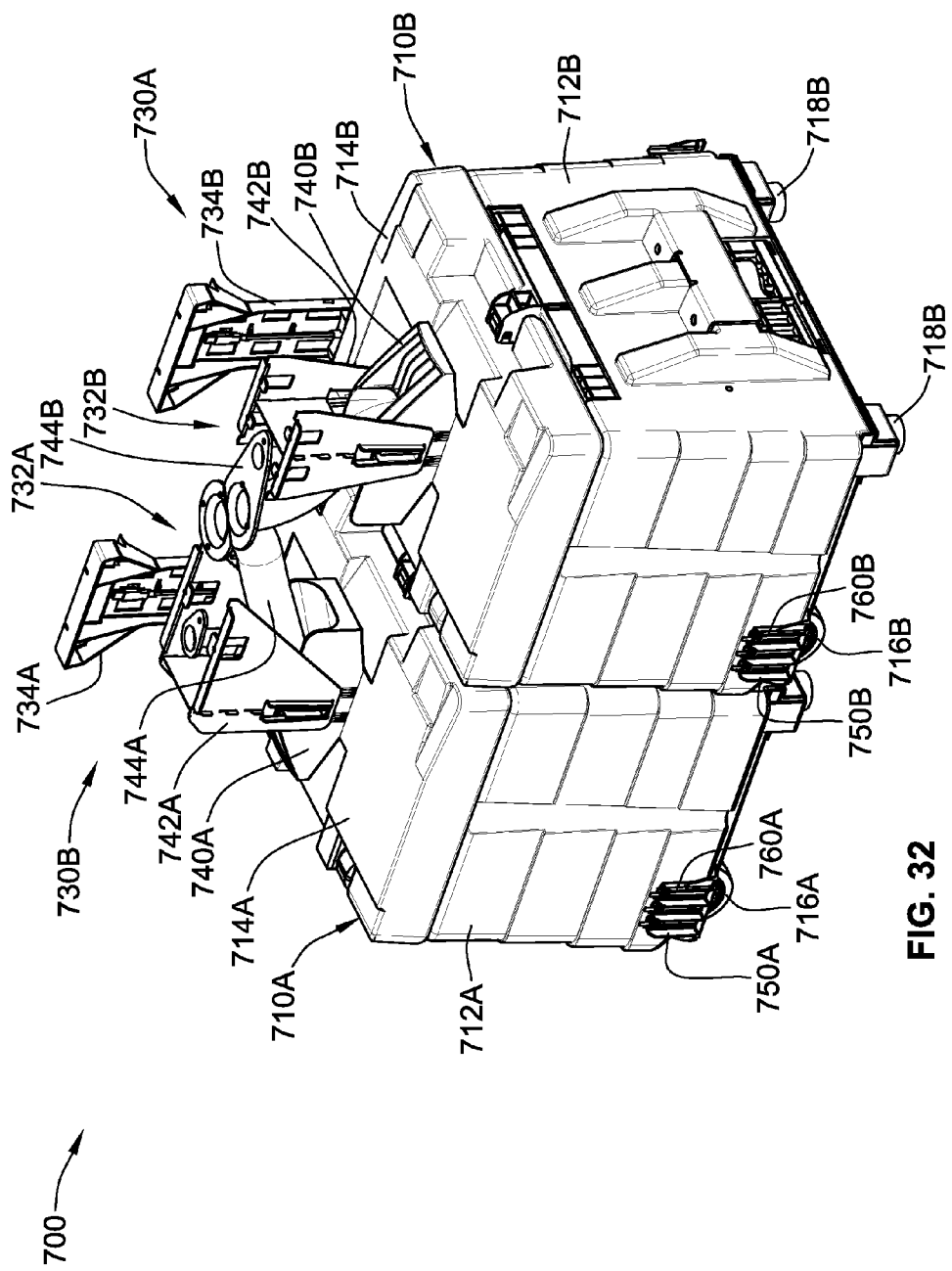
FIG. 32 is a perspective-view illustration of selected components of a representative coin processing system in accord with aspects of the present concepts.

Turning next to FIG. 32, a representative coin processing system, designated generally at 700, is illustrated in accordance with aspects of the present disclosure. The coin processing system 700 is portrayed herein by a number of representative parts, including first and second wheeled bins 710A and 710B, respectively, which are removably lodged in complementary bin stations 730A and 730B. Each bin station 730A, 730B includes a respective floating funnel system 732A and 732B that is mounted to a housing, which is represented herein by a pair of support columns 734A and 734B. The features of the present disclosure are not limited to the two-bin implementation presented in FIG. 32; rather, these features are similarly amenable to coin processing systems with greater or fewer than two wheeled bins and corresponding bin stations. In this regard, only selected components of the coin processing system 700 have been shown and will be described in detail herein. Nevertheless, the coin processing system 700 can include numerous additional components, such as a coin processing mechanism, security doors, input devices, such as a computer-based user interface, a variety of output devices, such as display screens, lighting elements, and audio speakers, many of which are described in the various patents and patent publications already incorporated herein by reference. Seeing as these components are well known in the art, they will not be described in further detail herein.

The wheeled bins 710A, 710B function generally as mobile coin receptacles—receiving coins from a coin processing device, such as the disk-type coin sorter described above, and transporting the received coins to another location. Each wheeled bin 710A, 710B includes a respective box-shaped coin container 712A and 712B with a security lid 714A and 714B that extends across and covers the container 712A, 712B. The coin containers 712A, 712B and security lids 714A, 714B can be fabricated from a variety of rigid and robust materials, including synthetic polymers, such as medium density polyethylene, and metallic materials, such as aluminum or steel. The coin containers 712A, 712B are each supported for movement thereof on a respective pair of laterally spaced casters or wheels 716A and 716B, located at a forward end of the container 712A, 712B. A pair of laterally spaced support stanchions 718A, 718B, are located at a rearward end of the container 712A, 712B on the opposite side of the casters 716A, 716B. In alternative configurations, the wheeled bins 710A, 710B may include greater of fewer than two casters or wheels each. Moreover, the bins 710A, 710B can be designed without wheels and moved via alternative means, such as air bearings, fork lifts, moving dollies, etcetera.

In the illustrated embodiment, the first and second wheeled bins 710A, 710B of FIG. 32 are substantially structurally identical; thus, for brevity and conciseness, additional features of the bins 710A, 710B will be described with respect to the wheeled bin 710A portrayed in FIG. 33. The lid 714A of the wheeled bin 710A includes a centrally located hole 720A through which coins received from the funnel system 732A pass into the coin container 712A. Leading and trailing guide ramps 715A and 717A, respectively, are integrally formed in the lid 714A, disposed on opposing sides of the central hole 720A. Hinged to a forward peripheral edge of the container 712A, the lid 714A can be swung open to provide access to the inside of the container 712, for example, to simplify removal of the contents of the container 712. Conversely, the lid 714A can be swung closed and locked shut, for example, via an optional security latch 722A for securing the contents of the container 712A.

The lid 712A can also be provided with optional structural features for securely supporting another wheeled bin on top of the wheeled bin 710A. In the illustrated embodiment, these features comprise four recessed stacking platforms: a pair of recessed wheel platforms 728A at a forward end of the lid 714A for nesting the wheels of another bin, and a pair of recessed stanchion platforms 728C at a rearward end of the lid 714A for nesting the support stanchions of another bin. The recessed platforms 728A, 728C allow for another wheeled bin, such as the second wheeled bin 710B, to be generally immobilized and securely stacked on top of the first wheeled bin 710A. The lid 714A can also be provided with an optional RFID reader or transmitter/receiver for wirelessly communicating, receiving and storing information, as developed in detail above. Moreover, a clean sleeve 729A for holding and displaying a receipt is situated on the top of the lid 714A adjacent the coin hole 720A.

The wheeled bin 710A is designed to be quickly and easily moved into and out of the bin station 730A. A socket 724A projects downward from a hitch chassis 726A which projects from the rear side of the coin container 712A. A complementary socket-ball of a cantilevered dolly (not shown) can be inserted into the socket 724A. The cantilevered dolly provides a mechanical advantage (e.g., 10:1) for lifting the rear end of the container 712A. By inserting the socket-ball into the socket 724A and applying a downward force to the opposite end of the cantilevered dolly, a moment arm is applied to the coin container 712A causing the wheeled bin 710A to pitch slightly forward off of the support stanchions 718A, placing the weight of the bin 710A on the casters 716A and cantilevered dolly. This allows for the wheeled bin 710A to be readily wheeled in and out of the bin station 730A. To prevent damage to sensitive electronics and other equipment in the bin station 730A, the housing 734A, 734B and/or bin 710A can be provided with means (e.g., a bracket) for limiting the height to which the wheeled bin 710A can be raised. The aforementioned wheel-and-stanchion arrangement, in combination with the use of the cantilevered dolly, helps to minimize the height of the wheeled bin 710A in comparison to its conventional counterparts.

The wheeled bins 710A, 710B, when properly lodged inside their respective bin stations 730A, 730B, can wirelessly communicate information to the housing 734A, 734B of the coin processing system 700. By way of non-limiting example, the bin logic system of FIG. 32 utilizes a number of electrically conductive interfaces for wirelessly communicating information. These electrically conductive interfaces are exemplified in the drawings by two contact blocks 750A and 750B (each of which is also referred to herein as "fifth electrical contact(s)") that are connected to respective bin stations 730A, 730B, and two sets of contact plates 760A and 760B (each of which is also referred to herein as "sixth electrical contact(s)") that are connected to respective bins 710A, 710B.

Figure 33:
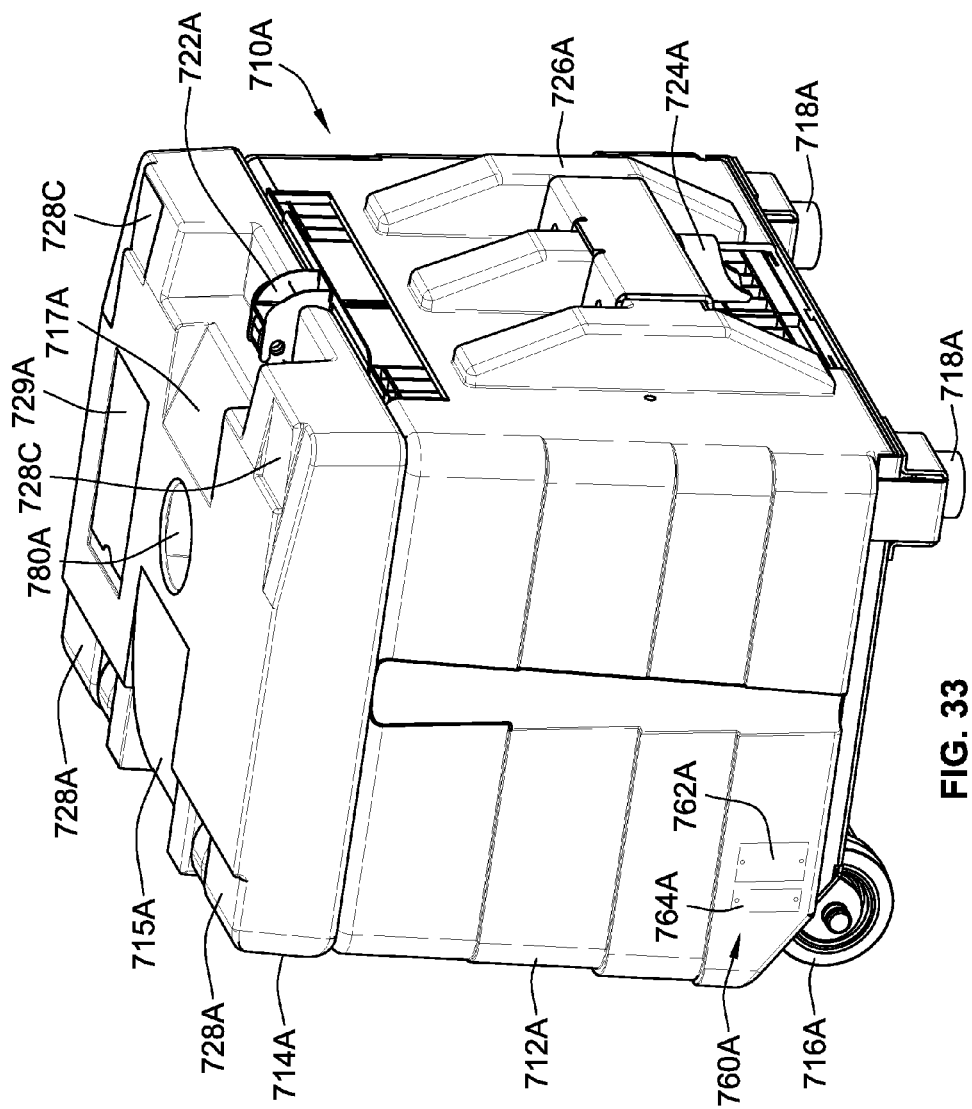
FIG. 33 is a perspective-view illustration of an example of a cable-free coin bin in accord with aspects of the present concepts.
Figure 34:
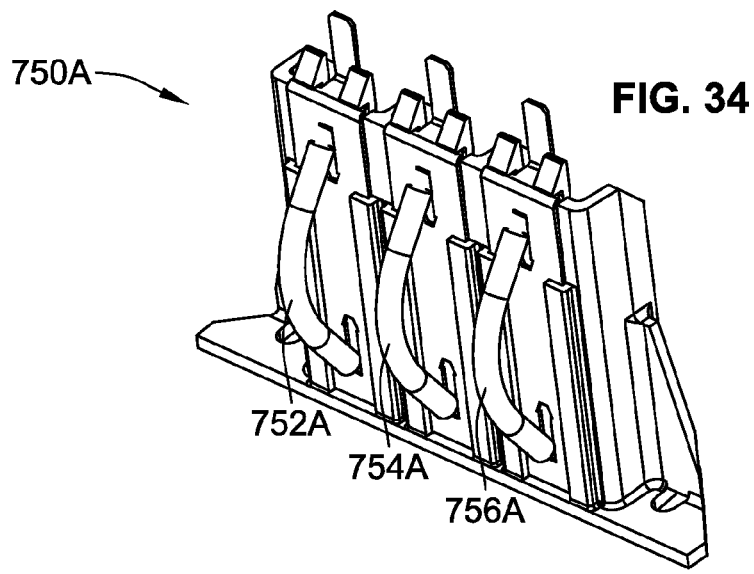
FIG. 34 is a perspective-view illustration of an example of a contact spring assembly in accord with aspects of the present concepts.

In the embodiment illustrated in FIG. 34, the contact block 750A includes three electrical contacts—i.e., first, second and third electrically conductive leaf-type contact springs 752A, 754A, and 756A, respectively. The set of contact plates 760A exemplified in FIG. 33, on the other hand, includes first and second electrically conductive contact plates 762A, 764A. As seen in FIG. 32, the contact plates 760A, 760B are each located at a lower, forward portion on a side wall of a respective coin container 712A such that when the wheeled bins 710A, 710B are functionally lodged inside their respective bin stations 730A, 730B, the contact plates 760A, 760B align with and electrically couple to a corresponding contact block 750A, 750B. In other words, as the first wheeled bin 710A is moved into the first bin station 730A, the contact plates 760A contemporaneously engage the contact block 750A, sequentially pressing against and deflecting the contact springs 752A, 754A, and 756A. It should be readily recognized that the location and orientation of the contact blocks 750A, 750B and contact plates 760A, 760B can be varied from what is shown in the drawings. By way of non-limiting example, the contact plates 760A could be located on the top of the wheeled bins 710A, 710B (e.g., on the lids 714A, 714B) to electrically mate with contact blocks 750A, 750B located on a corresponding section of the bin stations 730A, 730B, such as a bottom surface of one of the floating funnel systems 732A, 732B. It is also contemplated that alternative configurations can switch the attachment points of the contact blocks 750A, 750B and contact plates 760A, 760B, i.e., the contact blocks 750A, 750B are attached to the wheeled bins 710A, 710B and the contact plates 760A, 760B are attached to the bin stations 730A, 730B.

Figure 35:
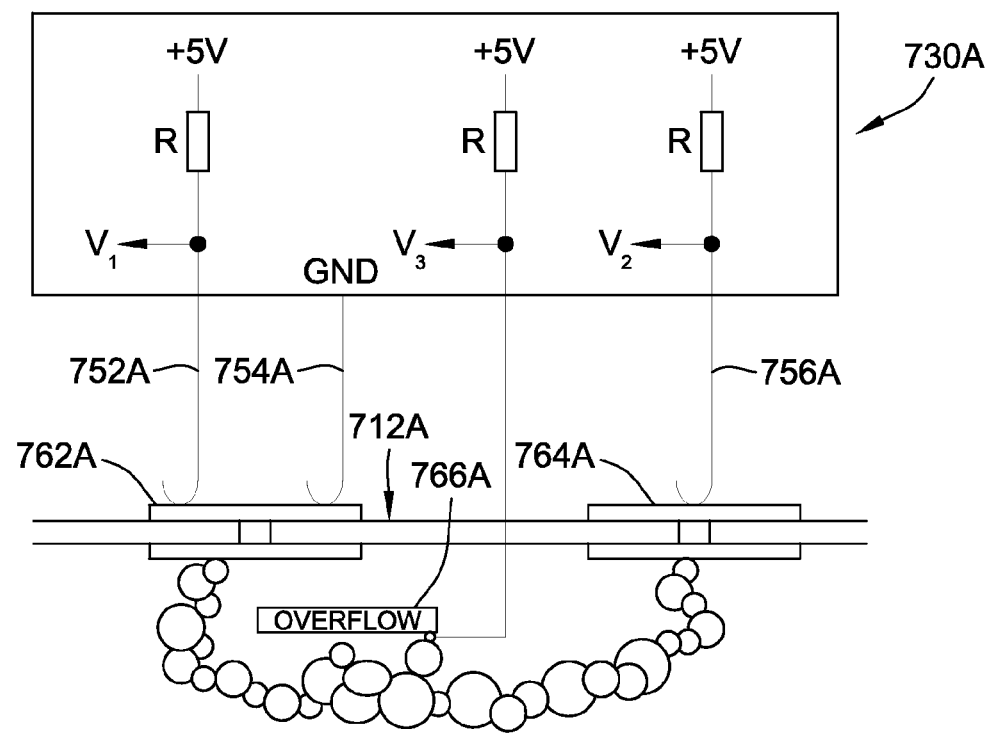
FIG. 35 is a schematic diagram illustrating the logic of the electrical contacts shown in FIGS. 32-34.
Figure 36:
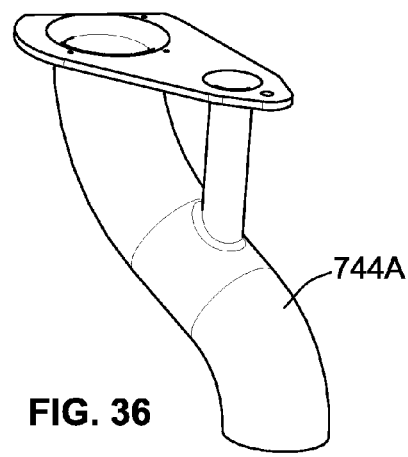
FIG. 36 is a perspective-view illustration of an exemplary coin tube in accord with aspects of the present concepts.

FIG. 35 is a schematic diagram illustrating the logic of the electrical contacts presented in FIGS. 32-34. As previously noted, the contact plates 760A are designed to press against and electrically connect with one or more of the contact springs 752A, 754A, 756A when the wheeled bin 710A is properly positioned inside the bin station 730A underneath the funnel system 732A to receive therefrom processed coins. Once conductively coupled, these electrically conductive interfaces are operable to communicate information to the bin station 730A. In this arrangement, described further below, the bin logic system can determine, singly or in combination, whether a wheeled bin 710A is present inside the bin station 730A and the coin container 712A is in the correct position (e.g., properly oriented to receive processed coins from a coin processing device), whether there are coins in the container 712A, and if there is an overflow of coins out of the coin container 712A.

With continued reference to FIG. 35, the bin logic system can determine that a wheeled bin 710A is present inside (or absent from) the bin station 730A and, in some embodiments, whether the coin container 712A is in the correct position for receiving processed coins. This can be accomplished, for example, through synchronous engagement between the first and second contact springs 752A, 754A and the first contact plate 762A. In particular, when the bin 710A is functionally received by the bin station 730A, the first contact plate 762A short circuits (i.e., completes an electrical path between) the first and second contact springs 752A, 754A whereby an electrical signal (illustrated as a 5V current) is passed from the first contact spring 752A to the second contact spring 754A, which is ground. As indicated in the chart of FIG. 35, a zero voltage across V1 is indicative of a bin being present, whereas a voltage signal (e.g., 5V) across V1 is indicative of a bin being absent from the bin station 730A. As an aside, the first and second contact plates 762A, 764A are illustrated in FIG. 35 as each comprising a tripartite construction with opposing inside and outside bin plates that are attached by electrically conductive fasteners. It should be noted, however, that this arrangement is not critical the functionality of the bin logic system; as such, each of the contact plates 762A, 764A of FIG. 35 could just as easily be replaced with a single piece, integrally formed contact plate.

The illustrated bin logic system is also operable to determine whether there are coins present inside the coin container 712A or, alternatively, whether a predetermined number of coins have been received by the coin container 712A. This is accomplished, for example, through synchronous engagement between the second and third contact springs 754A, 756A and the first and second contact plates 762A, 762B. Specifically, when a minimum number of coins (e.g., 500-1000) are present inside the container 712A (which is portrayed in FIG. 35 for explanatory purposes as "Conductive Coin Mass") an electrical path is formed such that an electrical signal (illustrated as a 5V current) is passed from the third contact spring 756A, through the second contact plate 764A to the first contact plate 762A via the coins, and grounded through the second contact spring 754A. As indicated in the chart of FIG. 35, a zero voltage across V2 is indicative of coins being present inside the coin container 712A.

The bin logic system of FIG. 35 can further determine if there is an overflow situation in the coin container 712A, for example, through the shorting of an "overflow circuit." This can include, for example, the synchronous engagement between the first contact plate 642A, the second contact spring 754A, and an overflow contact plate 766A mounted proximate the hole 720A of the lid 714A. By way of clarification, when the coin container 712A is filled to capacity, coins will begin to flow out of the hole 720A in the lid 714A and eventually touch the overflow contact plate 766A, which is located, in some embodiments, on a bottom surface of the funnel 740A of the floating funnel system 732A. In so doing, the overflowing coins short circuit (i.e., form an electrical path between) the overflow contact plate 766A and the first contact plate 762A whereby an electrical signal (illustrated as a 5V current) is passed from the overflow contact plate 766A and grounded through the second contact spring 754A. As indicated in the chart of FIG. 35, a zero voltage across V3 is indicative of coins overflowing out of the container 712A. As an optional feature, the second contact spring 754A also acts as an electrostatic discharge (ESD) path for grounding static electricity generated by the coins as they discharge into the coin container 712A.

Turning next to FIG. 32, with collective reference to FIGS. 33 and 36-38 as well, each of the bin stations 730A and 730B includes a coin manifold (not shown) with an optional floating funnel system 732A and 732B that hangs downwardly therefrom. Each of the floating funnel systems 732A, 732B comprises a respective coin funnel 740A and 740B that is movably mounted to the coin manifold and configured to direct coins received from the coin processing unit into the coin containers 712A, 712B (e.g., via the opening 720A in the lid 714A) of the wheeled bins 710A, 710B. In the illustrated embodiment, a metal bracket 742A and 742B is utilized to movably mount each of the coin funnels 740A, 740B to the coin manifold, as developed in further detail hereinbelow. A stationary tube 744A and 744B directs coins from a coin processing unit (not shown) via the coin manifold to a respective coin funnel 740A and 740B. A first "upper" end of each stationary tube 744A, 744B is rigidly fastened or otherwise mechanically attached to the coin manifold. On the opposite side of the tube 744A, 744B, the second "lower" end is aligned with, but not directly attached to the coin funnel 740A, 740B. In some embodiments, the diameter of funnel hole 738A is larger than diameter of the second end of the stationary tube 744A, but smaller than the opening 720A in the lid 714A.

Figure 37:
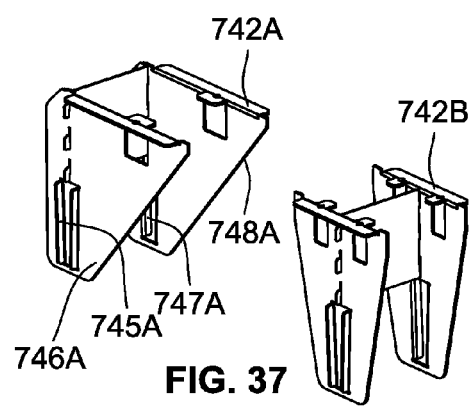
FIG. 37 is a perspective-view illustration of a pair of exemplary mounting brackets in accord with aspects of the present concepts.
Figure 38:
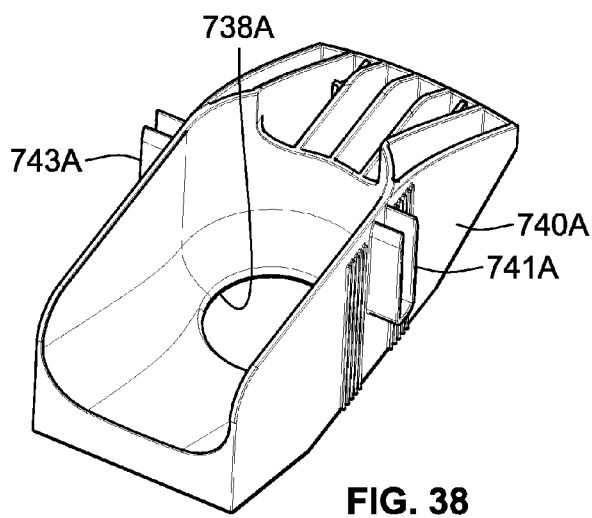
FIG. 38 is a perspective-view illustration of an exemplary coin funnel in accord with aspects of the present concepts.

In the illustrated embodiment, each of the coin funnels 740A, 740B has at least one degree of translational freedom and at least one degree of rotational freedom. For instance, the coin funnel 740A illustrated in FIG. 38 has a pair of tabs 741A and 743A, each of which projects transversely from and extends generally vertically along a respective side of the funnel 740A. These tabs 741A, 743A are each received in a complementary elongated guide slot 745A and 747A, respectively, that is formed through a corresponding support plate 746A and 748A of the bracket 740A. The aforementioned guide slots 745A, 747A extend vertically such that the coin funnel 740A can translate up and down, as indicated by the vertically oriented dual-headed arrow in FIG. 32. In addition, as seen in FIG. 37, the width of the guide slots 745A, 747A— i.e., narrows from top to bottom, such that the tabs 741A, 743A can pivot inside the guide slots 745A, 747A and, thus, the coin funnel 740A can pitch forward and backward, as indicated by the arcuate dual-headed arrow in FIG. 32. The limits of translation and rotation are defined by the geometry of the translating funnel tracks. The floating funnel systems 732A, 732B may also be provided with an optional swivel mechanism which would allow the funnel 740A, 740B to rotate about a vertical axis.

As mentioned above, leading and trailing guide ramps 715A, 717A are integrally formed in the lid 714A of the bin 710A, each of which is disposed on an opposing side of the central hole 720A. When the wheeled bin 710A is moved into or out of the bin station 730A, the lid 714A will come into contact with the floating funnel system 732A, and one of the guide ramps 715A, 717A will slidably press against and direct the coin funnel 740A to the opening 720A. This contact will cause the translating coin funnel 740A to rise and pivot as needed to clear the top of the bin 710A. The vertically oriented sidewalls of the guide ramps 715A, 717A act as guiding surfaces to ensure that the coin funnel 740A properly aligns with the opening 720A. In addition, the coin funnel's 740A ability to pivot (i.e., pitch backward and forward) ensures that the angle of the guide ramps 715A, 717A complements the underside surface of the coin funnel 740A. In optional arrangements, biasing members, such as helical compression springs, can be employed to bias the coin funnels 740A, 740B downwards. Otherwise, the coin funnels 740A, 740B naturally translate downwards under the force of gravity. When the bin 710A is lowered off the dolly to a final position, the translating coin funnel 740A will lower as well. The rotational freedom of the coin funnel 740A about a lateral axis will permit a surface to surface seal between the funnel 740A and the lid 714A, minimizing or otherwise preventing coin leakage. This rotational freedom helps to ensure a seal that will compensate for a reasonable difference between the angle of the coin processing system 700 and the angle of the bin 710A.

As to some aspects of the disclosed concepts, the spirit of maintaining a wireless connection between the trolley/bin and manifold system is a key element of design. Even though some of the illustrated embodiments do not use wiring that allows for feedback when the trolley/bin is pulled out of the processing machine, that does not preclude the use of wireless sensors (such as intelligent sensors and devices employing spread spectrum signal hopping, such as Bluetooth, to allow for networking of the devices). For instance, an RFID tag can be utilized to provide, for example, a tracking number for managing the trolleys/bins and, in some embodiments, to provide a mechanism for a Close Loop Settlement process, whereby the Coin Processing machine can write the Coin Count Totals and Date and Time to an internal memory of the RFID tag for use at the coin processing center to provide additional levels of coin transfer integrity in the coin processing settlement process.

While many preferred embodiments and best modes for carrying out the present disclosure have been described in detail above, those familiar with the art to which this disclosure relates will recognize various alternative designs and embodiments for practicing the invention within the scope of the appended claims.

What is claimed is:

1. A coin processing system for processing and transmitting coins to one or more coin bags, the coin processing system comprising:
a housing with a coin input area configured to receive a batch of coins;

a coin processing unit operatively coupled to the coin input area, the coin processing unit being configured to count, discriminate, sort, value, or any combination thereof, coins received from the coin input area;

a wheeled trolley removably disposed within the housing, the wheeled trolley including a base and a removable coin receptacle sleeve supported by the base, the wheeled trolley being configured to receive at least some of the coins output from the coin processing unit, the wheeled trolley including a first electrical contact; and a controller with a communication interface operatively attached to the housing, the communication interface including a second electrical contact configured to wirelessly communicate electrical signals with the first electrical contact of the wheeled trolley, wherein the base of the wheeled trolley includes the first electrical contact, and the removable coin receptacle sleeve includes a third electrical contact configured to cooperate with the first electrical contact to thereby wirelessly communicate to the communication interface of the controller via the second electrical contact a signal indicative of at least one of the presence or absence of a coin bag on the wheeled trolley.

2. The coin processing system of claim 1, wherein the removable coin receptacle sleeve has an upper portion adjacent a lower portion, at least the lower portion of the removable coin receptacle sleeve being configured to fit inside the coin bag, at least the upper portion of the removable coin receptacle sleeve being configured to extend out of the coin bag such that a full coin height to which coins can be fed into the removable coin receptacle sleeve is above a bag height of the coin bag.

3. The coin processing system of claim 2, wherein the upper portion has a first volume and the lower portion has a second volume smaller than the first volume.

4. The coin processing system of claim 1, wherein the removable coin receptacle sleeve includes an elongated hollow tubular body with a first opening having a first size at an upper end of the tubular body, and a second opening having a second size at a lower end of the tubular body, the first size being larger than the second size.

5. The coin processing system of claim 1, wherein the removable coin receptacle sleeve is configured to maintain the received coins within a confined footprint.

6. The coin processing system of claim 1, wherein the removable coin receptacle sleeve is configured to provide a generally rigid internal geometry to the coin bag.

7. The coin processing system of claim 1, wherein the removable coin receptacle sleeve includes a sleeve deflector configured to change a trajectory of the coins received from the coin processing unit.

8. The coin processing system of claim 1, wherein the removable coin receptacle sleeve includes a handle extending across an opening in the top of the coin receptacle sleeve, the handle being configured to maintain the opening at a constant width.

9. The coin processing system of claim 1, wherein the wheeled trolley includes one or more receptacle sleeve clamps configured to secure the coin receptacle sleeve to the base and support the coin receptacle sleeve in an upright position.

10. The coin processing system of claim 1, wherein the first electrical contact includes a pair of contact plates mounted to the base and connected by a resistor, and the third electrical contact includes a pair of contact strips each mounted to a respective side of the removable coin receptacle sleeve, and wherein, in the absence of a coin bag, each of the contact plates is configured to abut a respective one of the contact strips thereby completing an electrical path therebetween.

11. The coin processing system of claim 1, wherein the wheeled trolley includes a plurality of coin receptacle sleeves, the coin processing system further comprising a coin diverting mechanism configured to switchably direct coins received from the coin processing unit to a selected one or ones of the plurality of coin receptacle sleeves.

12. The coin processing system of claim 1, wherein the wheeled trolley includes at least one of an RFID device, a bar code, a sonar device, and a Hall Effect device to wirelessly communicate the information to the communication interface of the controller.

13. A coin processing system for processing and transmitting coins to one or more coin bags, the coin processing system comprising:

a housing with a coin input area configured to receive a batch of coins;

a coin processing unit operatively coupled to the coin input area, the coin processing unit being configured to count, discriminate, sort, value, or any combination thereof, coins received from the coin input area;

a wheeled trolley removably disposed within the housing, the wheeled trolley including a base and a removable coin receptacle sleeve supported by the base, the wheeled trolley being configured to receive at least some of the coins output from the coin processing unit, the wheeled trolley including a first electrical contact; and a controller with a communication interface operatively attached to the housing, the communication interface including a second electrical contact configured to wirelessly communicate electrical signals with the first electrical contact of the wheeled trolley, wherein the removable coin receptacle sleeve includes an additional electrical contact configured to cooperate with the second electrical contact operatively attached to the housing to thereby wirelessly communicate to the communication interface of the controller a signal indicative of at least one of a presence or a position of the removable coin receptacle sleeve relative to the housing.

14. The coin processing system of claim 13, wherein the removable coin receptacle sleeve includes a handle, the housing includes a coin manifold, the additional electrical contact includes a pair of contact plates mounted to the handle, the second electrical contact includes a pair of springs mounted to the coin manifold, and wherein, when the wheeled trolley is functionally received by the housing, each of the contact plates touches a respective one of the springs thereby completing an electrical path therebetween.

15. A coin processing system for processing and transmitting coins to one or more coin bags, the coin processing system comprising:

a housing with a coin input area configured to receive a batch of coins;

a coin processing unit operatively coupled to the coin input area, the coin processing unit being configured to count, discriminate, sort, value, or any combination thereof, coins received from the coin input area;

a wheeled trolley removably disposed within the housing, the wheeled trolley including a base and a removable coin receptacle sleeve supported by the base, the wheeled trolley being configured to receive at least some of the coins output from the coin processing unit, the wheeled trolley including a first electrical contact; and a controller with a communication interface operatively attached to the housing, the communication interface including a second electrical contact configured to wirelessly communicate electrical signals with the first electrical contact of the wheeled trolley, wherein the removable coin receptacle sleeve includes a third electrical contact configured to cooperate with the second electrical contact to thereby wirelessly communicate to the communication interface of the controller a signal indicative of a characteristic of coins inside the removable coin receptacle sleeve.

16. The coin processing system of claim 15, wherein the housing further includes a coin manifold, the second electrical contact includes a pair of springs mounted to the coin manifold, and the third electrical contact includes a pair of contact strips each mounted to a respective side of the removable coin receptacle sleeve, and wherein, in the presence of a minimum number of coins, an electrical path is formed between the pair of springs and the pair of contact strips via the coins.

17. A coin processing system for processing and transmitting coins to one or more coin bags, the coin processing system comprising:
a housing with a coin input area configured to receive a batch of coins;
a coin processing unit operatively coupled to the coin input area, the coin processing unit being configured to count, discriminate, sort, value, or any combination thereof, coins received from the coin input area;
a wheeled trolley removably disposed within the housing, the wheeled trolley including a base and a removable coin receptacle sleeve supported by the base, the wheeled trolley being configured to receive at least some of the coins output from the coin processing unit, the wheeled trolley including a first electrical contact; and
a controller with a communication interface operatively attached to the housing, the communication interface including a second electrical contact configured to wirelessly communicate electrical signals with the first electrical contact of the wheeled trolley,
wherein the removable coin receptacle sleeve includes a handle, the first electrical contact includes two or more contact plates mounted to the handle, the second electrical contact including two or more electrical contacts, the two or more contact plates being configured to substantially simultaneously engage the two or more electrical contacts when the wheeled trolley is functionally received by the housing.

18. The coin processing system of claim 17, wherein the wheeled trolley includes a plurality of coin receptacle sleeves, the coin processing system further comprising a coin diverting mechanism configured to switchably direct coins received from the coin processing unit to a selected one or ones of the plurality of coin receptacle sleeves.

19. The coin processing system of claim 18, wherein the coin diverting mechanism includes a driving mechanism coupled to a rotatable diverter tube, the driving mechanism being configured to selectively rotate the diverter tube between a plurality of sleeve positions, wherein, at each of the sleeve positions, coins received by the coin diverting mechanism pass through the diverter tube into the selected one of the plurality of coin receptacle sleeves.

20. The coin processing system of claim 19, wherein the coin diverting mechanism further includes a limit switch connected to the driving mechanism and configured to engage with positioning features of the diverter tube to regulate the rotation of the diverter tube.

21. The coin processing system of claim 19, wherein the coin diverting mechanism further comprises one or more stationary bypass tubes each of which directs coins received by the coin diverting mechanism past the diverter tube to one of the sleeve positions.

22. The coin processing system of claim 17, further comprising a programmable sorting head configured to direct coin flow into a selected one of a plurality of exit slots by activating a motor-driven pin to block another one of the plurality of exit slots.

23. The coin processing system of claim 17, wherein the wheeled trolley includes at least one of an RFID device, a bar code, a sonar device, and a Hall Effect device to wirelessly communicate the information to the communication interface of the controller.

24. A coin processing system for processing and transmitting coins to one or more coin bags, the coin processing system comprising:
a housing with a coin input area configured to receive a batch of coins;
a coin processing unit operatively coupled to the coin input area, the coin processing unit being configured to count, discriminate, sort, value, or any combination thereof, coins received from the coin input area;
a wheeled trolley removably disposed within the housing, the wheeled trolley including a base and a removable coin receptacle sleeve supported by the base, the wheeled trolley being configured to receive at least some of the coins output from the coin processing unit, the wheeled trolley including a first electrical contact; and
a controller with a communication interface operatively attached to the housing, the communication interface including a second electrical contact configured to wirelessly communicate electrical signals with the first electrical contact of the wheeled trolley,
wherein the second electrical contact comprises one or more manifold spring assemblies each including first and second contact springs, the first contact spring being configured to electrically disconnect the spring assembly in the presence of the wheeled trolley, and the second contact spring being configured to electrically reconnect the spring assembly when coins received in the present wheeled trolley reach a predetermined overflow height.

25. A mobile coin receptacle assembly for a coin processing system having a housing configured to receive a batch of coins, a coin processing unit operable to process coins received by the housing, a coin bag, and a controller with a communication interface, the mobile coin receptacle assembly comprising:
a movable trolley configured to removably insert into the housing of the coin processing system, the trolley having a base with a first electrical contact operatively attached thereto, the first electrical contact being configured to wirelessly communicate electrical signals with the controller via a second electrical contact of the communication interface; and
a coin receptacle sleeve removably attached to the trolley and supported by the base, the coin receptacle sleeve being configured to receive through an opening in an upper portion thereof at least some of the coins output from the coin processing unit,
wherein the coin receptacle sleeve includes a third electrical contact configured to cooperate with the first electrical contact to thereby wirelessly communicate to the communication interface of the controller via the second electrical contact a signal indicative of at least one of the presence or absence of a coin bag on the trolley.

26. The mobile coin receptacle assembly of claim 25, wherein the removable coin receptacle sleeve includes a lower portion adjacent the upper portion, at least the lower portion of the removable coin receptacle sleeve being configured to fit into to the coin bag, the upper portion being configured to extend out of the coin bag such that a full coin height to which coins can be fed into the removable coin receptacle sleeve is above a bag height of the coin bag.

27. The mobile coin receptacle assembly of claim 26, wherein the upper portion has a first cross-sectional area and the lower portion has a second cross-sectional area smaller than the first cross-sectional area.

28. The mobile coin receptacle assembly of claim 25, wherein the coin receptacle sleeve includes an elongated hollow body with a first opening having a first size at an upper end of the hollow body, and a second opening having a second size at a lower end of the hollow body, the first size being larger than the second size.

29. The mobile coin receptacle assembly of claim 25, wherein the coin receptacle sleeve is configured to maintain the received coins within a confined footprint.

30. The mobile coin receptacle assembly of claim 25, wherein the coin receptacle sleeve is configured to slide inside of the coin bag and to provide a generally rigid internal geometry to the coin bag.

31. The mobile coin receptacle assembly of claim 25, wherein the coin receptacle sleeve includes a sleeve deflector configured to change a trajectory of the coins received from the coin processing unit.

32. The mobile coin receptacle assembly of claim 25, wherein the coin receptacle sleeve includes a handle extending across the opening in the top of the coin receptacle sleeve, the handle being configured to maintain the opening at a constant width.

33. The mobile coin receptacle assembly of claim 25, wherein the wheeled trolley includes one or more receptacle sleeve clamps attached to and projecting from the base of the trolley, the one or more receptacle sleeve clamps being configured to attach the coin receptacle sleeve to the base and support the coin receptacle sleeve in an upright position.

34. The mobile coin receptacle assembly of claim 25, wherein the first electrical contact comprises a first plurality of electrical contacts, and the second electrical contact comprises a second plurality of electrical contacts each configured to mate with a respective contact of the first plurality of electrical contacts and thereby wirelessly communicate electrical signals with the communication interface of the controller.

35. The mobile coin receptacle assembly of claim 34, wherein the electrical signals are indicative of a presence of the mobile coin receptacle proximate the housing, a position of the mobile coin receptacle relative to the housing, a characteristic of coins stowed by the mobile coin receptacle, or a presence of a coin bag on the mobile coin receptacle, or any combination thereof.

36. The mobile coin receptacle assembly of claim 25, wherein the first electrical contact includes a pair of contact plates mounted to the base and connected by a resistor, and the third electrical contact includes a pair of contact strips each mounted to a respective side of the coin receptacle sleeve, and wherein, in the absence of a coin bag, each of the contact plates is configured to abut a respective one of the contact strips thereby completing an electrical path therebetween.

37. The mobile coin receptacle assembly of claim 25, wherein the trolley includes at least one of an RFID device, a bar code, a sonar device, and a Hall Effect device to wirelessly communicate the information to the communication interface of the controller.

38. A mobile coin receptacle assembly for a coin processing system having a housing configured to receive a batch of coins, a coin processing unit operable to process coins received by the housing, a coin bag, and a controller with a communication interface, the mobile coin receptacle assembly comprising:
   a movable trolley configured to removably insert into the housing of the coin processing system, the trolley having a base with a first electrical contact operatively attached thereto, the first electrical contact being configured to wirelessly communicate electrical signals with the controller via a second electrical contact of the communication interface; and
   a coin receptacle sleeve removably attached to the trolley and supported by the base, the coin receptacle sleeve being configured to receive through an opening in an upper portion thereof at least some of the coins output from the coin processing unit,
   wherein the coin receptacle sleeve includes an additional electrical contact configured to cooperate with the second electrical contact operatively attached to the housing to thereby wirelessly communicate to the communication interface of the controller a signal indicative of at least one of a presence or a position of the coin receptacle sleeve relative to the housing.

39. The mobile coin receptacle assembly of claim 38, wherein the coin receptacle sleeve includes a handle, the housing includes a coin manifold, the additional electrical contact includes a pair of contact plates mounted to the handle, the second electrical contact includes a pair of springs mounted to the coin manifold, and wherein, when the mobile coin receptacle is functionally received by the housing, each of the contact plates touches a respective one of the springs thereby completing an electrical path therebetween.

40. A mobile coin receptacle assembly for a coin processing system having a housing configured to receive a batch of coins, a coin processing unit operable to process coins received by the housing, a coin bag, and a controller with a communication interface, the mobile coin receptacle assembly comprising:
   a movable trolley configured to removably insert into the housing of the coin processing system, the trolley having a base with a first electrical contact operatively attached thereto, the first electrical contact being configured to wirelessly communicate electrical signals with the controller via a second electrical contact of the communication interface; and
   a coin receptacle sleeve removably attached to the trolley and supported by the base, the coin receptacle sleeve being configured to receive through an opening in an upper portion thereof at least some of the coins output from the coin processing unit,
   wherein the coin receptacle sleeve includes a third electrical contact configured to cooperate with the second electrical contact to thereby wirelessly communicate to the communication interface of the controller a signal indicative of a characteristic of coins inside the coin receptacle.

41. The mobile coin receptacle assembly of claim 40, wherein the housing further includes a coin manifold, the second electrical contact includes a pair of springs mounted to the coin manifold, and the third electrical contact includes a pair of contact strips each mounted to a respective side of the coin receptacle sleeve, and wherein, in the presence of a minimum number of coins, an electrical path is formed between the pair of springs and the pair of contact strips via the coins.

* * * * *